United States Patent
Poltaretskyi et al.

(10) Patent No.: US 12,465,374 B2
(45) Date of Patent: Nov. 11, 2025

(54) SURGICAL GUIDANCE FOR SURGICAL TOOLS

(71) Applicant: Howmedica Osteonics Corp., Mahwah, NJ (US)

(72) Inventors: Sergii Poltaretskyi, Ependes FR (CH); Damien Cariou, Loperhet (FR); Bryan Florentin Zago, Brest (FR)

(73) Assignee: Howmedica Osteonics Corp., Mahwah, NJ (US)

( * ) Notice: Subject to any disclaimer, the term of this patent is extended or adjusted under 35 U.S.C. 154(b) by 544 days.

(21) Appl. No.: 17/784,044

(22) PCT Filed: Dec. 16, 2020

(86) PCT No.: PCT/US2020/065380
§ 371 (c)(1),
(2) Date: Jun. 9, 2022

(87) PCT Pub. No.: WO2021/127025
PCT Pub. Date: Jun. 24, 2021

(65) Prior Publication Data
US 2023/0026489 A1    Jan. 26, 2023

Related U.S. Application Data

(60) Provisional application No. 62/949,794, filed on Dec. 18, 2019.

(51) Int. Cl.
*A61B 34/20*    (2016.01)
*A61B 17/17*    (2006.01)
(Continued)

(52) U.S. Cl.
CPC .......... *A61B 17/1703* (2013.01); *A61B 34/10* (2016.02); *A61B 34/20* (2016.02);
(Continued)

(58) Field of Classification Search
CPC ..... A61B 17/1703; A61B 34/10; A61B 34/20; A61B 90/361; A61B 2034/105;
(Continued)

(56) References Cited

U.S. PATENT DOCUMENTS

| | | | |
|---|---|---|---|
| 5,682,886 A | 11/1997 | Delp et al. | |
| 5,769,640 A | 6/1998 | Jacobus et al. | |

(Continued)

FOREIGN PATENT DOCUMENTS

| | | | |
|---|---|---|---|
| CA | 3203261 A1 | 7/2022 | |
| CN | 101170961 A | 4/2008 | |

(Continued)

OTHER PUBLICATIONS

US 8,849,621 B2, 09/2014, Fitz et al. (withdrawn)
(Continued)

*Primary Examiner* — Joel Lamprecht
(74) *Attorney, Agent, or Firm* — Shumaker & Sieffert, P.A.

(57) ABSTRACT

An example physical tracking tool includes a main body defining a channel configured to receive a tool, the channel having a longitudinal axis; and one or more physical tracking features attached to the main body, each physical tracking feature comprising a plurality of planar faces, each planar face of the plurality of planar faces including different a graphical pattern of a plurality of graphical patterns.

3 Claims, 23 Drawing Sheets

(51) Int. Cl.
*A61B 34/10* (2016.01)
*A61B 90/00* (2016.01)

(52) U.S. Cl.
CPC ...... *A61B 90/361* (2016.02); *A61B 2034/105* (2016.02); *A61B 2034/107* (2016.02); *A61B 2034/2065* (2016.02); *A61B 2090/365* (2016.02); *A61B 2090/372* (2016.02); *A61B 2090/3937* (2016.02); *A61B 2090/3983* (2016.02)

(58) Field of Classification Search
CPC ...... A61B 2034/107; A61B 2034/2065; A61B 2090/365; A61B 2090/372; A61B 2090/3937; A61B 2090/3983; A61B 17/17; A61B 90/96; A61B 2034/2055; A61B 34/25; A61B 90/39; A61B 2034/2048; A61B 2034/254; A61B 2090/502
See application file for complete search history.

(56) References Cited

U.S. PATENT DOCUMENTS

| | | |
|---|---|---|
| 5,824,085 A | 10/1998 | Sahay et al. |
| 6,002,859 A | 12/1999 | DiGioia, III et al. |
| 6,205,411 B1 | 3/2001 | DiGioia, III et al. |
| 6,245,074 B1 | 6/2001 | Allard et al. |
| 6,458,136 B1 | 10/2002 | Allard et al. |
| 6,847,336 B1 | 1/2005 | Lemelson et al. |
| 6,944,518 B2 | 9/2005 | Roose |
| 7,206,627 B2 | 4/2007 | Abovitz et al. |
| 7,388,972 B2 | 6/2008 | Kitson |
| 7,468,075 B2 | 12/2008 | Lang et al. |
| 7,493,153 B2 | 2/2009 | Ahmed et al. |
| 7,534,263 B2 | 5/2009 | Burdulis, Jr. et al. |
| 7,542,791 B2 | 6/2009 | Mire et al. |
| 7,618,451 B2 | 11/2009 | Berez et al. |
| 7,634,119 B2 | 12/2009 | Tsougarakis et al. |
| 7,715,602 B2 | 5/2010 | Richard |
| 7,717,956 B2 | 5/2010 | Lang |
| 7,774,044 B2 | 8/2010 | Sauer et al. |
| 7,799,077 B2 | 9/2010 | Lang et al. |
| 7,857,821 B2 | 12/2010 | Couture et al. |
| 7,885,701 B2 | 2/2011 | DiSilvestro et al. |
| 7,981,158 B2 | 7/2011 | Fitz et al. |
| 7,983,777 B2 | 7/2011 | Melton et al. |
| 8,014,984 B2 | 9/2011 | Iannotti et al. |
| 8,062,302 B2 | 11/2011 | Lang et al. |
| 8,066,708 B2 | 11/2011 | Lang et al. |
| 8,070,752 B2 | 12/2011 | Metzger et al. |
| 8,077,950 B2 | 12/2011 | Tsougarakis et al. |
| 8,078,440 B2 | 12/2011 | Otto et al. |
| 8,083,745 B2 | 12/2011 | Lang et al. |
| 8,092,465 B2 | 1/2012 | Metzger et al. |
| 8,094,900 B2 | 1/2012 | Steines et al. |
| 8,105,330 B2 | 1/2012 | Fitz et al. |
| 8,147,496 B2 | 4/2012 | Couture et al. |
| 8,160,326 B2 | 4/2012 | Zug et al. |
| 8,172,775 B2 | 5/2012 | Warkentine et al. |
| 8,175,683 B2 | 5/2012 | Roose |
| 8,214,016 B2 | 7/2012 | Lavallee et al. |
| 8,221,430 B2 | 7/2012 | Park et al. |
| 8,234,097 B2 | 7/2012 | Steines et al. |
| 8,241,296 B2 | 8/2012 | Wasielewski |
| 8,282,646 B2 | 10/2012 | Schoenefeld et al. |
| 8,337,501 B2 | 12/2012 | Fitz et al. |
| 8,337,507 B2 | 12/2012 | Lang et al. |
| 8,343,218 B2 | 1/2013 | Lang et al. |
| 8,366,771 B2 | 2/2013 | Burdulis, Jr. et al. |
| 8,380,471 B2 | 2/2013 | Iannotti et al. |
| 8,457,790 B2 | 6/2013 | Blondel et al. |
| 8,457,930 B2 | 6/2013 | Schroeder |
| 8,460,304 B2 | 6/2013 | Fitz et al. |
| 8,478,382 B2 | 7/2013 | Burnside et al. |
| 8,480,679 B2 | 7/2013 | Park et al. |
| 8,482,859 B2 | 7/2013 | Border et al. |
| 8,500,740 B2 | 8/2013 | Bojarski et al. |
| 8,506,645 B2 | 8/2013 | Blaylock et al. |
| 8,512,346 B2 | 8/2013 | Couture |
| 8,521,255 B2 | 8/2013 | DiSilvestro et al. |
| 8,526,700 B2 | 9/2013 | Isaacs |
| 8,529,568 B2 | 9/2013 | Bouadi |
| 8,532,361 B2 | 9/2013 | Pavlovskaia et al. |
| 8,532,807 B2 | 9/2013 | Metzger |
| 8,545,509 B2 | 10/2013 | Park et al. |
| 8,551,102 B2 | 10/2013 | Fitz et al. |
| 8,551,103 B2 | 10/2013 | Fitz et al. |
| 8,551,169 B2 | 10/2013 | Fitz et al. |
| 8,551,178 B2 | 10/2013 | Sharkey et al. |
| 8,556,906 B2 | 10/2013 | FItz et al. |
| 8,556,907 B2 | 10/2013 | Fitz et al. |
| 8,556,971 B2 | 10/2013 | Lang |
| 8,556,983 B2 | 10/2013 | Bojarski et al. |
| 8,561,278 B2 | 10/2013 | Fitz et al. |
| 8,562,611 B2 | 10/2013 | Fitz et al. |
| 8,568,479 B2 | 10/2013 | Fitz et al. |
| 8,574,303 B2 | 11/2013 | Sharkey et al. |
| 8,585,708 B2 | 11/2013 | Fitz et al. |
| 8,594,397 B2 | 11/2013 | Haimerl et al. |
| 8,617,172 B2 | 12/2013 | FItz et al. |
| 8,617,242 B2 | 12/2013 | Philipp |
| 8,623,026 B2 | 1/2014 | Wong et al. |
| 8,634,617 B2 | 1/2014 | Tsougarakis et al. |
| 8,638,998 B2 | 1/2014 | Steines et al. |
| 8,657,827 B2 | 2/2014 | Fitz et al. |
| 8,662,900 B2 | 3/2014 | Bell, III et al. |
| 8,679,125 B2 | 3/2014 | Smith et al. |
| 8,682,052 B2 | 3/2014 | Fitz et al. |
| 8,690,945 B2 | 4/2014 | Fitz et al. |
| 8,706,197 B2 | 4/2014 | Henning et al. |
| 8,709,089 B2 | 4/2014 | Lang et al. |
| 8,715,291 B2 | 5/2014 | Park et al. |
| 8,731,885 B2 | 5/2014 | Iannotti et al. |
| 8,735,773 B2 | 5/2014 | Lang |
| 8,737,700 B2 | 5/2014 | Park et al. |
| 8,777,875 B2 | 7/2014 | Park |
| 8,794,977 B2 | 8/2014 | McGuan et al. |
| 8,801,719 B2 | 8/2014 | Park et al. |
| 8,814,877 B2 | 8/2014 | Wasielewski |
| 8,861,818 B2 | 10/2014 | Ito et al. |
| 8,876,830 B2 | 11/2014 | Hodorek et al. |
| 8,882,779 B2 | 11/2014 | Park |
| 8,884,618 B2 | 11/2014 | Mahfouz |
| 8,888,782 B2 | 11/2014 | Smith et al. |
| 8,903,530 B2 | 12/2014 | Metzger |
| 8,906,107 B2 | 12/2014 | Bojarski et al. |
| 8,908,937 B2 | 12/2014 | Beck |
| 8,917,290 B2 | 12/2014 | Beck |
| 8,932,361 B2 | 1/2015 | Tomier et al. |
| 8,932,363 B2 | 1/2015 | Tsougarakis et al. |
| 8,965,088 B2 | 2/2015 | Tsougarakis et al. |
| 8,971,606 B2 | 3/2015 | Chaoui et al. |
| 8,974,539 B2 | 3/2015 | Bojarski et al. |
| 8,983,813 B2 | 3/2015 | Miles et al. |
| 8,989,460 B2 | 3/2015 | Mahfouz |
| 8,990,052 B2 | 3/2015 | Lavallee et al. |
| 9,020,788 B2 | 4/2015 | Lang et al. |
| 9,023,050 B2 | 5/2015 | Lang et al. |
| 9,055,953 B2 | 6/2015 | Lang et al. |
| 9,072,531 B2 | 7/2015 | Fitz et al. |
| 9,084,617 B2 | 7/2015 | Lang et al. |
| 9,097,890 B2 | 8/2015 | Miller et al. |
| 9,107,679 B2 | 8/2015 | Lang et al. |
| 9,107,680 B2 | 8/2015 | Fitz et al. |
| 9,123,155 B2 | 9/2015 | Cunningham et al. |
| 9,161,821 B2 | 10/2015 | Frigg |
| 9,180,015 B2 | 11/2015 | Fitz et al. |
| 9,186,161 B2 | 11/2015 | Lang et al. |
| 9,208,263 B2 | 12/2015 | Pavlovskaia et al. |
| 9,211,199 B2 | 12/2015 | Ratron |
| 9,216,025 B2 | 12/2015 | Fitz et al. |
| 9,220,516 B2 | 12/2015 | Lang et al. |
| 9,220,517 B2 | 12/2015 | Lang et al. |

(56) References Cited

U.S. PATENT DOCUMENTS

| | | |
|---|---|---|
| 9,220,572 B2 | 12/2015 | Meridew et al. |
| 9,232,955 B2 | 1/2016 | Bonin, Jr. et al. |
| 9,233,001 B2 | 1/2016 | Miles et al. |
| 9,269,275 B2 | 2/2016 | Bell et al. |
| 9,295,482 B2 | 3/2016 | Fitz et al. |
| 9,301,812 B2 | 4/2016 | Kehres et al. |
| 9,326,780 B2 | 5/2016 | Wong et al. |
| 9,333,085 B2 | 5/2016 | Fitz et al. |
| 9,345,551 B2 | 5/2016 | Mahfouz |
| 9,351,743 B2 | 5/2016 | Kehres et al. |
| 9,358,018 B2 | 6/2016 | Fitz et al. |
| 9,358,114 B2 | 6/2016 | Hughes |
| 9,402,726 B2 | 8/2016 | Linderman et al. |
| 9,408,686 B1 | 8/2016 | Miller et al. |
| 9,414,846 B2 | 8/2016 | Gillman et al. |
| 9,433,471 B2 | 9/2016 | Zubars |
| 9,439,767 B2 | 9/2016 | Bojarski et al. |
| 9,495,483 B2 | 11/2016 | Steines et al. |
| 9,498,132 B2 | 11/2016 | Maier-Hein et al. |
| 9,522,008 B2 | 12/2016 | Ferko et al. |
| 9,532,730 B2 | 1/2017 | Wasielewski |
| 9,538,962 B1 | 1/2017 | Hannaford et al. |
| 9,547,940 B1 | 1/2017 | Sun et al. |
| 9,554,910 B2 | 1/2017 | Vanasse et al. |
| 9,575,931 B2 | 2/2017 | Ratron |
| 9,579,106 B2 | 2/2017 | Lo et al. |
| 9,579,110 B2 | 2/2017 | Bojarski et al. |
| 9,588,587 B2 | 3/2017 | Otto et al. |
| 9,603,711 B2 | 3/2017 | Bojarski et al. |
| 9,610,086 B2 | 4/2017 | Park et al. |
| 9,642,632 B2 | 5/2017 | Stemniski et al. |
| 9,645,785 B1 | 5/2017 | Hannaford et al. |
| 9,646,113 B2 | 5/2017 | Park et al. |
| 9,646,423 B1 | 5/2017 | Sun et al. |
| 9,649,117 B2 | 5/2017 | Stemniski et al. |
| 9,649,170 B2 | 5/2017 | Park et al. |
| 9,675,365 B2 | 6/2017 | Lancianese et al. |
| 9,675,461 B2 | 6/2017 | Mahfouz |
| 9,675,471 B2 | 6/2017 | Bojarski et al. |
| 9,681,925 B2 | 6/2017 | Azar et al. |
| 9,681,956 B2 | 6/2017 | Al Hares et al. |
| 9,684,768 B2 | 6/2017 | Lavallee et al. |
| 9,687,945 B2 | 6/2017 | Steines et al. |
| 9,700,420 B2 | 7/2017 | Fitz et al. |
| 9,715,563 B1 | 7/2017 | Schroeder |
| 9,775,680 B2 | 10/2017 | Bojarski et al. |
| 9,778,648 B2 | 10/2017 | Kumar et al. |
| 9,795,399 B2 | 10/2017 | Metzger et al. |
| 9,849,019 B2 | 12/2017 | Miller et al. |
| 9,855,146 B2 | 1/2018 | Schmieding |
| 9,861,387 B2 | 1/2018 | Metzger et al. |
| 9,861,446 B2 | 1/2018 | Lang |
| 9,895,230 B2 | 2/2018 | Mahfouz |
| 9,933,847 B1 | 4/2018 | Ross et al. |
| 9,943,370 B2 | 4/2018 | Asseln et al. |
| 9,956,047 B2 | 5/2018 | Borjarski et al. |
| 9,980,780 B2 | 5/2018 | Lang |
| 10,010,379 B1 | 7/2018 | Gibby et al. |
| 10,013,808 B2 | 7/2018 | Jones et al. |
| 10,016,243 B2 | 7/2018 | Esterberg |
| 10,052,170 B2 | 8/2018 | Saget et al. |
| 10,052,206 B2 | 8/2018 | Mahfouz |
| 10,064,686 B2 | 9/2018 | McKinnon et al. |
| 10,080,509 B2 | 9/2018 | Wasielewski |
| 10,154,239 B2 | 12/2018 | Casas |
| 10,159,530 B2 | 12/2018 | Lang |
| 10,194,131 B2 | 1/2019 | Casas |
| 10,194,990 B2 | 2/2019 | Amanatullah et al. |
| 10,258,427 B2 | 4/2019 | Saget et al. |
| 10,278,777 B1 | 5/2019 | Lang |
| 10,292,768 B2 | 5/2019 | Lang |
| 10,326,975 B2 | 6/2019 | Casas |
| 10,368,947 B2 | 8/2019 | Lang |
| 10,383,692 B1 | 8/2019 | Wang |
| 10,390,887 B2 | 8/2019 | Bischoff et al. |
| 10,390,890 B2 | 8/2019 | Jagga |
| 10,398,514 B2 | 9/2019 | Ryan et al. |
| 10,405,927 B1 | 9/2019 | Lang |
| 10,413,363 B2 | 9/2019 | Fahim et al. |
| 10,426,549 B2 | 10/2019 | Kehres et al. |
| 10,467,752 B2 | 11/2019 | Tanji |
| 10,478,255 B2 | 11/2019 | West et al. |
| 10,499,996 B2 | 12/2019 | de Almeida Barreto |
| 10,511,822 B2 | 12/2019 | Casas |
| 10,517,690 B2 | 12/2019 | Kosmecki et al. |
| 10,546,423 B2 | 1/2020 | Jones et al. |
| 10,548,667 B2 | 2/2020 | Flett et al. |
| 10,572,733 B2 | 2/2020 | Wells et al. |
| 10,580,217 B2 | 3/2020 | Jones et al. |
| 10,594,998 B1 | 3/2020 | Casas |
| 10,595,844 B2 | 3/2020 | Nawana et al. |
| 10,602,114 B2 | 3/2020 | Casas |
| 10,603,113 B2 | 3/2020 | Lang |
| 10,621,436 B2 | 4/2020 | Wells et al. |
| 10,646,283 B2 | 5/2020 | Johnson et al. |
| 10,646,285 B2 | 5/2020 | Siemionow et al. |
| 10,650,594 B2 | 5/2020 | Jones et al. |
| 10,679,417 B2 | 6/2020 | Wei et al. |
| 10,687,901 B2 | 6/2020 | Thomas |
| 10,716,643 B2 | 7/2020 | Justin et al. |
| 10,742,949 B2 | 8/2020 | Casas |
| 10,743,939 B1 | 8/2020 | Lang |
| 10,788,791 B2 | 9/2020 | Gellman et al. |
| 10,796,499 B2 | 10/2020 | de Almeida Barreto et al. |
| 10,799,296 B2 | 10/2020 | Lang |
| 10,806,518 B2 | 10/2020 | Amanatullah |
| 10,810,799 B2 | 10/2020 | Tepper et al. |
| 10,813,700 B2 | 10/2020 | Amanatullah |
| 10,818,199 B2 | 10/2020 | Buras et al. |
| 10,820,948 B2 | 11/2020 | West et al. |
| 10,825,563 B2 | 11/2020 | Gibby et al. |
| 10,841,556 B2 | 11/2020 | Casas |
| 10,846,851 B2 | 11/2020 | Boettger et al. |
| 10,849,693 B2 | 12/2020 | Lang |
| 10,861,236 B2 | 12/2020 | Geri et al. |
| 10,869,727 B2 | 12/2020 | Yanof et al. |
| 10,881,462 B2 | 1/2021 | Heavener et al. |
| 10,895,906 B2 | 1/2021 | West et al. |
| 10,951,872 B2 | 3/2021 | Casas |
| 10,987,176 B2 | 4/2021 | Poltaretskyi et al. |
| 10,987,190 B2 | 4/2021 | Flossmann et al. |
| 11,013,560 B2 | 5/2021 | Lang |
| 11,029,147 B2 * | 6/2021 | Abovitz ............... G06F 3/0487 |
| 11,058,497 B2 | 7/2021 | Altmann et al. |
| 11,062,522 B2 | 7/2021 | Jones et al. |
| 11,071,590 B2 | 7/2021 | Moctezuma De La Barrera |
| 11,080,934 B2 | 8/2021 | Tseng et al. |
| 11,083,527 B2 | 8/2021 | Esterberg |
| 11,103,311 B2 | 8/2021 | May et al. |
| 11,135,016 B2 | 10/2021 | Frielinghaus et al. |
| 11,153,555 B1 | 10/2021 | Healy et al. |
| 11,172,990 B2 | 11/2021 | Lang |
| 11,172,996 B1 | 11/2021 | Qian et al. |
| 11,176,750 B2 | 11/2021 | Jones et al. |
| 11,202,675 B2 | 12/2021 | Uhde et al. |
| 11,207,150 B2 | 12/2021 | Healy et al. |
| 11,217,028 B2 | 1/2022 | Jones et al. |
| 11,237,627 B2 | 2/2022 | Gibby et al. |
| 11,244,508 B2 | 2/2022 | Kazanzides et al. |
| 11,253,321 B2 | 2/2022 | Amanatullah |
| 11,269,401 B2 | 3/2022 | West et al. |
| 11,278,359 B2 | 3/2022 | Siemionow et al. |
| 11,287,874 B2 | 3/2022 | Gibby et al. |
| 11,302,005 B2 | 4/2022 | Tanji |
| 11,311,341 B2 | 4/2022 | Lang |
| 11,324,566 B2 | 5/2022 | Kosmecki et al. |
| 11,357,576 B2 | 6/2022 | Jo et al. |
| 11,382,699 B2 | 7/2022 | Wassall et al. |
| 11,382,713 B2 | 7/2022 | Healy et al. |
| 11,413,094 B2 | 8/2022 | Qiu et al. |
| 11,439,469 B2 | 9/2022 | Poltaretskyi et al. |
| 11,452,568 B2 | 9/2022 | Lang |
| 11,457,982 B2 | 10/2022 | Marti et al. |
| 11,461,983 B2 | 10/2022 | Jones et al. |

(56) References Cited

U.S. PATENT DOCUMENTS

| | | |
|---|---|---|
| 11,510,750 B2 | 11/2022 | Dulin et al. |
| 11,532,135 B2 | 12/2022 | Geri et al. |
| 11,571,263 B2 | 2/2023 | Moore et al. |
| 11,574,446 B2 | 2/2023 | Tseng et al. |
| 11,589,923 B2 | 2/2023 | Running et al. |
| 11,589,927 B2 | 2/2023 | Oezbek et al. |
| 11,602,395 B2 | 3/2023 | Lang |
| 11,607,277 B2 | 3/2023 | Calloway et al. |
| 11,622,818 B2 | 4/2023 | Siemionow et al. |
| 11,638,613 B2 | 5/2023 | Murphy |
| 11,645,531 B2 | 5/2023 | Moore et al. |
| 11,690,697 B2 | 7/2023 | Healy et al. |
| 11,730,544 B2 | 8/2023 | Moctezuma De la Barrera |
| 11,734,901 B2 | 8/2023 | Jones et al. |
| 11,751,944 B2 | 9/2023 | Lang |
| 11,763,531 B2 | 9/2023 | Jones et al. |
| 11,766,296 B2 | 9/2023 | Wolf et al. |
| 11,801,114 B2 * | 10/2023 | Lang ................... A61B 90/96 |
| 11,839,433 B2 | 12/2023 | Schaewe et al. |
| 11,850,003 B2 | 12/2023 | Lang |
| 2002/0082498 A1 | 6/2002 | Wendt et al. |
| 2004/0002642 A1 | 1/2004 | Dekel et al. |
| 2004/0068187 A1 | 4/2004 | Krause et al. |
| 2004/0171924 A1 | 9/2004 | Mire et al. |
| 2004/0204644 A1 | 10/2004 | Tsougarakis et al. |
| 2004/0243148 A1 | 12/2004 | Wasielewski |
| 2004/0254454 A1 | 12/2004 | Kockro |
| 2006/0142657 A1 | 6/2006 | Quaid et al. |
| 2006/0142739 A1 | 6/2006 | DiSilestro et al. |
| 2006/0184454 A1 | 8/2006 | Ananda |
| 2007/0015999 A1 | 1/2007 | Heldreth et al. |
| 2007/0066917 A1 | 3/2007 | Hodorek et al. |
| 2007/0179626 A1 | 8/2007 | de la Barrera et al. |
| 2007/0198022 A1 | 8/2007 | Lang et al. |
| 2007/0233267 A1 | 10/2007 | Amirouche et al. |
| 2007/0239153 A1 | 10/2007 | Hodorek et al. |
| 2007/0244564 A1 | 10/2007 | Ferrand et al. |
| 2007/0249967 A1 | 10/2007 | Buly et al. |
| 2007/0288030 A1 | 12/2007 | Metzger et al. |
| 2008/0077158 A1 | 3/2008 | Haider et al. |
| 2008/0161815 A1 | 7/2008 | Schoenefeld et al. |
| 2008/0215156 A1 | 9/2008 | Duggal et al. |
| 2008/0249395 A1 | 10/2008 | Shachar et al. |
| 2008/0262812 A1 | 10/2008 | Arata et al. |
| 2008/0269596 A1 | 10/2008 | Revie et al. |
| 2008/0312659 A1 | 12/2008 | Metzger et al. |
| 2009/0076655 A1 | 3/2009 | Blondel et al. |
| 2009/0131548 A1 | 5/2009 | Muratoglu et al. |
| 2009/0138019 A1 | 5/2009 | Wasielewski |
| 2010/0054572 A1 | 3/2010 | Tsougarakis et al. |
| 2010/0149213 A1 | 6/2010 | Navab et al. |
| 2010/0228257 A1 | 9/2010 | Bonutti |
| 2010/0274534 A1 | 10/2010 | Steines et al. |
| 2010/0277659 A1 | 11/2010 | Yang et al. |
| 2010/0295931 A1 | 11/2010 | Schmidt |
| 2010/0311028 A1 | 12/2010 | Bell, III et al. |
| 2010/0312247 A1 | 12/2010 | Tuma |
| 2011/0010187 A1 | 1/2011 | Andersson et al. |
| 2011/0071802 A1 | 3/2011 | Bojarski et al. |
| 2011/0092978 A1 | 4/2011 | McCombs |
| 2011/0208256 A1 | 8/2011 | Zuhars |
| 2011/0257653 A1 | 10/2011 | Hughes et al. |
| 2011/0307016 A1 | 12/2011 | Reglos et al. |
| 2012/0041446 A1 | 2/2012 | Wong |
| 2012/0065640 A1 | 3/2012 | Metzger et al. |
| 2012/0066892 A1 | 3/2012 | Lang et al. |
| 2012/0071893 A1 | 3/2012 | Smith et al. |
| 2012/0089191 A1 | 4/2012 | Altarac et al. |
| 2012/0122062 A1 | 5/2012 | Yang et al. |
| 2012/0141034 A1 | 6/2012 | Iannotti et al. |
| 2012/0157887 A1 | 6/2012 | Fanson et al. |
| 2012/0201440 A1 | 8/2012 | Steines et al. |
| 2012/0209392 A1 | 8/2012 | Angibaud et al. |
| 2012/0226481 A1 | 9/2012 | Carson |
| 2012/0265496 A1 | 10/2012 | Mahfouz |
| 2012/0271426 A1 | 10/2012 | Roche et al. |
| 2012/0276509 A1 | 11/2012 | Iannotti et al. |
| 2012/0277752 A1 | 11/2012 | Wasielewski |
| 2012/0290272 A1 | 11/2012 | Bryan |
| 2013/0012944 A1 | 1/2013 | McCombs |
| 2013/0023999 A1 | 1/2013 | Gregory |
| 2013/0114873 A1 | 5/2013 | Chaoui et al. |
| 2013/0172731 A1 | 7/2013 | Gole |
| 2013/0185310 A1 | 7/2013 | De Guise et al. |
| 2013/0197529 A1 | 8/2013 | Metzger et al. |
| 2013/0197543 A1 | 8/2013 | Bonutti |
| 2013/0197870 A1 | 8/2013 | Steines et al. |
| 2013/0211421 A1 | 8/2013 | Abovitz et al. |
| 2013/0230838 A1 | 9/2013 | Iannotti et al. |
| 2013/0261755 A1 | 10/2013 | Anthony |
| 2013/0267838 A1 | 10/2013 | Fronk et al. |
| 2013/0293578 A1 | 11/2013 | Leung |
| 2013/0336553 A1 | 12/2013 | Buisseret et al. |
| 2014/0022283 A1 | 1/2014 | Chan et al. |
| 2014/0055489 A1 | 2/2014 | Itkowitz et al. |
| 2014/0081659 A1 | 3/2014 | Nawana et al. |
| 2014/0115872 A1 | 5/2014 | Steines et al. |
| 2014/0135857 A1 | 5/2014 | Zuhars |
| 2014/0207139 A1 | 7/2014 | Smith et al. |
| 2014/0221819 A1 | 8/2014 | Sarment |
| 2014/0228860 A1 | 8/2014 | Steines et al. |
| 2014/0244220 A1 | 8/2014 | McKinnon et al. |
| 2014/0276872 A1 | 9/2014 | Song |
| 2014/0324058 A1 | 10/2014 | Metzger et al. |
| 2014/0330112 A1 | 11/2014 | Wasielewski |
| 2014/0347392 A1 | 11/2014 | Odessky et al. |
| 2015/0016777 A1 | 1/2015 | Abovitz et al. |
| 2015/0032070 A1 | 1/2015 | Colby |
| 2015/0088293 A1 | 3/2015 | Metzger |
| 2015/0123769 A1 | 5/2015 | Dalal et al. |
| 2015/0133820 A1 | 5/2015 | Zohar et al. |
| 2015/0150688 A1 | 6/2015 | Vanasse et al. |
| 2015/0248793 A1 | 9/2015 | Abovitz et al. |
| 2015/0250601 A1 | 9/2015 | Humphrey |
| 2015/0366628 A1 | 12/2015 | Ingmanson |
| 2016/0015466 A1 | 1/2016 | Park et al. |
| 2016/0015470 A1 | 1/2016 | Border |
| 2016/0015474 A1 | 1/2016 | Dekel |
| 2016/0038243 A1 | 2/2016 | Miller et al. |
| 2016/0074124 A1 | 3/2016 | Fitz et al. |
| 2016/0100907 A1 | 4/2016 | Gomes |
| 2016/0110517 A1 | 4/2016 | Taylor |
| 2016/0119582 A1 | 4/2016 | Smurro |
| 2016/0143699 A1 | 5/2016 | Tanji |
| 2016/0157937 A1 | 6/2016 | Kehres et al. |
| 2016/0166333 A1 | 6/2016 | Wang et al. |
| 2016/0166392 A1 | 6/2016 | Vanasse et al. |
| 2016/0220105 A1 | 8/2016 | Duret |
| 2016/0228132 A1 | 8/2016 | Kehres et al. |
| 2016/0228193 A1 | 8/2016 | Moctezuma de la Barrera et al. |
| 2016/0228195 A1 | 8/2016 | Park et al. |
| 2016/0249989 A1 | 9/2016 | Devam et al. |
| 2016/0256222 A1 | 9/2016 | Walch |
| 2016/0270854 A1 | 9/2016 | Chaoui |
| 2016/0278867 A1 | 9/2016 | Dupuis et al. |
| 2016/0287337 A1 | 10/2016 | Aram et al. |
| 2016/0296285 A1 | 10/2016 | Chaoui et al. |
| 2016/0314623 A1 | 10/2016 | Coleman |
| 2016/0324580 A1 | 11/2016 | Esterberg |
| 2016/0324581 A1 | 11/2016 | Bojarski et al. |
| 2016/0324598 A1 | 11/2016 | Bothorel et al. |
| 2016/0338778 A1 | 11/2016 | Zuhars |
| 2017/0000615 A1 | 1/2017 | Mahfouz |
| 2017/0027651 A1 | 2/2017 | Esterberg |
| 2017/0035517 A1 | 2/2017 | Geri et al. |
| 2017/0042619 A1 | 2/2017 | Brooks |
| 2017/0042631 A1 | 2/2017 | Doo et al. |
| 2017/0056183 A1 | 3/2017 | Steines et al. |
| 2017/0071503 A1 | 3/2017 | Wasielewski |
| 2017/0108930 A1 | 4/2017 | Banerjee |
| 2017/0112627 A1 | 4/2017 | Ratron |
| 2017/0128135 A1 | 5/2017 | McCarthy et al. |
| 2017/0156890 A1 | 6/2017 | Bake et al. |
| 2017/0258526 A1 | 9/2017 | Lang |

(56) References Cited

U.S. PATENT DOCUMENTS

| | | |
|---|---|---|
| 2017/0273795 A1 | 9/2017 | Neichel et al. |
| 2017/0286617 A1 | 10/2017 | Zimmer |
| 2017/0296292 A1 | 10/2017 | Mahmood et al. |
| 2017/0299864 A1 | 10/2017 | Vallius et al. |
| 2017/0312031 A1 | 11/2017 | Amanatullah et al. |
| 2017/0312032 A1 | 11/2017 | Amanatullah et al. |
| 2017/0340389 A1 | 11/2017 | Otto |
| 2017/0360512 A1 | 12/2017 | Couture et al. |
| 2017/0367766 A1 | 12/2017 | Mahfouz |
| 2017/0367771 A1 | 12/2017 | Tako et al. |
| 2017/0367834 A1 | 12/2017 | Fitz et al. |
| 2018/0000547 A1 | 1/2018 | Kang et al. |
| 2018/0008292 A1 | 1/2018 | Metzger et al. |
| 2018/0008350 A1 | 1/2018 | Varadarajan et al. |
| 2018/0046166 A1 | 2/2018 | Kumar et al. |
| 2018/0049622 A1 | 2/2018 | Ryan et al. |
| 2018/0052277 A1 | 2/2018 | Schowengerdt et al. |
| 2018/0071032 A1 | 3/2018 | de Almeida Barreto |
| 2018/0078034 A1 | 3/2018 | Savall et al. |
| 2018/0082480 A1 | 3/2018 | White et al. |
| 2018/0089855 A1 | 3/2018 | Rodrigues et al. |
| 2018/0103967 A1 | 4/2018 | Rouver et al. |
| 2018/0121728 A1 | 5/2018 | Wells et al. |
| 2018/0140362 A1 | 5/2018 | Cali et al. |
| 2018/0200002 A1 | 7/2018 | Kostrzewski et al. |
| 2018/0233222 A1 | 8/2018 | Daley et al. |
| 2018/0256256 A1 | 9/2018 | May et al. |
| 2018/0280037 A1 | 10/2018 | Dassonville et al. |
| 2018/0333207 A1 | 11/2018 | Moctezuma De la Barrera |
| 2018/0344309 A1 | 12/2018 | Nawana et al. |
| 2018/0344412 A1 | 12/2018 | Esterberg |
| 2019/0015119 A1 | 1/2019 | Athwal et al. |
| 2019/0035156 A1 | 1/2019 | Wei et al. |
| 2019/0053851 A1 | 2/2019 | Siemionow et al. |
| 2019/0076198 A1 | 3/2019 | Berend et al. |
| 2019/0142519 A1 | 5/2019 | Siemionow et al. |
| 2019/0175285 A1 | 6/2019 | Siemionow et al. |
| 2019/0183576 A1 | 6/2019 | Fahim et al. |
| 2019/0192230 A1 | 6/2019 | Siemionow et al. |
| 2019/0192232 A1 | 6/2019 | Altmann et al. |
| 2019/0216452 A1 | 7/2019 | Nawana et al. |
| 2019/0231432 A1 | 8/2019 | Amantullab |
| 2019/0231433 A1 | 8/2019 | Amantullah |
| 2019/0246088 A1 | 8/2019 | Casas |
| 2019/0254753 A1 | 8/2019 | Johnson et al. |
| 2019/0273916 A1 | 9/2019 | Benishti et al. |
| 2019/0333480 A1 | 10/2019 | Lang |
| 2019/0380792 A1 | 12/2019 | Poltaretskyi et al. |
| 2020/0000527 A1 | 1/2020 | Cazal |
| 2020/0008877 A1 | 1/2020 | Jo et al. |
| 2020/0038112 A1 | 2/2020 | Amanatullah et al. |
| 2020/0060765 A1 | 2/2020 | Fahim et al. |
| 2020/0060767 A1 | 2/2020 | Lang |
| 2020/0074748 A1 | 3/2020 | de Almeida Barreto et al. |
| 2020/0078100 A1 | 3/2020 | Weinstein et al. |
| 2020/0085511 A1 | 3/2020 | Oezbek et al. |
| 2020/0093388 A1 | 3/2020 | Bouguerra et al. |
| 2020/0093544 A1 | 3/2020 | Azizian |
| 2020/0121413 A1 | 4/2020 | Kosmecki et al. |
| 2020/0138518 A1 | 5/2020 | Lang |
| 2020/0163723 A1 | 5/2020 | Wolf et al. |
| 2020/0163739 A1 | 5/2020 | Messinger et al. |
| 2020/0184729 A1 | 6/2020 | Jones et al. |
| 2020/0188030 A1 | 6/2020 | Kopper et al. |
| 2020/0197107 A1 | 6/2020 | Ryan et al. |
| 2020/0219324 A1 | 7/2020 | Jones et al. |
| 2020/0221060 A1 | 7/2020 | Casas |
| 2020/0229869 A1 | 7/2020 | Dorman |
| 2020/0229877 A1 | 7/2020 | Siemionow et al. |
| 2020/0237256 A1 | 7/2020 | Farshad et al. |
| 2020/0242845 A1 | 7/2020 | Jones et al. |
| 2020/0246074 A1 | 8/2020 | Lang |
| 2020/0246081 A1 | 8/2020 | Johnson et al. |
| 2020/0315734 A1 | 10/2020 | El Amm |
| 2020/0330166 A1 | 10/2020 | Meglan et al. |
| 2020/0352655 A1 | 11/2020 | Freese |
| 2020/0360105 A1 | 11/2020 | Frey et al. |
| 2020/0375666 A1 | 12/2020 | Murphy |
| 2020/0388075 A1 | 12/2020 | Kazanzides et al. |
| 2020/0390503 A1 | 12/2020 | Casas et al. |
| 2020/0409306 A1 | 12/2020 | Gelman et al. |
| 2021/0015559 A1 | 1/2021 | Mahfouz |
| 2021/0022808 A1 | 1/2021 | Lang |
| 2021/0022812 A1 | 1/2021 | Tako et al. |
| 2021/0052348 A1 | 2/2021 | Schwagli et al. |
| 2021/0059760 A1 | 3/2021 | Tseng et al. |
| 2021/0059762 A1 | 3/2021 | Ng et al. |
| 2021/0065451 A1 | 3/2021 | Tseng et al. |
| 2021/0081035 A1 | 3/2021 | West et al. |
| 2021/0085220 A1 | 3/2021 | Poltaretskyi et al. |
| 2021/0090344 A1 | 3/2021 | Geri et al. |
| 2021/0093329 A1 | 4/2021 | Poltaretskyi et al. |
| 2021/0093385 A1 | 4/2021 | Poltaretskyi et al. |
| 2021/0093386 A1 | 4/2021 | Poltaretskyi et al. |
| 2021/0093387 A1 | 4/2021 | Poltaretskyi et al. |
| 2021/0093388 A1 | 4/2021 | Poltaretskvi et al. |
| 2021/0093389 A1 | 4/2021 | Poltaretskyi et al. |
| 2021/0093390 A1 | 4/2021 | Poltaretskyi et al. |
| 2021/0093391 A1 | 4/2021 | Poltaretskyi et al. |
| 2021/0093392 A1 | 4/2021 | Poltaretskyi et al. |
| 2021/0093395 A1 | 4/2021 | Chaoui et al. |
| 2021/0093410 A1 | 4/2021 | Gaborit et al. |
| 2021/0093413 A1 | 4/2021 | Poltaretskyi et al. |
| 2021/0093414 A1 | 4/2021 | Moore et al. |
| 2021/0093415 A1 | 4/2021 | Moore et al. |
| 2021/0097880 A1 | 4/2021 | Kuester et al. |
| 2021/0097886 A1 | 4/2021 | Kuester et al. |
| 2021/0100620 A1 | 4/2021 | Chaoui et al. |
| 2021/0104055 A1 | 4/2021 | Ni et al. |
| 2021/0104325 A1 | 4/2021 | Chaoui et al. |
| 2021/0106386 A1 | 4/2021 | Lang |
| 2021/0121237 A1 | 4/2021 | Fanson et al. |
| 2021/0128251 A1 | 5/2021 | Hettich et al. |
| 2021/0134467 A1 | 5/2021 | Poltaretskyi et al. |
| 2021/0137634 A1 | 5/2021 | Lang |
| 2021/0161613 A1 | 6/2021 | Poltaretskyi et al. |
| 2021/0169578 A1 | 6/2021 | Calloway et al. |
| 2021/0169581 A1 | 6/2021 | Calloway et al. |
| 2021/0169605 A1 | 6/2021 | Calloway et al. |
| 2021/0192759 A1 | 6/2021 | Lang |
| 2021/0241534 A1 | 8/2021 | Avisar et al. |
| 2021/0251717 A1 | 8/2021 | Healy et al. |
| 2021/0267698 A1 | 9/2021 | Siemionow et al. |
| 2021/0290319 A1 | 9/2021 | Poltaretskyi et al. |
| 2021/0327304 A1 | 10/2021 | Buras et al. |
| 2021/0338337 A1 | 11/2021 | Calloway et al. |
| 2021/0346115 A1 | 11/2021 | Dulin et al. |
| 2021/0346117 A1 | 11/2021 | Poltaretskyi et al. |
| 2021/0353383 A1 | 11/2021 | Kumar et al. |
| 2021/0361358 A1 | 11/2021 | May et al. |
| 2021/0369353 A1 | 12/2021 | Nikou et al. |
| 2022/0007006 A1 | 1/2022 | Healy et al. |
| 2022/0008135 A1 | 1/2022 | Frielinghaus et al. |
| 2022/0012949 A1 | 1/2022 | Jones et al. |
| 2022/0020219 A1 | 1/2022 | Chav et al. |
| 2022/0039881 A1 | 2/2022 | Avisar et al. |
| 2022/0051483 A1 | 2/2022 | Nevins et al. |
| 2022/0051484 A1 | 2/2022 | Jones et al. |
| 2022/0071729 A1 | 3/2022 | Healy et al. |
| 2022/0079675 A1 | 3/2022 | Lang |
| 2022/0084298 A1 | 3/2022 | Jones et al. |
| 2022/0087749 A1 | 3/2022 | Marti et al. |
| 2022/0117669 A1 | 4/2022 | Nikou et al. |
| 2022/0125519 A1 | 4/2022 | Slagmolen et al. |
| 2022/0151704 A1 | 5/2022 | Nikou |
| 2022/0151705 A1 | 5/2022 | Nikou et al. |
| 2022/0155854 A1 | 5/2022 | Gibby et al. |
| 2022/0160439 A1 | 5/2022 | Ryan et al. |
| 2022/0168051 A1 | 6/2022 | Ryan et al. |
| 2022/0192776 A1 | 6/2022 | Gibby et al. |
| 2022/0202493 A1 | 6/2022 | Gibby et al. |
| 2022/0218420 A1 | 7/2022 | Qian et al. |
| 2022/0226045 A1 | 7/2022 | Amanatullah et al. |
| 2022/0241018 A1 | 8/2022 | Dorman |

(56) References Cited

U.S. PATENT DOCUMENTS

| | | |
|---|---|---|
| 2022/0249171 A1 | 8/2022 | Lang |
| 2022/0265355 A1 | 8/2022 | Ferrante et al. |
| 2022/0273450 A1 | 9/2022 | Steines et al. |
| 2022/0280249 A1 | 9/2022 | Calloway et al. |
| 2022/0287676 A1 | 9/2022 | Steines et al. |
| 2022/0291741 A1 | 9/2022 | Gibby et al. |
| 2022/0313386 A1 | 10/2022 | Healy et al. |
| 2022/0330166 A1 | 10/2022 | Nory et al. |
| 2022/0346970 A1 | 11/2022 | Nikou |
| 2022/0361955 A1 | 11/2022 | Signoretti et al. |
| 2023/0000556 A1 | 1/2023 | McKinnon et al. |
| 2023/0000570 A1 | 1/2023 | Marti et al. |
| 2023/0018541 A1 | 1/2023 | Tanzer et al. |
| 2023/0038678 A1 | 2/2023 | Lang |
| 2023/0056596 A1 | 2/2023 | Farley et al. |
| 2023/0074630 A1 | 3/2023 | Knopf |
| 2023/0085387 A1 | 3/2023 | Jones et al. |
| 2023/0113383 A1 | 4/2023 | Gonzalez et al. |
| 2023/0118746 A1 | 4/2023 | Hettich et al. |
| 2023/0131515 A1 | 4/2023 | Oezbek et al. |
| 2023/0149084 A1 | 5/2023 | Azimi et al. |
| 2023/0149099 A1 | 5/2023 | Murphy |
| 2023/0165639 A1 | 6/2023 | Dulin et al. |
| 2023/0165640 A1 | 6/2023 | Dulin et al. |
| 2023/0200917 A1 | 6/2023 | Calloway et al. |
| 2023/0233257 A1 | 7/2023 | Young et al. |
| 2023/0233258 A1 | 7/2023 | Young et al. |
| 2023/0233259 A1 | 7/2023 | Young et al. |
| 2023/0274517 A1 | 8/2023 | Navab et al. |
| 2023/0293237 A1 | 9/2023 | Samaha et al. |
| 2023/0293238 A1 | 9/2023 | Cardinale et al. |
| 2023/0293259 A1 | 9/2023 | Lomeli |
| 2023/0301723 A1 | 9/2023 | Johnson et al. |
| 2023/0355311 A1 | 11/2023 | Moctezuma De la Barrera |
| 2023/0404678 A1 | 12/2023 | Denissen et al. |

FOREIGN PATENT DOCUMENTS

| | | |
|---|---|---|
| CN | 102985025 A | 3/2013 |
| CN | 104025119 A | 9/2014 |
| CN | 105939687 A | 9/2016 |
| EP | 1356413 A2 | 10/2003 |
| EP | 1395195 A1 | 3/2004 |
| EP | 1406203 A2 | 4/2004 |
| EP | 1676539 A1 | 5/2006 |
| EP | 1722705 A2 | 11/2006 |
| EP | 1743592 A1 | 1/2007 |
| EP | 1395194 B1 | 8/2007 |
| EP | 1872737 A2 | 1/2008 |
| EP | 1981409 A2 | 10/2008 |
| EP | 2119409 A1 | 11/2009 |
| EP | 2129317 A1 | 12/2009 |
| EP | 2175418 A2 | 4/2010 |
| EP | 2243445 A2 | 10/2010 |
| EP | 2319450 A1 | 5/2011 |
| EP | 2471483 A1 | 7/2012 |
| EP | 3097448 A1 | 11/2016 |
| EP | 3280344 A2 | 2/2018 |
| EP | 3355769 A1 | 8/2018 |
| EP | 3361979 A1 | 8/2018 |
| EP | 3420413 A1 | 1/2019 |
| EP | 3426179 A1 | 1/2019 |
| EP | 3443888 A1 | 2/2019 |
| EP | 3443923 A1 | 2/2019 |
| EP | 3443924 A1 | 2/2019 |
| EP | 3445048 A1 | 2/2019 |
| EP | 3498212 A1 | 6/2019 |
| EP | 3505133 A1 | 7/2019 |
| EP | 3512452 A1 | 7/2019 |
| EP | 3533409 A1 | 9/2019 |
| EP | 3566212 A1 | 11/2019 |
| EP | 3568070 A1 | 11/2019 |
| EP | 3592273 A1 | 1/2020 |
| EP | 3596658 A1 | 1/2020 |
| EP | 3609424 A1 | 2/2020 |
| EP | 3612126 A1 | 2/2020 |
| EP | 3612127 A1 | 2/2020 |
| EP | 3613055 A1 | 2/2020 |
| EP | 3618748 A1 | 3/2020 |
| EP | 3654867 A1 | 5/2020 |
| EP | 3658233 A1 | 6/2020 |
| EP | 3668426 A1 | 6/2020 |
| EP | 3125759 B1 | 1/2021 |
| EP | 3810020 A1 | 4/2021 |
| EP | 3861956 A1 | 8/2021 |
| EP | 3996622 A2 | 5/2022 |
| EP | 4103088 A1 | 12/2022 |
| FR | 3062297 A1 | 8/2018 |
| WO | 2002029700 A2 | 4/2002 |
| WO | 2002100285 A1 | 12/2002 |
| WO | 2005039430 A2 | 5/2005 |
| WO | 2005087125 A2 | 9/2005 |
| WO | 2007092841 A2 | 8/2007 |
| WO | 2007096741 A2 | 8/2007 |
| WO | 2007147235 A1 | 12/2007 |
| WO | 2008008893 A2 | 1/2008 |
| WO | 2008109751 A2 | 9/2008 |
| WO | 2015110859 A1 | 7/2015 |
| WO | 2016004993 A1 | 1/2016 |
| WO | 2016115423 A1 | 7/2016 |
| WO | 2016162789 A2 | 10/2016 |
| WO | 2017058710 A1 | 4/2017 |
| WO | 2017066373 A1 | 4/2017 |
| WO | 2017075122 A1 | 5/2017 |
| WO | 2017145155 A1 | 8/2017 |
| WO | 2017160651 A1 | 9/2017 |
| WO | 2017/221257 A1 | 12/2017 |
| WO | 2018052966 A1 | 3/2018 |
| WO | 2018057564 A1 | 3/2018 |
| WO | 2018060304 A1 | 4/2018 |
| WO | 2018129094 A1 | 7/2018 |
| WO | 2018132804 A1 | 7/2018 |
| WO | 2018148379 A1 | 8/2018 |
| WO | 2018164909 A1 | 9/2018 |
| WO | 2018165323 A1 | 9/2018 |
| WO | 2018169891 A1 | 9/2018 |
| WO | 2018170181 A1 | 9/2018 |
| WO | 2018189725 A1 | 10/2018 |
| WO | 2018195456 A1 | 10/2018 |
| WO | 2018195463 A1 | 10/2018 |
| WO | 2018195529 A1 | 10/2018 |
| WO | 2018200767 A1 | 11/2018 |
| WO | 2018203304 A1 | 11/2018 |
| WO | 2018/220050 A1 | 12/2018 |
| WO | 2019021236 A1 | 1/2019 |
| WO | 2019032143 A1 | 2/2019 |
| WO | 2019036524 A1 | 2/2019 |
| WO | 2019051080 A1 | 3/2019 |
| WO | 2019051464 A1 | 3/2019 |
| WO | 2019118215 A1 | 6/2019 |
| WO | 2019118216 A1 | 6/2019 |
| WO | 2019132781 A1 | 7/2019 |
| WO | 2019139931 A1 | 7/2019 |
| WO | 2019141704 A1 | 7/2019 |
| WO | 2019148154 A1 | 8/2019 |
| WO | 2019152269 A1 | 8/2019 |
| WO | 2019211741 A1 | 11/2019 |
| WO | 2019213777 A1 | 11/2019 |
| WO | 2019217795 A1 | 11/2019 |
| WO | 2019245848 A1 | 12/2019 |
| WO | 2019245849 A1 | 12/2019 |
| WO | 2019245851 A1 | 12/2019 |
| WO | 2019245852 A1 | 12/2019 |
| WO | 2019245853 A1 | 12/2019 |
| WO | 2019245854 A1 | 12/2019 |
| WO | 2019245856 A1 | 12/2019 |
| WO | 2019245857 A1 | 12/2019 |
| WO | 2019245860 A1 | 12/2019 |
| WO | 2019245861 A1 | 12/2019 |
| WO | 2019245862 A1 | 12/2019 |
| WO | 2019245864 A1 | 12/2019 |
| WO | 2019245865 A1 | 12/2019 |
| WO | 2019245866 A1 | 12/2019 |
| WO | 2019245867 A1 | 12/2019 |

(56) References Cited

FOREIGN PATENT DOCUMENTS

| WO | 2019245868 A1 | 12/2019 |
|---|---|---|
| WO | 2019245869 A1 | 12/2019 |
| WO | 2019245870 A1 | 12/2019 |
| WO | 2020010034 A1 | 1/2020 |
| WO | 2020011688 A1 | 1/2020 |
| WO | 2020056086 A1 | 3/2020 |
| WO | 2020079098 A1 | 4/2020 |
| WO | 2020087141 A1 | 5/2020 |
| WO | 2020102665 A1 | 5/2020 |
| WO | 2020109903 A1 | 6/2020 |
| WO | 2020109904 A1 | 6/2020 |
| WO | 2020148292 A1 | 7/2020 |
| WO | 2020180917 A1 | 9/2020 |
| WO | 2020186194 A1 | 9/2020 |
| WO | 2020220208 A1 | 11/2020 |
| WO | 2020231655 A1 | 11/2020 |
| WO | 2020243483 A1 | 12/2020 |
| WO | 2020253280 A1 | 12/2020 |
| WO | 2021007418 A2 | 1/2021 |
| WO | 2021011760 A1 | 1/2021 |
| WO | 2021016429 A1 | 1/2021 |
| WO | 2021163039 A1 | 8/2021 |
| WO | 2022147591 A1 | 7/2022 |
| WO | 2023281477 A1 | 1/2023 |
| WO | 2023039032 A1 | 3/2023 |
| WO | 2023086592 A2 | 5/2023 |
| WO | 2023110124 A1 | 6/2023 |

OTHER PUBLICATIONS

US 9,451,972 B2, 09/2016, Lang et al. (withdrawn)
Notice of Acceptance from counterpart Australian Application No. 2020404991 dated Oct. 5, 2023, 7 pp.
Response to Office Action dated Jun. 22, 2023, from counterpart Australian Application No. 2020404991 filed Sep. 21, 2023, 134 pp.
Office Action from counterpart Australian Application No. 2020404991 dated Jun. 22, 2023, 4 pp.
Boileau et al., "Angled BIO-RSA (Bony-Increased Offset-Reverse Shoulder Arthroplasty): a Solution for the Management of Glenoid Bone Loss and Erosion," Journal of Shoulder and Elbow Surgery, vol. 26, No. 12, 2017, pp. 2133-2142.
Dallalana et al., "Accuracy of patient-specific instrumentation in anatomic and reverse total shoulder arthroplasty", International Journal Shoulder Surgery, vol. 10, Apr. 2016, pp. 59-66.
DuPuy Orthopaedics, Inc., "Surgical Technique: Resurfacing Humeral Head Implant", Trauma & Extremities Group, 2004, 4 pp. published at http://www. rpa.spot. pUgetdoc/21 b 7babe-dbb4-4ea6-a2bc-7 dac59aae217/Giobai-Shoulder-Resurfacing-Surgical-Tecnique-( DeP. aspx (Year: 2004).
Walch et al., "Three-dimensional planning and use of patient-specific guides improve glenoid component position: an in vitro study", Journal of Shoulder and Elbow Surgery, vol. 24, No. 2, Feb. 2015, pp. 302-309.
Wylie J.D. et al., "Planning Software and Patient-Specific Instruments in Shoulder Arthroplasty," Current Reviews in Musculoskeletal Medicine, vol. 9, Mar. 2016, 9 pp.
"Aurora—The Aurora Electromagnetic Tracking System," NDI, Nov. 2013, 8 pp.
"Blueprint 3d Planning Software + PSI," Wright Medical Group, retrieved from https://www.wright.com/blueprint-3d-planning-psi-system on Oct. 15, 2020, 9 pp.
"HoloLens 2," Microsoft HoloLens, retrieved from https://www.microsoft.com/en-us/hololens Oct. 15, 2020, 5 pp.
"In'Tech Medical launches Wayvio, a new intelligent solution to enhance the reliability of surgical instruments and streamline medical device logistics," accessed from https://intech-medical.com/component/content/article/36-press-releases/58-in-tech-medical-launches-wayvio-a-new- intelligent-solution-to-enhance-the . . . on or about Nov. 12, 2018, 4 pp.
"Wayvio," Innovate How You Operate, accessed from http://www.wayvio.com/#features on or about Nov. 12, 2018, 5 pp.
"Work together from anywhere," Microsoft Dynamics 365 Remote Assist, downloaded from https://dynamics.microsoft.com/en-us/mixed-reality/remote-assist/ on Aug. 24, 2020, 8 pp.
Abdelhameed et al., "Neural network-based shoulder instability diagnosis modelling for robot-assisted rehabilitation systems," Systems Science & Control Engineering, ISSN: 2164-2583, Oct. 13, 2015, 11 pp.
Anogianakis et al., "Medical emergency aid through telematics: design, implementation guidelines and analysis of user requirements for the Mermaid project," Journal of Medical Informatics, vol. 52, Oct. 1998, 11 pp.
BIO-RSA, "Surgical Technique," Tornier, Jul. 2010, 20 pp.
Birkfellner et al., "Chapter 2—Tracking Devices," from Image-Guided Interventions, Springer Science, 2008, 23 pp. (Applicant points out, in accordance with MPEP 609.04(a), that the year of publication, 2008, is sufficiently earlier than the effective U.S. filing date, so that the particular month of publication is not in issue.).
Cho et al., "A Multi-ring Color Fiducial System and a Rule-Based Detection Method for Scalable Fiducial-tracking Augmented Reality," Proceedings of the International Conference of Virtual Reality Annual International Symposium, Feb. 1998, 15 pp.
Daftry et al., "Flexible and User-Centric Camera Calibration using Planar Fiducial Markers," British Machine Vision Conference, Sep. 9-13, 2013, 13 pp.
Daley, S., "The Cutting Edge: 10 Companies Bringing Virtual Reality & AR to the OR," Tech Jobs by Built In, Jun. 24, 2020, 13 pp.
Franz et al., "Electromagnetic Tracking in Medicine—A Review of Technology, Validation, and Applications," IEEE Transactions on Medical Imaging, vol. 33, No. 8, Aug. 2014, pp. 1702-1725.
Gackowski et al., "Development, Implementation, and Multicenter Clinical Validation of the TeleDICOM-Advanced, Interactive Teleconsultation System," Journal of Digital Imaging, vol. 24. No 3, Jun. 2011, pp. 541-551.
Giannotti et al., "Indices of risk assessment of fracture of the proximal humerus," Clinical Cases in Mineral and Bone Metabolism, published online May 2012, 3 pp.
Haramiishi et al., "CT and SPECT image fusion using external fiducial markers for detection of the sentinel lymph nodes in breast cancer," International Journal of Diagnostic Imaging, vol. 4, No. 2, accepted Mar. 28, 2017, 5 pp.
Inbone® II Total Ankle System—Surgical Technique, from Wright Medical Technology, Inc., Aug. 2015, 64 pp.
Infinity® Total Ankle System—Surgical Technique, from Wright Medical Technology, Inc., Aug. 2015, 76 pp.
International Preliminary Report on Patentability from International Application No. PCT/US2020/065380 dated Jun. 30, 2022, 12 pp.
Koulechov, "Leistungssteuerung chirurgischer Instrumente in der Kopf-Chirurgie," Technical University of Munich, In the German language only, Jan. 1, 2006, 152 p. (Relevant sections figures 22, 24, 28; p. 40-p. 50).
Kruger, "Ein modulares Navigationssystem für die dentale Implantologie," Nov. 16, 2006, 142 pp. (English language unavailable; relevant section figure 27; p. 58, p. 83 See Int'l Search Report and Written Opinion for PCT/US2019/036992 for explanation of relevance.).
Maresceaux et al., "Bildfusion, virtuelle Realitat, Robotik und Navigation," English Abstract Only, Springer-Verlag. May 2002, 6 pp.
Mather et al., "Proximal humerus cortical bone thickness correlates with bone mineral density and can clinically rule out osteoporosis," Journal of Shoulder and Elbow Surgery, Jun. 2013, 7 pp.
Miller et al., "Augmented Reality and Telestrated Surgical Support for Point of Injury Combat Casualty Care: A Feasibility Study," International Conference on Augmented Cognition, Conference paper available online Jun. 3, 2018, 11 pp.
Nakao et al., "Augmented Endoscopic Images Overlaying Shape Changes in Bone Cutting Procedures," PLoS ONE, vol. 11, No. 9, Sep. 2016, 20 pp.
Poltaretskyi et al., "Prediction of the pre-morbid 3D anatomy of the proximal humerus based on the statistical shape modelling," The British Editorial Society of Bone & Joint Surgery, vol. 99-B, No. 7, Jul. 2017, 2 pp.

(56) References Cited

OTHER PUBLICATIONS

Prophecy Infinity Pre-Operative navigation Guides—Surgical Technique, by Wright Medical Technology, Inc., Oct. 2014, 80 pp.
Prosecution History from U.S. Appl. No. 17/117,779, dated Sep. 30, 2021 through Sep. 29, 2022, 87 pp.
Public Workshop-Medical Extended Reality: Toward Best Evaluation Practices for Virtual and Augmented Reality in Medicine, by United States of America Department of Health and Human Services Food and Drug Administration-Center for Devices and Radiological Health, Mar. 5, 2020, 188 pp.
Scalise et al., "Inter-rater reliability of an arthritic glenoid morphology classification system," Journal of Shoulder and Elbow Surgery, Jul./Aug. 2008, 3 pp.
Shukla et al., "Intraobserver and interobserver reliability of the modified Walch classification using radiographs and computed tomography," Journal of Shoulder and Elbow Surgery, vol. 28, Issue 4, Apr. 2019, available online Dec. 6, 2018, 6 pp.
Tan et al., "6D Object Pose Estimation with Depth Images: A Seamless Approach for Robotic Interaction and Augmented Reality." Sep. 5, 2017, 4 pp.
Tang et al., "Physio@Home: Exploring Visual Guidance and Feedback Techniques for Physiotherapy Exercises," Home Physiotherapy & Rehabilitation, Apr. 18, 2015, 10 pp.
Tingart et al., "The cortical thickness of the proximal humeral diaphysis predicts bone mineral density of the proximal humerus," The Journal of Bone & Joint Surgery, vol. 85-B, No. 4, May 2003, accepted after revision Sep. 24, 2002, 7 pp.
Traub et al., "Advanced Display and Visualization Concepts for Image Guided Surgery," Journal of Display Technology, vol. 4, No. 4, Dec. 2008, 8 pp.
U.S. Appl. No. 17/117,817, filed Dec. 10, 2020, naming inventors Poltaretskyi et al.
U.S. Appl. No. 17/221,320, filed Apr. 2, 2021, naming inventors Poltaretskyi et al.
VanAmerongen, R., "How to run a demo with Microsoft Hololens and share your screen," from AMIS Technology Blog, AMIS, Data Driven Blog, dated Dec. 5, 2016, downloaded from https://technology.amis.nl/2016/12/05/demo-microsoft-hololens-and-share-your-screen/ on Oct. 21, 2020, 15 pp.
Wang et al., "Fiducial-Aided Robust Positioning of Optical Freeform Surfaces," Micromachines, accessed from www.mdpi.com/journal/micromachines, Jan. 30, 2018, 10 pp.
Wright "Aequalis Reversed II Shoulder System," Tornier, CAW-2145, May 12, 2016, 52 pp.
Wright Medical, "BluePrint Video-Wright Medical Announces the Acquisition of IMASCAP SAS", accessed from www.imascap.com/wp-content/uploads/2017/12/blueprintvid.mp4, Dec. 14, 2017, 9 pp.
Wright, "Aequalis Ascend Flex, Convertible Shoulder System," CAW-5396, Tornier, Mar. 2017, 88 pp.
Wright, "Aequalis Perform, Anatomic Glenoid System," CAW-5233, Tornier, Jul. 2017, 36 pp.
Wright, "BIO-RSA Bony Increased Offset-Reversed Shoulder Arthroplasty," Torier, CAW-2150, Feb. 12, 2016, 20 pp.
Wright, "BluePrint, 3d Planning + PSI," User Manual V2.1, Tornier, CAW-8754, Nov. 2017, 18 pp.
Youtube, "06 IMASCAP," uploaded by Cesim Sante on Jun. 3, 2015, accessed from https://www.youtube.com/watch?v=ZT8QSZTF_-Y, 1 pp.
Youtube, "Mixed Reality usage in orthopedic surgery," uploaded by Sergii Poltaretskyi on Feb. 20, 2019, accessed from https://www.youtube.com/watch?v=ewMIgku_cug&feature=youtu.be, 7 pp.
Corrected Notice of Allowance from U.S. Appl. No. 17/117,756 dated Jan. 17, 2023, 2 pp.
Notice of Allowance from U.S. Appl. No. 17/117,756 dated Jan. 6, 2023, 7 pp.
Response to Communication Pursuant to Rules 161(1) and 162 EPC dated Jul. 26, 2022, from counterpart European Application No. 20842098.4, filed Jan. 26, 2023, 19 pp.
Communication pursuant to Article 94(3) EPC from counterpart European Application No. 20842098.4 dated Sep. 16, 2024, 10 pp.
"ArUco: a Minimal Library for Augmented Reality Applications Based on OpenCV," retrieved from https://www.uco.es/investiga/grupos/ava/node/26, on Nov. 5, 2019, 2 pp.
Boissonnat, "Shape Reconstruction from Planar Cross Sections," Computer Vision, Graphics, and Image Processing, vol. 44, Oct. 1988, 29 pp.
International Search Report and Written Opinion of International Application No. PCT/US2020/065380, dated May 12, 2021, 18 pp.
Invitation to Pay Additional Fees and, Where Applicable, Protest Fee from International Application No. PCT/US2020/065380, dated Mar. 18, 2021, 14 pp.
Marker et al., "Contour-Based Surface Reconstruction using Implicit Curve Fitting, and Distance Field Filtering and Interpolation," Volume Graphics, Jan. 2006, 9 pp.
Nguyen et al., "A New Segmentation Method for MRI Images of the Shoulder Joint," Fourth Canadian Conference on 6 Computer and Robot Vision(CRV'07), May 28-30, 2007, 8 pp.
Response to Communication pursuant to Article 94(3) EPC dated Sep. 16, 2024, from counterpart European Application No. 20842098.4 filed Mar. 3, 2025, 17 pp.

\* cited by examiner

SURGICAL GUIDANCE FOR SURGICAL TOOLS

This patent application is a national stage entry of PCT Application No. PCT/US2020/065380, filed 16 Dec. 2020, which claims the benefit of U.S. Provisional Patent Application No. 62/949,794, filed Dec. 18, 2019, the entirety of which are incorporated by reference herein.

BACKGROUND

Many types of surgical procedures involve inserting a surgical item into a bone of a patient. For example, a surgical procedure may include using a drill or impactor to create a hole, insert a pin, insert a screw, or insert a surgical nail into a bone of a patient. For instance, in one specific example, a surgeon may use a drill to insert a guide pin into a glenoid of a patient. Proper positioning of the surgical tool and insertion component may be a significant factor in the success of a surgical procedure. For instance, drilling a hole at an incorrect angle may lead to surgical complications.

SUMMARY

This disclosure describes a variety of techniques for providing mixed reality (MR)-based surgical guidance, such as preoperative and intraoperative surgical guidance. The techniques described in this disclosure may be used independently or in various combinations In one example, this disclosure describes a physical tracking tool that includes a main body defining a channel configured to receive a tool, the channel having a longitudinal axis; and one or more physical tracking features attached to the main body, each physical tracking feature comprising a plurality of planar faces, each planar face of the plurality of planar faces including different a graphical pattern of a plurality of graphical patterns.

In another example, this disclosure describes a method including obtaining image data generated by one or more cameras of a visualization device worn on a head of a surgeon, wherein the image data depicts a scene including a physical tracking tool comprising one or more physical tracking features that each comprise a plurality of planar faces, each planar face of the plurality of planar faces including different a graphical pattern of a plurality of pre-determined graphical patterns; determining, based on the sensor data, coordinates of a plurality of points on the graphical patterns; and determining, based on the determined coordinates and one or more properties of the physical tracking tool, a position and/or an orientation of an insertable object guided by the physical tracking tool.

In another example, this disclosure describes a computer-implemented method for providing guidance during a surgical procedure, the method comprising: determining, by one or more processors of a surgical assistance system during the surgical procedure, a 3-dimensional orientation of an insertable item, wherein the insertable item is a surgical item to be inserted into a bone of the patient during the surgical procedure; including, by the one or more processors during the surgical procedure, a first virtual guide in an MR scene that includes the bone of the patient, the first virtual guide including a first current angle marker that indicates on the first virtual guide an orientation of the insertable item in a first plane; including, by the one or more processors during the surgical procedure, a second virtual guide in the MR scene, the second virtual guide including a second current angle marker that indicates on the second virtual guide an orientation of the insertable item in a second plane orthogonal to the first plane; determining, by the one or more processors, an updated position of the insertable item; and updating, by the one or more processors, positions of one or more of the first and second current angle markers based on the updated position of the insertable item.

In another example, this disclosure describes a computing system comprising a mixed reality (MR) visualization device; and one or more processors implemented in circuitry, the one or more processors configured to: determine, during the surgical procedure, a 3-dimensional orientation of an insertable item, wherein the insertable item is a surgical item to be inserted into a bone of the patient during the surgical procedure; cause the MR visualization device to include, during the surgical procedure, a first virtual guide in an MR scene that includes the bone of the patient, the first virtual guide including a first current angle marker that indicates on the first virtual guide an orientation of the insertable item in a first plane; cause the MR visualization device to include, during the surgical procedure, a second virtual guide in the MR scene, the second virtual guide including a second current angle marker that indicates on the second virtual guide an orientation of the insertable item in a second plane orthogonal to the first plane; determine an updated position of the insertable item; and cause the MR visualization device to update positions of one or more of the first and second current angle markers based on the updated position of the insertable item.

In another example, this disclosure describes a computing system that includes: a mixed reality (MR) visualization device; and one or more processors implemented in circuitry, the one or more processors configured to: determine, during the surgical procedure, a 3-dimensional orientation of an insertable item, wherein the insertable item is a surgical item to be inserted into a bone of the patient during the surgical procedure; cause the MR visualization device to include, during the surgical procedure, a virtual window in a mixed reality (MR) scene that includes the bone of the patient, the virtual window including a virtual model of the bone from a perspective aligned with a lengthwise axis of the insertable item; determine, during the surgical procedure, an updated position of the insertable item; and cause the MR visualization device to update, during the surgical procedure, an orientation of the virtual model of the bone so that the virtual window continues to show the virtual model of the bone from the perspective aligned with the lengthwise axis of the insertable item.

In another example, this disclosure describes a computer-implemented method for providing guidance during a surgical procedure, the method comprising: including, by a surgical assistance system comprising one or more processors and a mixed reality (MR) visualization device, during the surgical procedure, in a mixed reality (MR) scene, a virtual bone model, a virtual target axis object, and a virtual current axis object at locations removed from a real-world bone in the MR scene, wherein: the virtual bone model comprises a 3-dimensional (3D) virtual model of the real-world bone or a portion of the real-world bone, the virtual target axis object has an orientation relative to the virtual bone model that corresponds to an orientation of a planned insertion axis of an insertable object relative to the real-world bone, the virtual current axis object has an orientation relative to the virtual bone model that corresponds to a current orientation of a lengthwise axis of the insertable object relative to the real-world bone; determining, by the surgical assistance system during the surgical procedure, an updated orientation of lengthwise axis of the insertable item;

and updating, by the surgical assistance system during the surgical procedure, the orientation of the virtual current axis object relative to the virtual bone model to correspond to the updated orientation of the lengthwise axis of the insertable item.

In another example, this disclosure describes a surgical assistance system that includes: one or more processors; and a mixed reality (MR) visualization device configured to include, during the surgical procedure, in a MR scene, a virtual bone model, a virtual target axis object, and a virtual current axis object at locations removed from a real-world bone in the MR scene, wherein: the virtual bone model comprises a 3-dimensional (3D) virtual model of the real-world bone or a portion of the real-world bone, the virtual target axis object has an orientation relative to the virtual bone model that corresponds to an orientation of a planned insertion axis of an insertable object relative to the real-world bone, the virtual current axis object has an orientation relative to the virtual bone model that corresponds to a current orientation of a lengthwise axis of the insertable object relative to the real-world bone, wherein the one or more processors are configured to determine, during the surgical procedure, an updated orientation of the lengthwise axis of the insertable item; and the MR visualization device is further configured to update, during the surgical procedure, the orientation of the virtual current axis object relative to the virtual bone model to correspond to the updated orientation of the lengthwise axis of the insertable item.

The details of various examples of the disclosure are set forth in the accompanying drawings and the description below. Various features, objects, and advantages will be apparent from the description, drawings, and claims.

DETAILED DESCRIPTION

Figure 1:
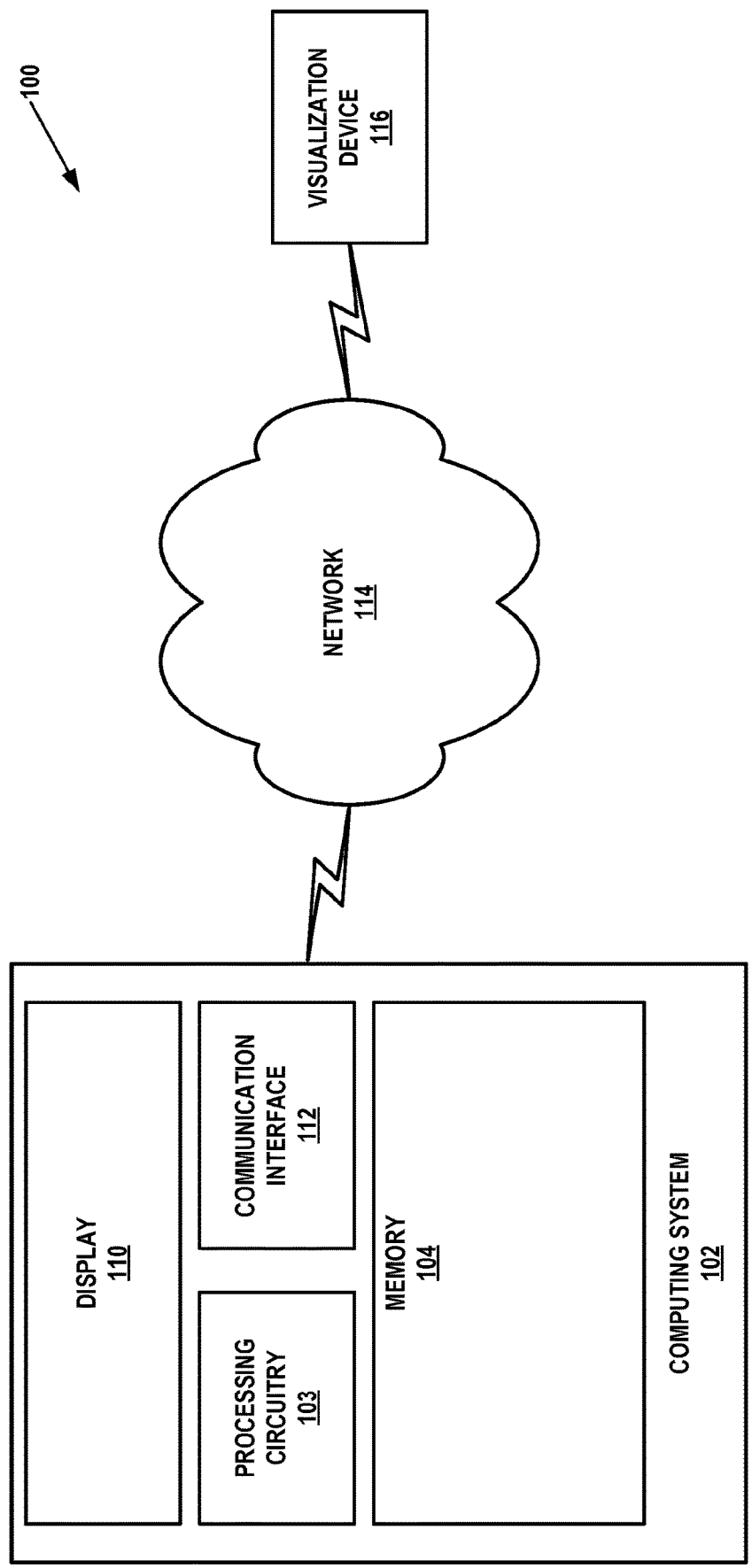
FIG. 1 is a block diagram of a surgical system according to an example of this disclosure.

Certain examples of this disclosure are described with reference to the accompanying drawings, wherein like reference numerals denote like elements. It should be understood, however, that the accompanying drawings illustrate only the various implementations described herein and are not meant to limit the scope of various technologies described herein. The drawings show and describe various examples of this disclosure.

In the following description, numerous details are set forth to provide an understanding of the present invention. However, it will be understood by those skilled in the art that the present invention may be practiced without these details and that numerous variations or modifications from the described examples may be possible.

A surgical procedure may involve inserting a surgical item into a bone of a patient. For example, the surgical procedure may involve using a drill or hammer is insert a surgical item, such as a drill bit, pin, screw, or nail into a bone of a patient. In such cases, because the surgical item is inserted into the bone of the patient, this disclosure may refer to such a surgical item as an insertable item.

Accordingly, this disclosure describes systems and methods associated with using mixed reality (MR) to assist with creation, implementation, verification, and/or modification of a surgical plan before and during a surgical procedure. Visualization tools other than or in addition to mixed reality visualization systems may be used in accordance with techniques of this disclosure. A surgical plan, e.g., as generated by the BLUEPRINT™ system or another surgical planning platform, may include information defining a variety of features of a surgical procedure, such as features of particular surgical procedure steps to be performed on a patient by a surgeon according to the surgical plan including, for example, bone or tissue preparation steps and/or steps for selection, modification and/or placement of implant components. Such information may include, in various examples, dimensions, shapes, angles, surface contours, and/or orientations of implant components to be selected or modified by surgeons, dimensions, shapes, angles, surface contours and/or orientations to be defined in bone or tissue by the surgeon in bone or tissue preparation steps, and/or positions, axes, planes, angle and/or entry points defining placement of implant components by the surgeon relative to patient bone or tissue. Information such as dimensions, shapes, angles, surface contours, and/or orientations of anatomical features of the patient may be derived from imaging (e.g., x-ray, CT, MRI, ultrasound or other images), direct observation, or other techniques. In some examples, the virtual In this disclosure, the term "mixed reality" (MR) refers to the presentation of virtual objects such that a user sees images that include both real, physical objects and virtual objects. Virtual objects may include text, 2-dimensional surfaces, 3-dimensional models, or other user-perceptible elements that are not actually present in the physical, real-world environment in which they are presented as coexisting. In addition, virtual objects described in various examples of this disclosure may include graphics, images, animations or videos, e.g., presented as 3D virtual objects or 2D virtual objects. Virtual objects may also be referred to as virtual elements. Such elements may or may not be analogs of real-world objects. In some examples, in mixed reality, a camera may capture images of the real world and modify the images to present virtual objects in the context of the real world. In such examples, the modified images may be displayed on a screen, which may be head-mounted, hand-held, or otherwise viewable by a user. This type of mixed reality is increasingly common on smartphones, such as where a user can point a smartphone's camera at a sign written in a foreign language and see in the smartphone's screen a translation in the user's own language of the sign superimposed on the sign along with the rest of the scene captured by the camera. In some examples, in mixed reality, see-through (e.g., transparent) holographic lenses, which may be referred to as waveguides, may permit the user to view real-world objects, i.e., actual objects in a real-world environment, such as real anatomy, through the holographic lenses and also concurrently view virtual objects.

The Microsoft HOLOLENS™ headset, available from Microsoft Corporation of Redmond, Washington, is an example of a MR device that includes see-through holographic lenses, sometimes referred to as waveguides, that permit a user to view real-world objects through the lens and concurrently view projected 3D holographic objects. The Microsoft HOLOLENS™ headset, or similar waveguide-based visualization devices, are examples of an MR visualization device that may be used in accordance with some examples of this disclosure. Some holographic lenses may present holographic objects with some degree of transparency through see-through holographic lenses so that the user views real-world objects and virtual, holographic objects. In some examples, some holographic lenses may, at times, completely prevent the user from viewing real-world objects and instead may allow the user to view entirely virtual environments. The term mixed reality may also encompass scenarios where one or more users are able to perceive one or more virtual objects generated by holographic projection. In other words, "mixed reality" may encompass the case where a holographic projector generates holograms of elements that appear to a user to be present in the user's actual physical environment.

In some examples, in mixed reality, the positions of some or all presented virtual objects are related to positions of physical objects in the real world. For example, a virtual object may be tethered to a table in the real world, such that the user can see the virtual object when the user looks in the direction of the table but does not see the virtual object when the table is not in the user's field of view. In some examples, in mixed reality, the positions of some or all presented virtual objects are unrelated to positions of physical objects in the real world. For instance, a virtual item may always appear in the top right of the user's field of vision, regardless of where the user is looking.

Augmented reality (AR) is similar to MR in the presentation of both real-world and virtual elements, but AR generally refers to presentations that are mostly real, with a few virtual additions to "augment" the real-world presentation. For purposes of this disclosure, MR is considered to include AR. For example, in AR, parts of the user's physical environment that are in shadow can be selectively brightened without brightening other areas of the user's physical environment. This example is also an instance of MR in that the selectively-brightened areas may be considered virtual objects superimposed on the parts of the user's physical environment that are in shadow.

Accordingly, systems and methods are also described herein that can be incorporated into an intelligent surgical planning system, such as artificial intelligence systems to assist with planning, implants with embedded sensors (e.g., smart implants) to provide postoperative feedback for use by the healthcare provider and the artificial intelligence system, and mobile applications to monitor and provide information to the patient and the healthcare provider in real-time or near real-time.

Visualization tools are available that utilize patient image data to generate three-dimensional models of bone contours to facilitate preoperative planning for joint repairs and replacements. These tools allow surgeons to design and/or select surgical guides and implant components that closely match the patient's anatomy. These tools can improve surgical outcomes by customizing a surgical plan for each patient. An example of such a visualization tool for shoulder repairs is the BLUEPRINT™ system available from Wright Medical Technology, Inc. The BLUEPRINT™ system provides the surgeon with two-dimensional planar views of the bone repair region as well as a three-dimensional virtual model of the repair region. The surgeon can use the BLUEPRINT™ system to select, design or modify appropriate implant components, determine how best to position and orient the implant components and how to shape the surface of the bone to receive the components, and design, select or modify surgical guide tool(s) or instruments to carry out the surgical plan. The information generated by the BLUEPRINT™ system is compiled in a preoperative surgical plan for the patient that is stored in a database at an appropriate location (e.g., on a server in a wide area network, a local area network, or a global network) where it can be accessed by the surgeon or other care provider, including before and during the actual surgery.

Figure 2:
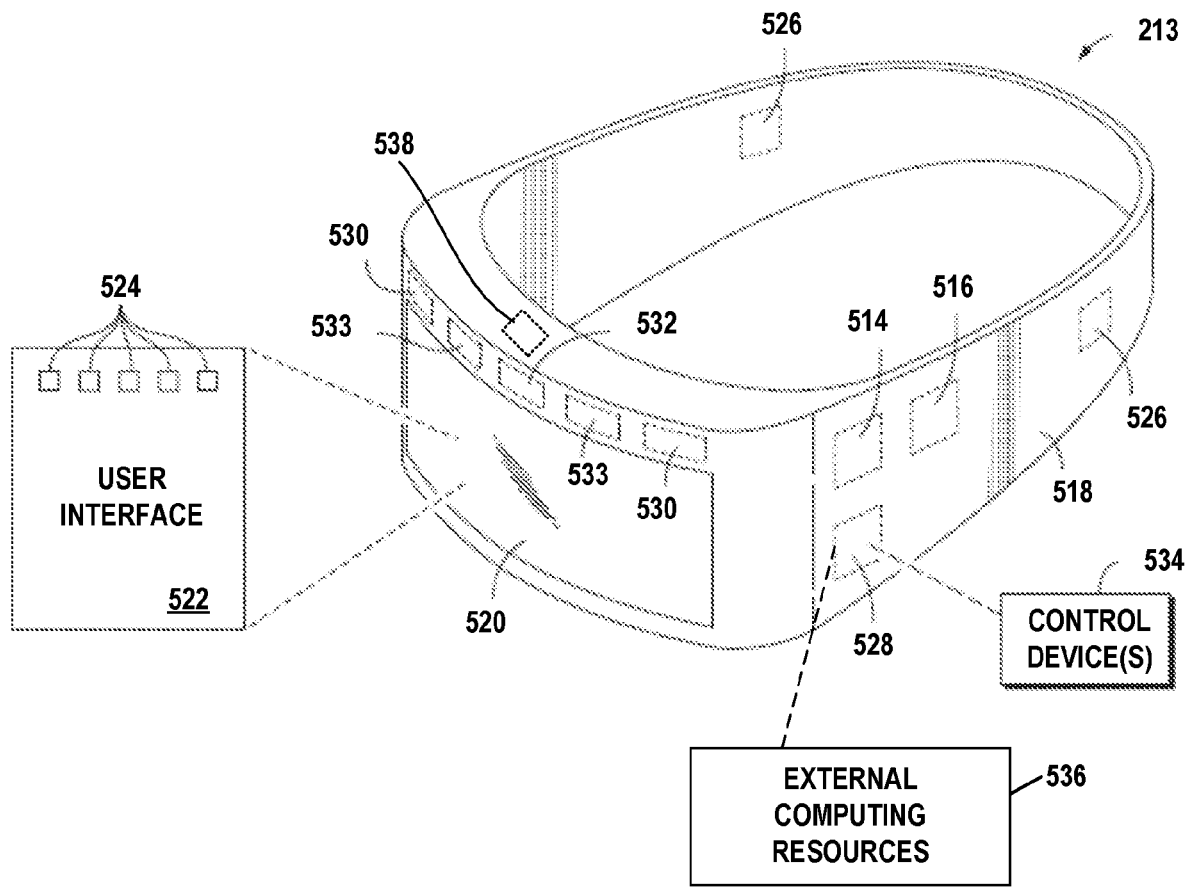
FIG. 2 is a schematic representation of a MR visualization device for use in the surgical system of FIG. 1, according to an example of this disclosure.
Figure 4:
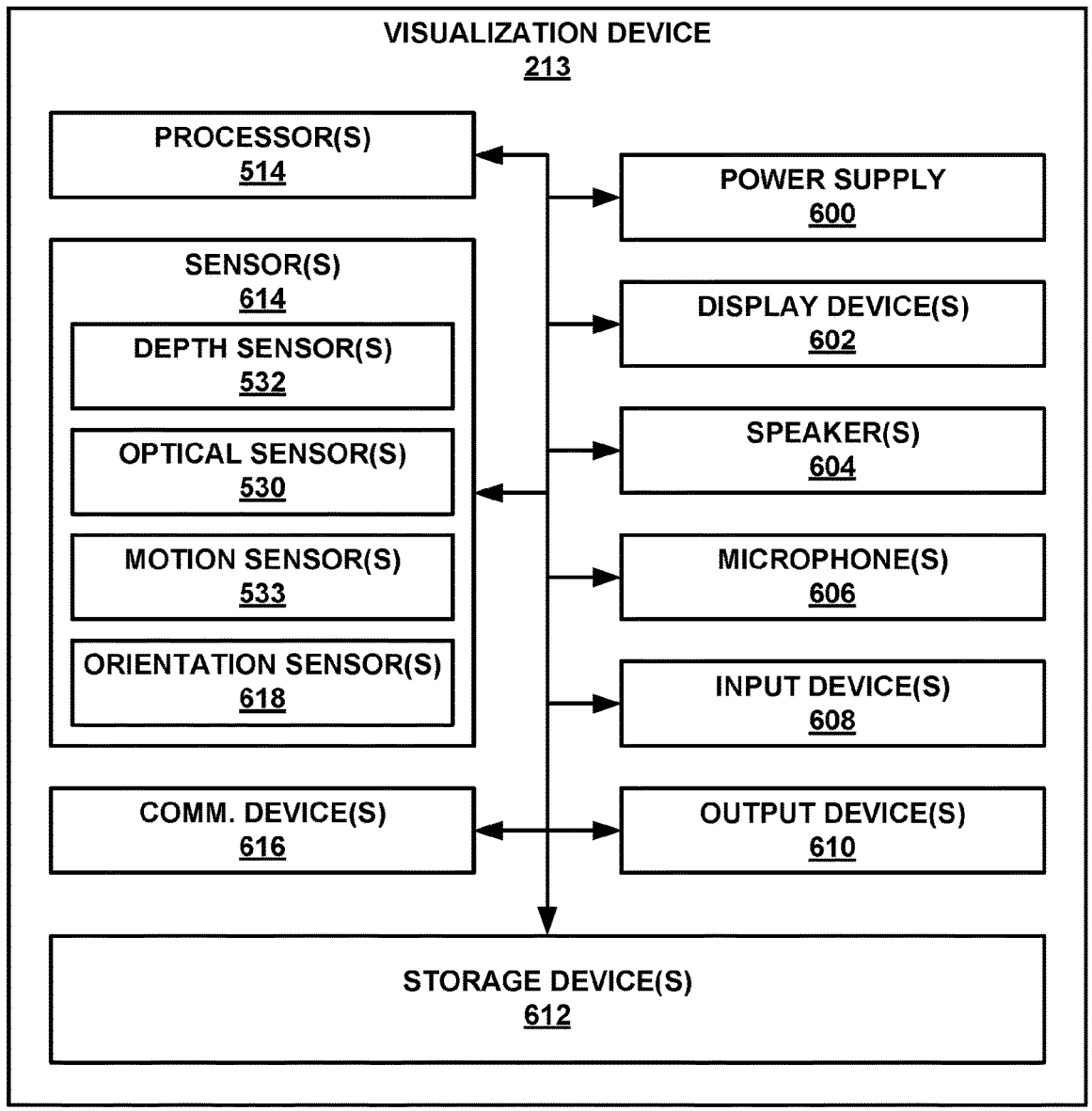
FIG. 4 is block diagram illustrating a MR visualization device for use in the surgical system of FIG. 1, according to an example of this disclosure.

FIG. 2 is a schematic representation of visualization device 116 for use in an MR system, according to an example of this disclosure. As shown in the example of FIG. 4, visualization device 116 can include a variety of electronic components found in a computing system, including one or more processor(s) 514 (e.g., microprocessors or other types of processing units) and memory 516 that may be mounted on or within a frame 518. Furthermore, in the example of FIG. 2, visualization device 116 may include a transparent screen 520 that is positioned at eye level when visualization device 116 is worn by a user. In some examples, screen 520 can include one or more liquid crystal displays (LCDs) or other types of display screens on which images are perceptible to a surgeon who is wearing or otherwise using visualization device 116 via screen 520. Other display examples include organic light emitting diode (OLED) displays. In some examples, visualization device 116 can operate to project 3D images onto the user's retinas using techniques known in the art.

In some examples, screen 520 may include see-through holographic lenses. sometimes referred to as waveguides, that permit a user to see real-world objects through (e.g., beyond) the lenses and also see holographic imagery projected into the lenses and onto the user's retinas by displays, such as liquid crystal on silicon (LCoS) display devices, which are sometimes referred to as light engines or projectors, operating as an example of a holographic projection system 538 within visualization device 116. In other words, visualization device 116 may include one or more see-through holographic lenses to present virtual images to a user. Hence, in some examples, visualization device 116 can operate to project 3D images onto the user's retinas via screen 520, e.g., formed by holographic lenses. In this manner, visualization device 116 may be configured to present a 3D virtual image to a user within a real-world view observed through screen 520, e.g., such that the virtual image appears to form part of the real-world environment. In some examples, visualization device 116 may be a Microsoft HOLOLENS™ headset, available from Microsoft Corporation, of Redmond, Washington, USA, or a similar device, such as, for example, a similar MR visualization device that includes waveguides. The HOLOLENS™ device can be used to present 3D virtual objects via holographic lenses, or waveguides, while permitting a user to view actual objects in a real-world scene, i.e., in a real-world environment, through the holographic lenses.

Although the example of FIG. 2 illustrates visualization device 116 as a head-wearable device, visualization device 116 may have other forms and form factors. For instance, in some examples, visualization device 116 may be a handheld smartphone or tablet.

Visualization device 116 can also generate a user interface (UI) 522 that is visible to the user, e.g., as holographic imagery projected into see-through holographic lenses as described above. For example, UI 522 can include a variety of selectable widgets 524 that allow the user to interact with a mixed reality (MR) system, such as computing system 102 of FIG. 2. Imagery presented by visualization device 116 may include, for example, one or more 3D virtual objects. Details of an example of UI 522 are described elsewhere in this disclosure. Visualization device 116 also can include a speaker or other sensory devices 526 that may be positioned adjacent the user's ears. Sensory devices 526 can convey audible information or other perceptible information (e.g., vibrations) to assist the user of visualization device 116.

Visualization device 116 can also include a transceiver 528 to connect visualization device 116 to a processing device 510 and/or to network 208 and/or to a computing cloud, such as via a wired communication protocol or a wireless protocol, e.g., Wi-Fi, Bluetooth, etc. Visualization device 116 also includes a variety of sensors to collect sensor data, such as one or more optical camera(s) 530 (or other optical sensors) and one or more depth camera(s) 532 (or other depth sensors), mounted to, on or within frame 518. In some examples, the optical sensor(s) 530 are operable to scan the geometry of the physical environment in which user of computing system 102 is located (e.g., an operating room) and collect two-dimensional (2D) optical image data (either monochrome or color). Depth sensor(s) 532 are operable to provide 3D image data, such as by employing time of flight, stereo or other known or future-developed techniques for determining depth and thereby generating image data in three dimensions. Other sensors can include motion sensors 533 (e.g., Inertial Mass Unit (IMU) sensors, accelerometers, etc.) to assist with tracking movement.

Computing system 102 processes the sensor data so that geometric, environmental, textural, etc. landmarks (e.g., corners, edges or other lines, walls, floors, objects) in the user's environment or "scene" can be defined and movements within the scene can be detected. As an example, the various types of sensor data can be combined or fused so that the user of visualization device 116 can perceive 3D images that can be positioned, or fixed and/or moved within the scene. When fixed in the scene, the user can walk around the 3D image, view the 3D image from different perspectives, and manipulate the 3D image within the scene using hand gestures, voice commands, gaze line (or direction) and/or other control inputs. As another example, the sensor data can be processed so that the user can position a 3D virtual object (e.g., a bone model) on an observed physical object in the scene (e.g., a surface, the patient's real bone, etc.) and/or orient the 3D virtual object with other virtual images displayed in the scene. As yet another example, the sensor data can be processed so that the user can position and fix a virtual representation of the surgical plan (or other widget, image or information) onto a surface, such as a wall of the operating room. Yet further, the sensor data can be used to recognize surgical instruments and the position and/or location of those instruments.

Visualization device 116 may include one or more processors 514 and memory 516, e.g., within frame 518 of the visualization device. In some examples, one or more external computing resources 536 process and store information, such as sensor data, instead of or in addition to in-frame processor(s) 514 and memory 516. In this way, data processing and storage may be performed by one or more processors 514 and memory 516 within visualization device 116 and/or some of the processing and storage requirements may be offloaded from visualization device 116. Hence, in some examples, one or more processors that control the operation of visualization device 116 may be within the visualization device, e.g., as processor(s) 514. Alternatively, in some examples, at least one of the processors that controls the operation of visualization device 116 may be external to the visualization device, e.g., as processor(s) 210. Likewise, operation of visualization device 116 may, in some examples, be controlled in part by a combination one or more processors 514 within the visualization device and one or more processors 210 external to the visualization device.

For instance, in some examples, processing of the sensor data can be performed by processing device(s) 210 in conjunction with memory or storage device(s) (M) 215. In some examples, processor(s) 514 and memory 516 mounted to frame 518 may provide sufficient computing resources to process the sensor data collected by cameras 530, 532 and motion sensors 533. In some examples, the sensor data can be processed using a Simultaneous Localization and Mapping (SLAM) algorithm, or other known or future-developed algorithm for processing and mapping 2D and 3D image data and tracking the position of visualization device 116 in the 3D scene. In some examples, image tracking may be performed using sensor processing and tracking functionality provided by the Microsoft HOLOLENS™ system, e.g., by one or more sensors and processors 514 within a visualization device 116 substantially conforming to the Microsoft HOLOLENS™ device or a similar mixed reality (MR) visualization device.

In some examples, computing system 102 can also include user-operated control device(s) 534 that allow the user to operate computing system 102, use computing system 102 in spectator mode (either as master or observer), interact with UI 522 and/or otherwise provide commands or requests to processing device(s) 210 or other systems connected to network 208. As examples, the control device(s) 234 can include a microphone, a touch pad, a control panel, a motion sensor or other types of control input devices with which the user can interact.

Figure 3:
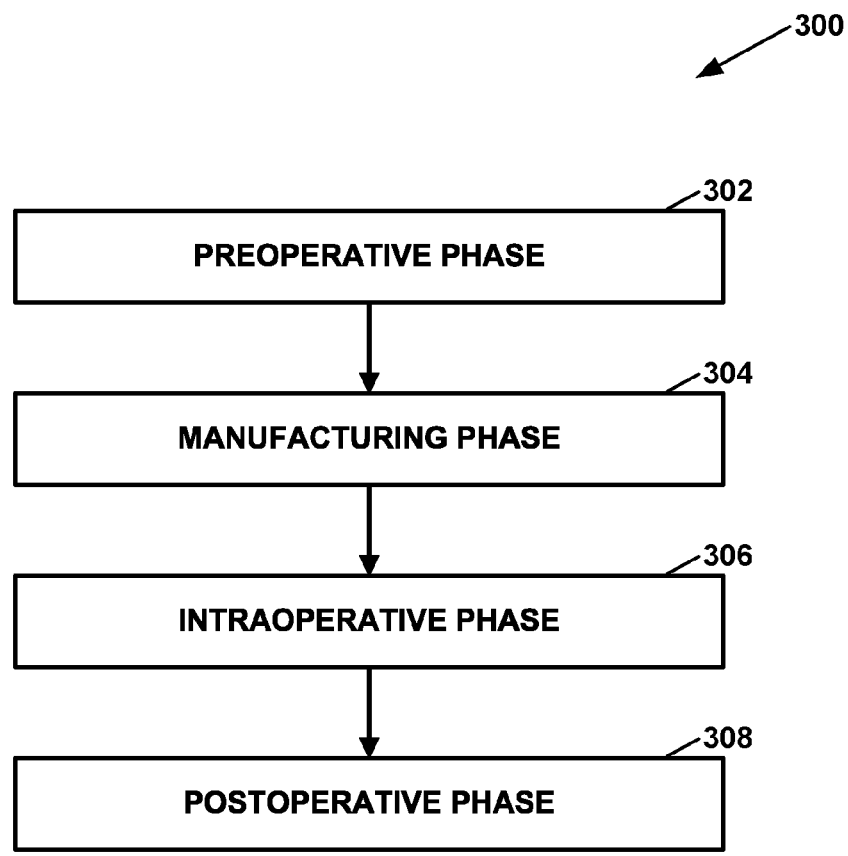
FIG. 3 is a flowchart illustrating an example surgical lifecycle.

As discussed above, surgical lifecycle 300 may include a preoperative phase 302 (FIG. 3). One or more users may use surgical assistance system 100 in preoperative phase 302. For instance, surgical assistance system 100 may include virtual planning system 102 to help the one or more users generate a virtual surgical plan that may be customized to an anatomy of interest of a particular patient. As described herein, the virtual surgical plan may include a 3-dimensional virtual model that corresponds to the anatomy of interest of the particular patient and a 3-dimensional model of one or more prosthetic components matched to the particular patient to repair the anatomy of interest or selected to repair the anatomy of interest. The virtual surgical plan also may include a 3-dimensional virtual model of guidance information to guide a surgeon in performing the surgical procedure, e.g., in preparing bone surfaces or tissue and placing implantable prosthetic hardware relative to such bone surfaces or tissue.

An orthopedic surgical system, such as surgical assistance system 100, may be configured to display virtual guidance including one or more virtual guides for performing work on a portion of a patient's anatomy. For instance, the visualization system may display virtual guidance that guides performance of a surgical step with the use of a physical tracking tool that attaches to a rotating tool. In some examples, a user such as a surgeon may view real-world objects in a real-world scene. The real-world scene may be in a real-world environment such as a surgical operating room. In this disclosure, the terms real and real-world may be used in a similar manner. The real-world objects viewed by the user in the real-world scene may include the patient's actual, real anatomy, such as an actual glenoid or humerus, exposed during surgery. The user may view the real-world objects via a see-through (e.g., transparent) screen, such as see-through holographic lenses, of a head-mounted MR visualization device, such as visualization device 213, and also see virtual guidance such as virtual MR objects that appear to be projected on the screen or within the real-world scene, such that the MR guidance object(s) appear to be part of the real-world scene, e.g., with the virtual objects appearing to the user to be integrated with the actual, real-world scene. For example, the virtual guidance may be projected on the screen of a MR visualization device, such as visualization device 213, such that the virtual guidance is overlaid on, and appears to be placed within, an actual, observed view of the patient's actual bone viewed by the surgeon through the transparent screen, e.g., through see-through holographic lenses. Hence, in this example, the virtual guidance may be a virtual 3D object that appears to be part of the real-world environment, along with actual, real-world objects.

A screen through which the surgeon views the actual, real anatomy and also observes the virtual objects, such as virtual anatomy and/or virtual surgical guidance, may include one or more see-through holographic lenses. The holographic lenses, sometimes referred to as "waveguides," may permit the user to view real-world objects through the lenses and display projected holographic objects for viewing by the user. As discussed above, an example of a suitable head-mounted MR device for visualization device 213 is the Microsoft HOLOLENS™ headset, available from Microsoft Corporation, of Redmond, Washington, USA. The HOLOLENS™ headset includes see-through, holographic lenses, also referred to as waveguides, in which projected images are presented to a user. The HOLOLENS™ headset also includes an internal computer, cameras and sensors, and a projection system to project the holographic content via the holographic lenses for viewing by the user. In general, the Microsoft HOLOLENS™ headset or a similar MR visualization device may include, as mentioned above, LCoS display devices that project images into holographic lenses, also referred to as waveguides, e.g., via optical components that couple light from the display devices to optical waveguides. The waveguides may permit a user to view a real-world scene through the waveguides while also viewing a 3D virtual image presented to the user via the waveguides. In some examples, the waveguides may be diffraction waveguides.

The visualization device (e.g., visualization device 213) may be configured to display different types of virtual guidance. Examples of virtual guidance include, but are not limited to, a virtual point, a virtual axis, a virtual angle, a virtual path, a virtual plane, virtual reticle, and a virtual surface or contour. As discussed above, the device system (e.g., visualization device 213) may enable a user to directly view the patient's anatomy via a lens by which the virtual guides are displayed, e.g., projected. The virtual guidance may guide or assist various aspects of the surgery. For instance, a virtual guide may guide at least one of preparation of anatomy for attachment of the prosthetic or attachment of the prosthetic to the anatomy.

The visualization system may obtain parameters for the virtual guides from a virtual surgical plan, such as the virtual surgical plan described herein. Example parameters for the virtual guides include, but are not necessarily limited to, guide location, guide orientation, guide type, guide color, etc.

The visualization system may display a virtual guide in a manner in which the virtual guide appears to be overlaid on an actual, real object, within a real-world environment, e.g., by displaying the virtual guide(s) with actual, real-world objects (e.g., at least a portion of the patient's anatomy) viewed by the user through holographic lenses. For example, the virtual guidance may be 3D virtual objects that appear to reside within the real-world environment with the actual, real object.

The techniques of this disclosure are described below with respect to a shoulder arthroplasty surgical procedure. Examples of shoulder arthroplasties include, but are not limited to, reversed arthroplasty, augmented reverse arthroplasty, standard total shoulder arthroplasty, augmented total shoulder arthroplasty, and hemiarthroplasty. However, the techniques are not so limited, and the visualization system may be used to provide virtual guidance information, including virtual guides in any type of surgical procedure. Other example procedures in which an orthopedic surgical system, such as surgical assistance system 100, may be used to provide virtual guidance include, but are not limited to, other types of orthopedic surgeries; any type of procedure with the suffix "plasty," "stomy," "ectomy," "clasia," or "centesis,"; orthopedic surgeries for other joints, such as elbow, wrist, finger, hip, knee, ankle or toe, or any other orthopedic surgical procedure in which precision guidance is desirable. For instance, a visualization system may be used to provide virtual guidance for an ankle arthroplasty surgical procedure.

As discussed above, surgical assistance system 100 may receive a virtual surgical plan for attaching an implant to a patient and/or preparing bones, soft tissue or other anatomy of the patient to receive the implant. The virtual surgical plan may specify various surgical steps to be performed and various parameters for the surgical steps to be performed. As one example, the virtual surgical plan may specify a location on the patient's bone (e.g., glenoid, humerus, tibia, talus, etc.) for attachment of a guide pin. As another example, the virtual surgical plan may specify locations and/or orientations of one or more anchorage locations (e.g., screws, stems, pegs, keels, etc.).

Figure 5:
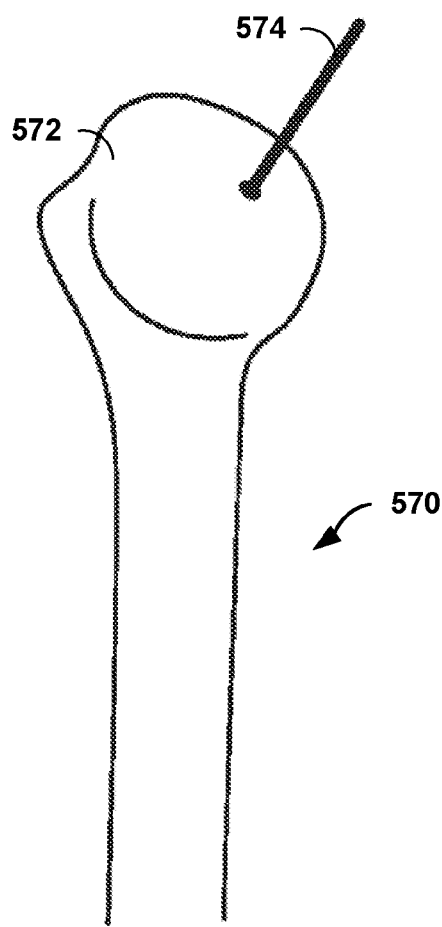
FIGS. 5 and 6 are conceptual diagrams illustrating an MR system providing virtual guidance for installation of a guide pin in a bone, in accordance with one or more techniques of this disclosure.
Figure 6:
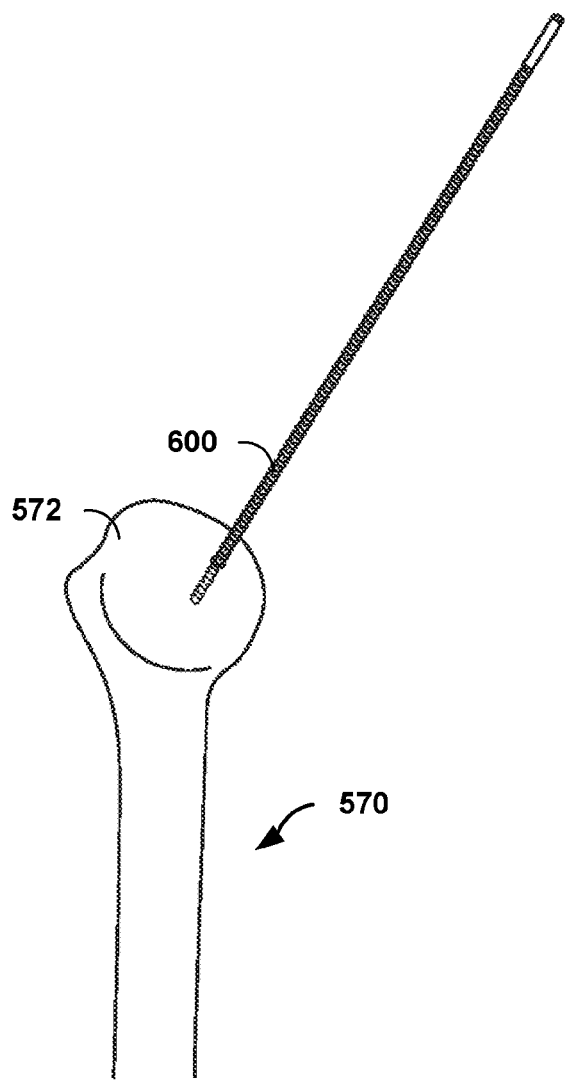

FIGS. 5 and 6 are conceptual diagrams illustrating an MR system providing virtual guidance for installation of a guide pin in a bone, in accordance with one or more techniques of this disclosure. In FIGS. 5 and 6 and other figures of this disclosure, some of the surrounding tissue and some bone has been omitted for ease of illustration. As shown in the example of FIG. 5, surgical assistance system 100 may display virtual axis 574 on or relative to a humeral head 572 of a humerus 570. FIG. 5 and subsequent figures illustrate examples of what the surgeon, or other user, would see when viewing via surgical assistance system 100. In particular, when viewing via visualization device 213 from the view shown in FIG. 5, the surgeon may see a portion of humerus 570 and a virtual axis 574 (and/or other virtual guidance) overlaid on the portion of humerus 570.

To display virtual axis 574, surgical assistance system 100 may determine a location on a virtual model of humerus 570 at which a guide is to be installed. Surgical assistance system 100 may obtain the location from a virtual surgical plan (e.g., the virtual surgical plan described above). The location obtained by surgical assistance system 100 may specify one or both coordinates of a point on the virtual model and a vector. The point may be the position at which the guide is to be installed and the vector may indicate the angle/slope at which the guide is to be installed. As such, surgical assistance system 100 may display a virtual drilling axis having parameters obtained from the virtual surgical plan, and the virtual drilling axis may be configured to guide drilling of one or more holes in the humerus (e.g., for attachment of a guide pin to the humeral head).

A virtual model of humerus 570 may be registered with humerus 570 such that coordinates on the virtual model closely correspond to coordinates on humerus 3200. For instance, surgical assistance system 100 may generate a transformation matrix between the virtual model of humerus 570 and an observed portion of humerus 570. This transformation matrix may allow for translation along the x, y, and z axes of the virtual model and rotation about the x, y and z axes in order to achieve and maintain alignment between the virtual and observed bones. In some examples, after registration is complete, surgical assistance system 100 utilize the results of the registration to perform simultaneous localization and mapping (SLAM) (or any other tracking algorithm or combination of tracking algorithms) to maintain alignment of the virtual model to the corresponding observed object. As such, by displaying virtual axis 574 at the determined location on the virtual model, surgical assistance system 100 may display virtual axis 574 at the planned position on humerus 570.

The surgeon may attach a guide pin to humerus 570 using the displayed virtual guidance. For instance, where the guide pin includes a self-tapping threaded distal tip, the surgeon may align the guide pin with the displayed virtual axis 574 and utilize a drill or other instrument to install the guide pin in humerus 570.

FIG. 6 is a conceptual diagram illustrating guide 600 as installed in humeral head 572. Guide 600 may take the form of an elongated pin (e.g., a guide pin) to be mounted in a hole formed in the humeral head. As shown in FIGS. 5 and 6, by displaying virtual axis 574, a surgeon may install guide 600 at the planned position on humeral head 572. While described with respect to humeral head 572, it is understood that the techniques of this disclosure are equally applicable to any type of bone.

As discussed above, FIG. 5 illustrates an example of what the surgeon, or other user, would see when viewing via visualization device 213 from the view shown in FIG. 5. In other words, FIG. 5 illustrates an example MR scene containing both real objects (e.g., humerus 570) and virtual objects (e.g., virtual axis 574). In particular, FIG. 5 shows what the surgeon would see when the surgeon's gaze line is from a side view/substantially orthogonal to the axis of the surgical step being performed (e.g., virtual axis 574). However, the surgeon is not likely to view the patient from such an angle when operating a driver of a rotating tool (e.g., a drill or motor that rotates the guide pin, a drill bit, a reamer, or the like). Instead, when operating the driver of the rotating tool, the surgeon may be likely to view the patient from slightly behind the drill or motor while operating the drill or motor, with a gaze line substantially parallel to an axis of the surgical step being performed.

Figure 7:
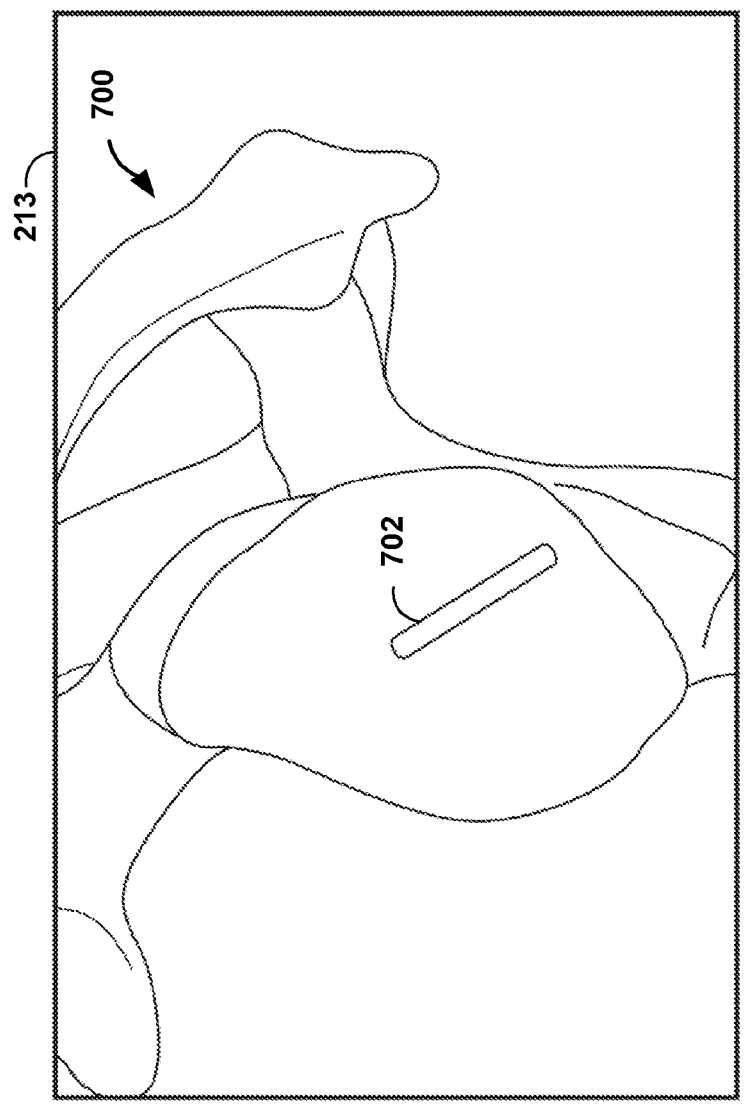
FIG. 7 is a conceptual diagram of virtual guidance that may be provided by surgical assistance system 100, according to one or more examples of this disclosure.

FIG. 7 is a conceptual diagram of virtual guidance that may be provided by surgical assistance system 100, according to one or more examples of this disclosure. As shown in FIG. 7, a surgeon may view a portion of a scapula 700 through visualization device 213 with a gaze line substantially parallel (e.g., closer to parallel than perpendicular) to an axis of the surgical step being performed. For instance, as shown in FIG. 7 where visualization device 213 displays virtual axis 702 to guide use of a rotating tool to perform a surgical step on scapula 700, the axis of the surgical step being performed may correspond to virtual axis 702. As such, the surgeon may view scapula 700 through visualization device 213 with a gaze line substantially parallel to an axis of virtual axis 702.

As discussed above, in some examples, the surgeon may utilize one or more tools to perform work on portion of a patient's anatomy (e.g., scapula 700, humerus 570, etc.). For instance, the surgeon may utilize a driver to drive (e.g., provide rotational power to) a rotating tool. Examples of rotating tools include, but are not limited to, guide pins (e.g., self-tapping guide pins, such as guide 600), reaming tools, drill bits, and screw drivers.

As also discussed above, surgical assistance system 100 may provide virtual guidance to assist the surgeon in performing surgical steps. For instance, as shown in FIG. 7, visualization device 213 of surgical assistance system 100 may display virtual axis 702 (e.g., a virtual planned insertion axis object) to guide use of a rotating tool to perform a surgical step on scapula 700. The surgeon may achieve correct performance of the surgical step by aligning a shaft of the rotating tool with virtual axis 702, activating a driver of the rotating tool, and advancing the shaft of the rotating tool along the displayed virtual axis.

In some examples, surgical assistance system 100 may track a position and/or orientation of the rotating tool and used the position and/orientation to display the virtual guidance. For instance, surgical assistance system 100 may track the position and/or orientation of the rotating tool based on data generated by one or more depth cameras and/or optical cameras (e.g., depth cameras and/or optical cameras of visualization device 213 or one or more other devices). However, in some scenarios, the rotating tool, the driver of the rotating tool, and/or various tools used by the surgeon may obscure or otherwise interfere with the ability of one or more sensors of visualization device 213 to directly track the position of the rotating tool (e.g., guide 600 or any other insertable item). For instance, the driver may obstruct a line of sight between the depth/optical cameras of visualization device 213 and the rotating tool. Without such a line of sight, it may not be possible for surgical assistance system 100 to directly track the position and/or orientation of the rotating tool or directly tracking the position and/or orientation of the rotation tool in the presence of such obstruction may be insufficiently reliable.

Figure 8:
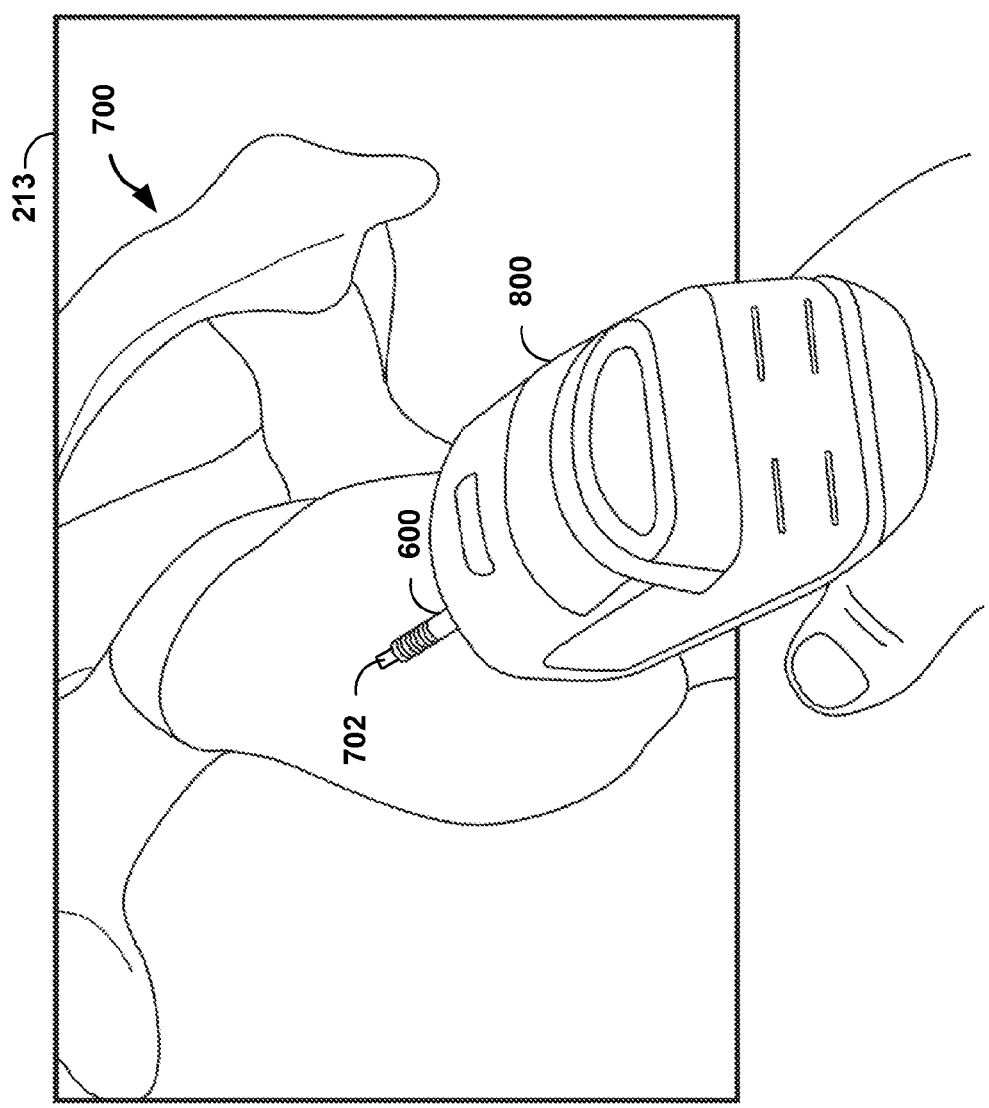
FIG. 8 is a conceptual diagram of tools obscuring a portion of virtual guidance provided by an MR system.

FIG. 8 is a conceptual diagram of tools obscuring a portion of virtual guidance provided by an MR system. As can be seen in FIG. 8, when viewing with a gaze line substantially parallel to the axis of the surgical step being performed (i.e., substantially parallel to virtual axis 702) driver 800 at least partially obscures the line of sight between the depth/optical cameras of visualization device 213 and guide 600 displayed virtual guidance (i.e., virtual axis 702). With the line of sight obscured, it may be difficult for surgical assistance system 100 to be able to track the position and/or orientation of the rotating tool based on data generated by one or more depth cameras and/or optical cameras of visualization device 213.

In accordance with one or more techniques of this disclosure, surgical assistance system 100 may track a position and/or orientation of a physical tracking tool that attaches to a tool in order to determine a position and/or orientation of the tool. Where the tool is a rotating tool, the physical tracking tool may include a channel through which the shaft of the rotating tool is inserted, and one or more physical tracking features that each include a plurality of planar faces. In operation, surgical assistance system 100 may utilize data generated by the depth/optical cameras of visualization device 213 to determine a position and/or orientation of at least one face of the plurality of planar faces. Surgical assistance system 100 may then adjust the determined position/orientation by a pre-determined offset that represents a displacement between the at least one face and the channel. The adjusted position/orientation represents the position/orientation of the tool in the channel. In this way, surgical assistance system 100 may determine the position/orientation of a tool where a line of sight between sensors of surgical assistance system 100 and the tool (e.g., guide 600) is at least partially obstructed. Further details of some examples of a physical tracking tool are discussed below with reference to FIGS. 9A-9E.

Surgical assistance system 100 may display the virtual guidance using the determined position/orientation of the tool. For instance, using the determined position/orientation of guide 600, surgical assistance system 100 may display virtual guidance as described below with reference to FIGS. 10-17.

Figure 9A:
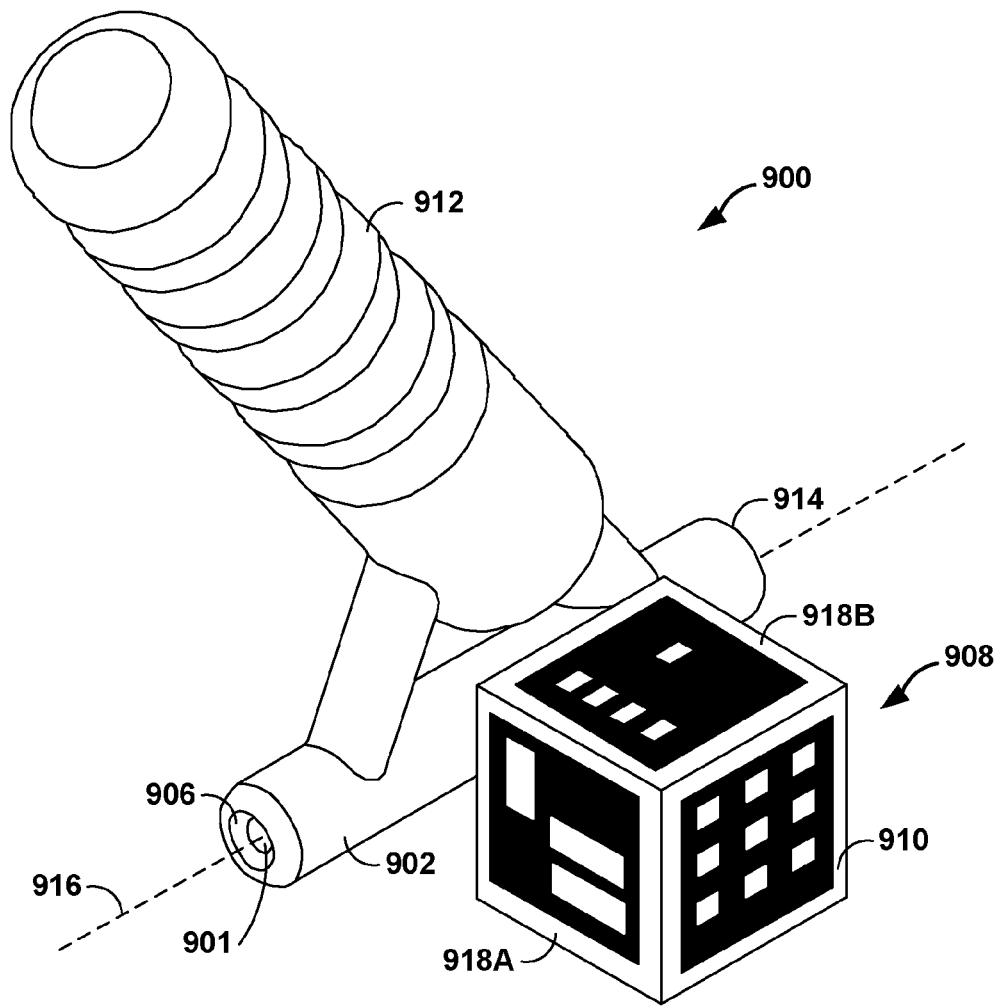
FIGS. 9A-9F illustrate various views of various examples of a physical tracking tool, in accordance with one or more techniques of this disclosure.
Figure 9B:
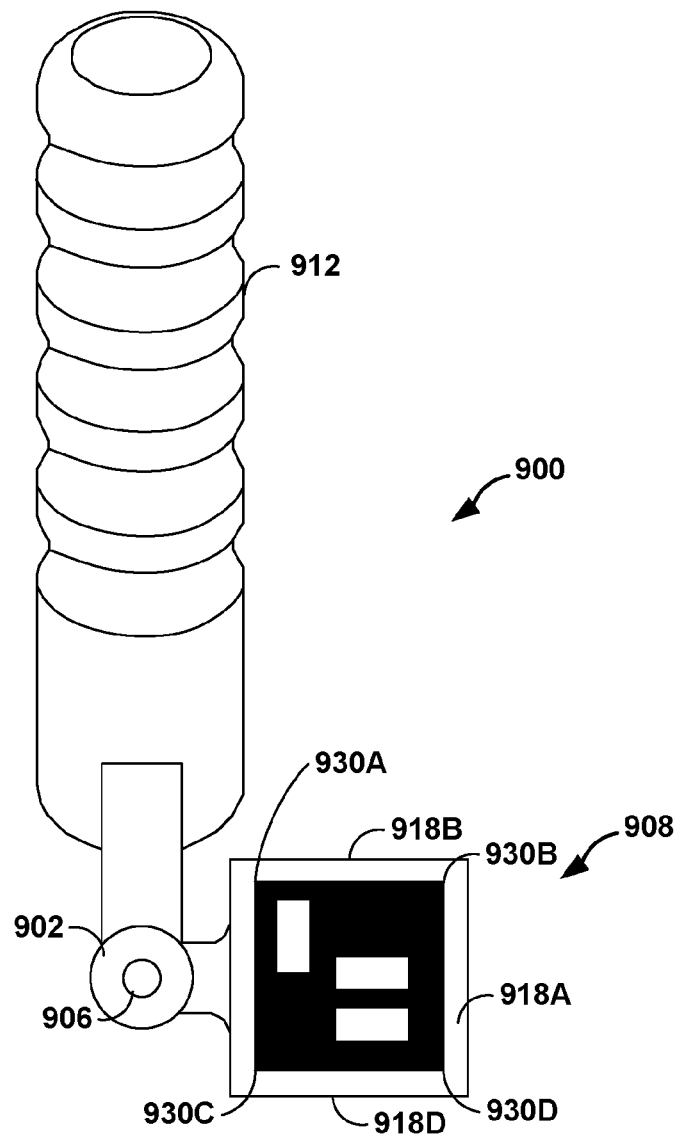
Figure 9C:
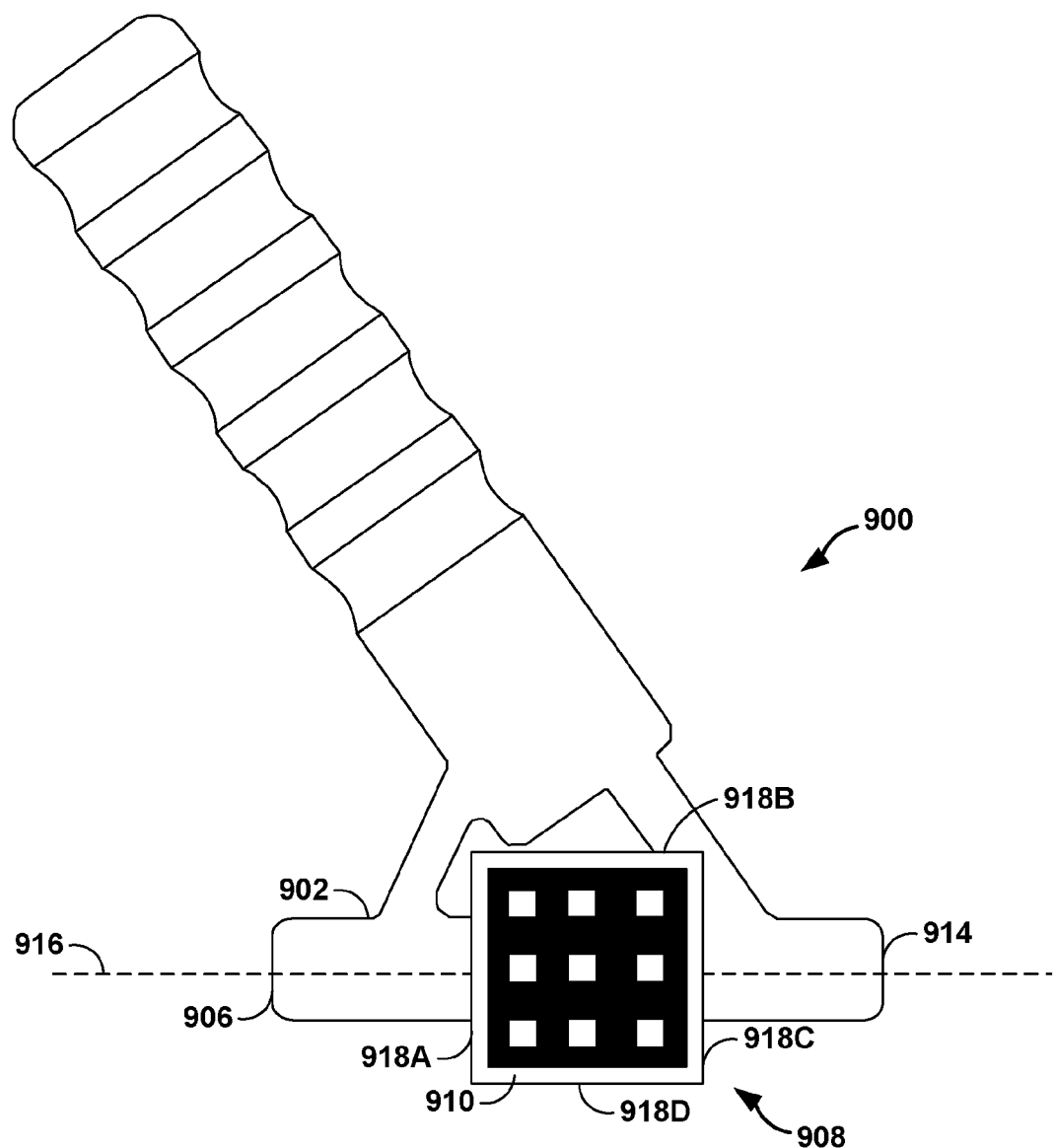

FIGS. 9A-9C illustrate various views of one example of a physical tracking tool, in accordance with one or more techniques of this disclosure. As shown in FIGS. 9A-9C, physical tracking tool 900 may include a main body 902, a physical tracking feature 908, and a handle 912.

Main body 902 may define a channel configured to receive a tool. For instance, main body 802 may define a channel 901 that is configured to receive a shaft of a rotating tool, such as guide 600 of FIG. 8. Channel 901 may have a primary axis that controls movement of a received tool, such as an item insertable into a bone of a patient. For instance, where channel 901 is configured to receive a shaft of an insertable item, channel 901 may have a longitudinal axis (e.g., longitudinal axis 916) about-which the shaft may rotate. Channel 901 may be configured to receive the insertable item in the sense that channel 901 is sized such that an inner dimension of channel 901 is slightly larger than an outer dimension of the insertable item. For instance, where the tool is a rotating tool, channel 901 may be cylindrical and have an inner diameter that is slightly larger than an outer diameter of a shaft of the insertable item. In this way, the shaft of the insertable item may spin within channel 901 but may be confined to rotation about longitudinal axis 916.

Channel 901 may extend all the way through main body 902 such that channel 901 is open at both distal end 914 and proximal end 906. Therefore, an insertable item may be inserted into proximal end 906, advanced through channel 901, and come out of distal end 914.

Physical tracking tool 900 may include one or more physical tracking features. The one or more physical tracking features may be attached to main body 902, handle 912, or another other component of physical tracking tool 900. In the example of FIGS. 9A-9C, the one or more physical tracking features include physical tracking feature 908. In some examples, each of the physical tracking features is a polyhedron that includes a plurality of planar faces. For instance, as shown in the example of FIGS. 9A-9C, physical tracking feature 908 may be a cube that includes a top face 910 (i.e., face that is farthest away from main body 902) and a plurality of side faces 918A-918D (collectively, "side faces 918"). In examples where physical tracking feature 908 is a cube, side faces 918 may include exactly four side faces in addition to top face 910. Other example polyhedrons that physical tracking features may be shaped as include, but are not limited to, pyramids (e.g., tetrahedron), octahedrons, prisms, and the like.

The faces of the one or more physical tracking features may each include a respective graphical pattern. The graphical patterns may have visual characteristics that renders them highly detectable to electronic sensors. For instance, as shown in FIGS. 9A-9C, top face 910 and side faces 918 may each include graphical patterns that include high contrast features (i.e., white shapes on a black background). In some examples, each of the graphical patterns may include a rectangular perimeter. For instance, each of top face 910 and side faces 918 may include a solid rectangular background (e.g., a black square in FIGS. 9A-9C) having four corners (e.g., side face 918A is illustrated as having corners 930A-930D (collectively, "corners 930") in FIG. 9B). Surgical assistance system 100 may be configured to determine a relative location of a particular face (e.g., relative to channel 901) based on the graphical pattern included on the particular face. In other words, surgical assistance system 100 may segment image data generated by one or more cameras of visualization device 213 into regions by using the perimeters of the solid rectangular backgrounds. Within each region, surgical assistance system 100 may compare the patterns with a database of known graphical patterns to identify which pattern is included in the region. Surgical assistance system 100 may utilize the database to determine which face corresponds to the identified pattern. For instance, surgical assistance system 100 may determine that top face 910 corresponds to a first pattern, side face 918A corresponds to a second pattern, side face 918B corresponds to a third pattern, side face 918C corresponds to a fourth pattern, and side face 918D corresponds to a fifth pattern. Surgical assistance system 100 may determine a respective offset from each identified face to another portion of physical tracking tool 900 (e.g., channel 901).

Surgical assistance system 100 may further determine, within each identified region, coordinates (e.g., three-dimensional coordinates) of one or more corners of the identified region. For instance, surgical assistance system 100 may determine, based on image data generated by an RGB camera of visualization device 213, two-dimensional coordinates of corners 930 of side face 918A. Based on intrinsic properties of the RGB camera and a pre-determined size of the solid rectangular background of side face 918A, surgical assistance system 100 may convert the two-dimensional coordinates of corners 930 into three-dimensional coordinates (e.g., using the Perspective-n-Point algorithm). Surgical assistance system 100 may adjust the determined coordinates by the determined offset to determine a position and/or orientation of a portion of physical tracking tool (e.g., channel 901). As discussed above, when the insertable object is placed in channel 901, the position and/or orientation of the insertable object roughly corresponds to the position and/or orientation of channel 901. As such, by determining the position and/or orientation of channel 901, surgical assistance system 100 effectively determines the position and/or orientation of the insertable object. In this way, surgical assistance system 100 may track a position and/or orientation of an insertable object using physical tracking tool 900.

In some examples, at least one face of the plurality of side faces may be orthogonal to longitudinal axis 916. For instance, as shown in FIGS. 9A-9C, side face 918A and side face 918C may be orthogonal to longitudinal axis 916. However, for some uses of physical tracking tool 900, the surgeon's gaze (and thus the "gaze" of sensors of visualization device 213) may not be directly along longitudinal axis 916. Detection of physical tracking tool 900 may be improved when the "gaze" of sensors of visualization device 213 is more orthogonal to a face of physical tracking feature 908.

In accordance with one or more techniques of this disclosure, in some examples, physical tracking feature 908 may be rotated such that at least one of the planar faces is not orthogonal to longitudinal axis 916. For instance, an angle between at least one side face of side faces 918 and a plane orthogonal to longitudinal axis 916 (i.e., angle 950 of FIG. 9D) may be greater than or equal to 10 degrees. As one specific example, the angle between side face 918A and a plane orthogonal to longitudinal axis 916 (i.e., angle 950) may be approximately 20 degrees (e.g., +/−10%). By rotating physical tracking feature 908 may be rotated such that at least one of the planar faces is not orthogonal to longitudinal axis 916, the probability that multiple faces of physical tracking feature 908 will be within the line of sight of visualization device 213 may be increased. As the number of faces of physical tracking feature 908 within the line of sight of visualization device 213 increases, the number of points identified by surgical assistance system 100 increases. An increase in the number of points identified may lead to an increase in the accuracy of the tracking of physical tracking feature 908.

In some examples, physical tracking tool 900 may be ambidextrous such that physical tracking tool 900 can be similarly operated by right-handed and left-handed surgeons. In other examples, physical tracking tool 900 may be not be ambidextrous (i.e., physical tracking tool 900 may come in right-handed or left-handed configurations). Where physical tracking tool 900 is not ambidextrous, handle 912 of physical tracking tool 900 may be configured such that, when handle 912 is gripped by a non-dominant hand of the surgeon, physical tracking feature 908 may be "on top" (i.e., located above channel 901). In the example of FIGS. 9A-9C where handle 912 is located on the left when tracking feature 908 is "on top", handle 912 may be considered to be configured to be gripped by a left hand.

Figure 9D:
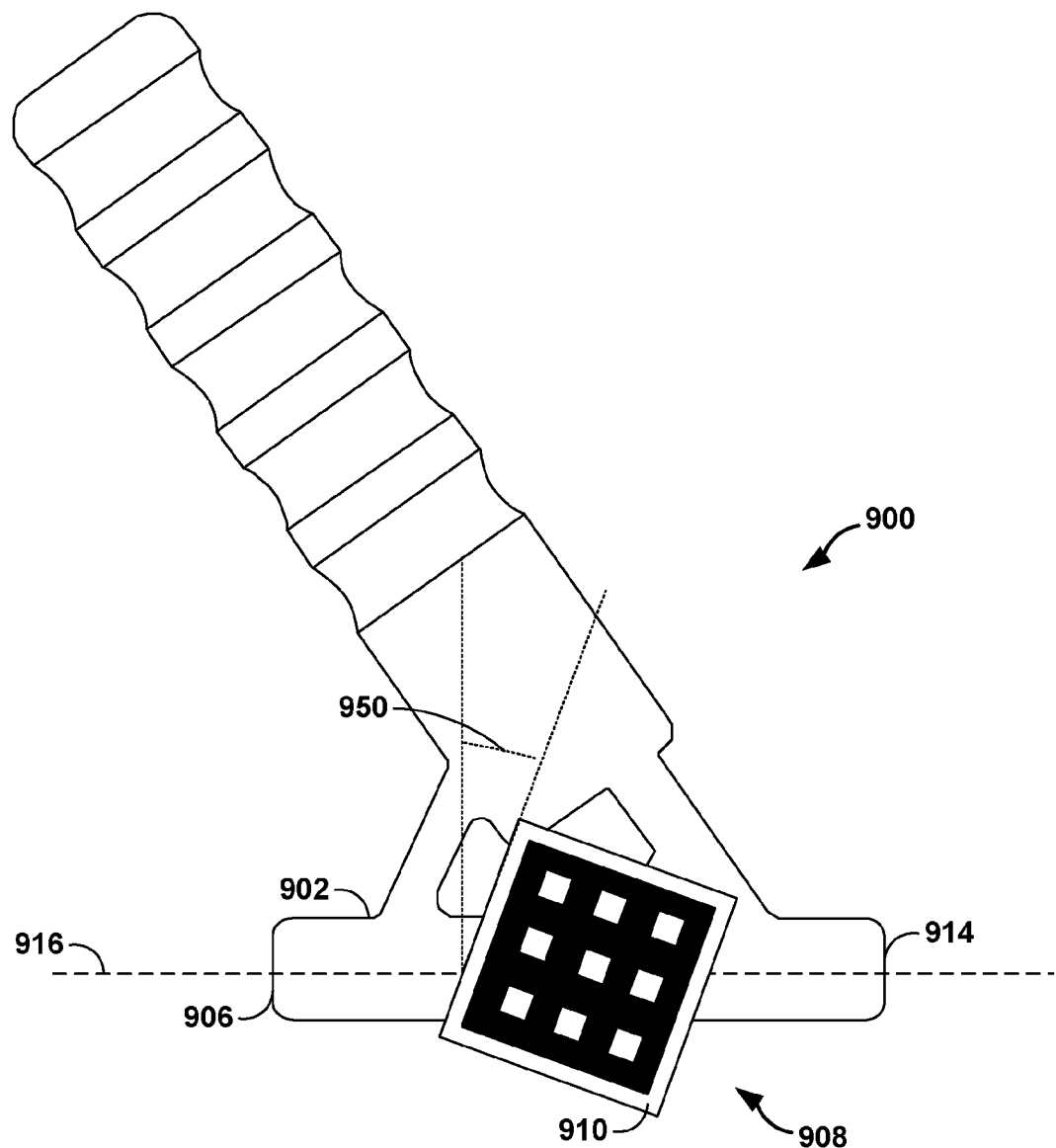
Figure 9E:
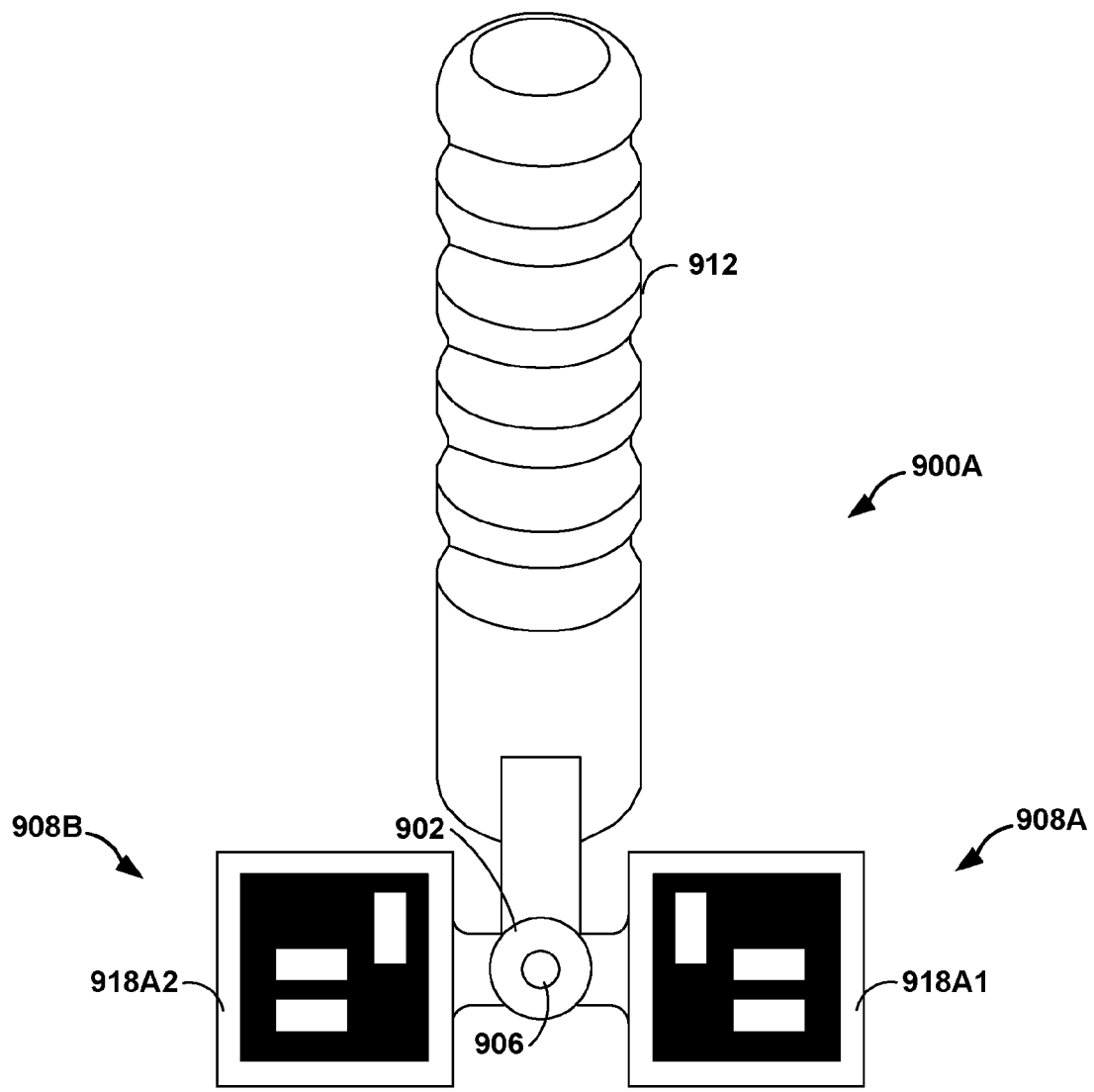
Figure 9F:
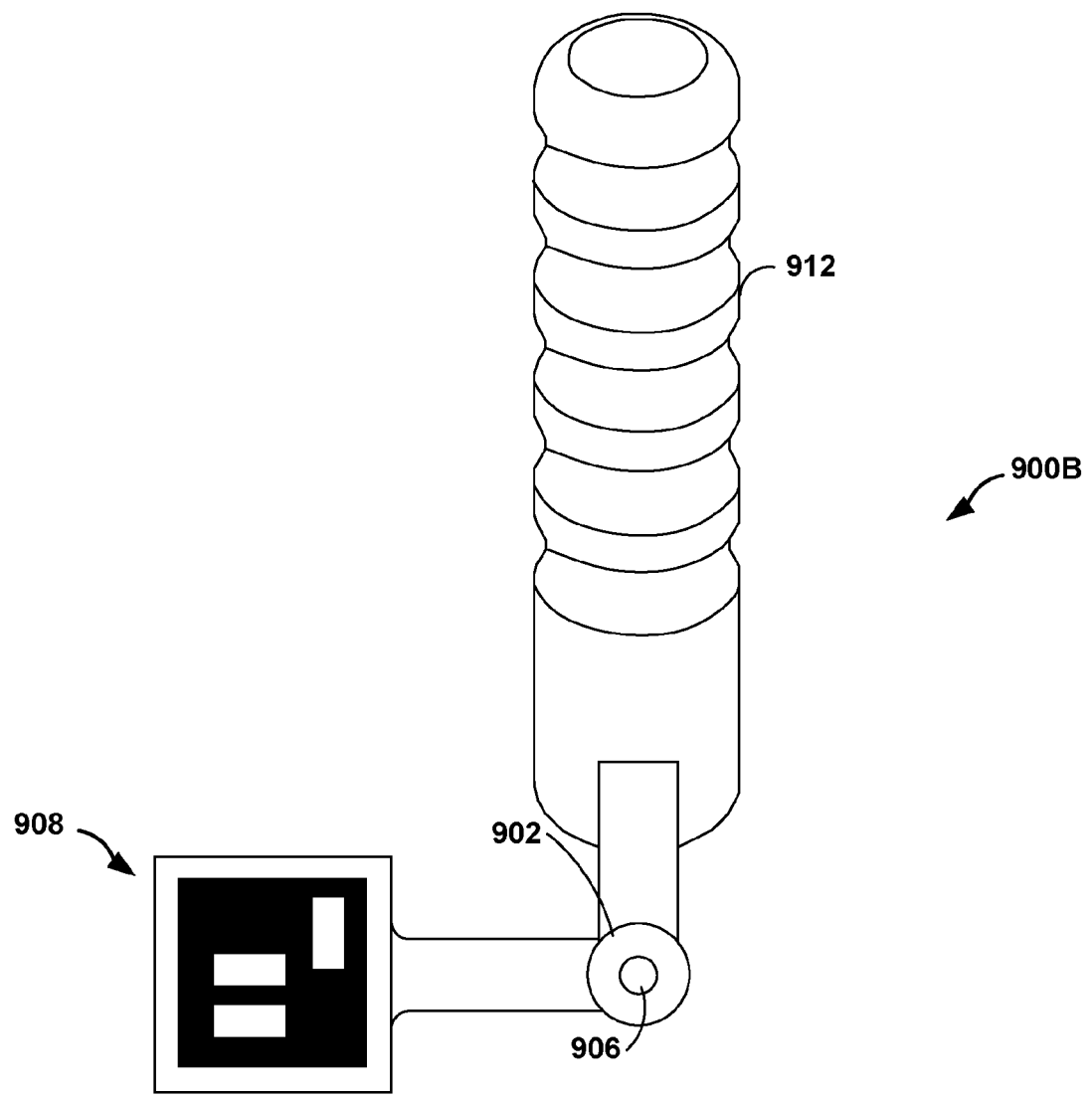

As mentioned above, in some examples, physical tracking tool 900 may be ambidextrous. In some examples, to make physical tracking tool 900 ambidextrous, physical tracking tool 900 may include a plurality of physical tracking features 908 disposed at different positions around main body 902. For instance, as shown in FIG. 9E, physical tracking tool 900A may include physical tracking features 908A and 908B disposed on opposite sides of main body 902. As such, regardless of which hand physical tracking tool 900A is held in, one of physical tracking features 908A and 908B will be on top, and thus be in the line of sight of sensors of visualization device 213. Where a physical tracking tool includes a plurality of physical tracking features, corresponding faces of the respective physical tracking features may have identical graphical patterns, or may have different graphical patterns. For instance, side face 918A1 and side face 918A2 may be considered to be corresponding faces and may have identical graphical patterns or may have different graphical patterns. Additionally, it is noted physical tracking features 908A and 908B may be rotated (e.g., similar to as shown in FIG. 9D).

Handle 912, in some examples, may be integral to main body 902. For instance, handle 912 may be permanently attached to main body 902 and/or may be formed as a single component with main body 902. In other examples, handle 912 may be removable from main body 902. For instance, handle 912 may be removable and "flappable" such that placement of handle 912 one way or the other renders physical tracking tool 900 in a right-handed or left-handed configuration.

A distance between the one or more physical tracking features and main body 902 may be varied. In some examples, physical tracking feature 908 may be positioned relatively closed to main body 902. For instance, a distance between top face 910 and longitudinal axis 916 may be less than 50 millimeters (mm) or less than 30 mm. In some examples, physical tracking feature 908 may be positioned relatively far from to main body 902. For instance, a distance between top face 910 and longitudinal axis 916 may be greater than 50 mm or greater than 70 mm. Where the one or more physical tracking features include a plurality of physical tracking features, the distances between the tracking features and the main body may be the same for all tracking features or may be different.

While described above as being incorporated in a physical tracking tool configured to guide an insertable object, the techniques of this disclosure are not so limited. For instance, the physical tracking features described herein (e.g., with reference to FIGS. 9A-9F and 10) may be attached to other tools (e.g., directly incorporated into the tools, or attached via some other means, such as clips) in order to facilitate tracking of said tools. As one specific example, one or more physical tracking features (e.g., similar to physical tracking feature 908) may be attached to a reamer and surgical assistance system 100 may utilize said physical tracking features to track a depth of reaming.

Figure 10:
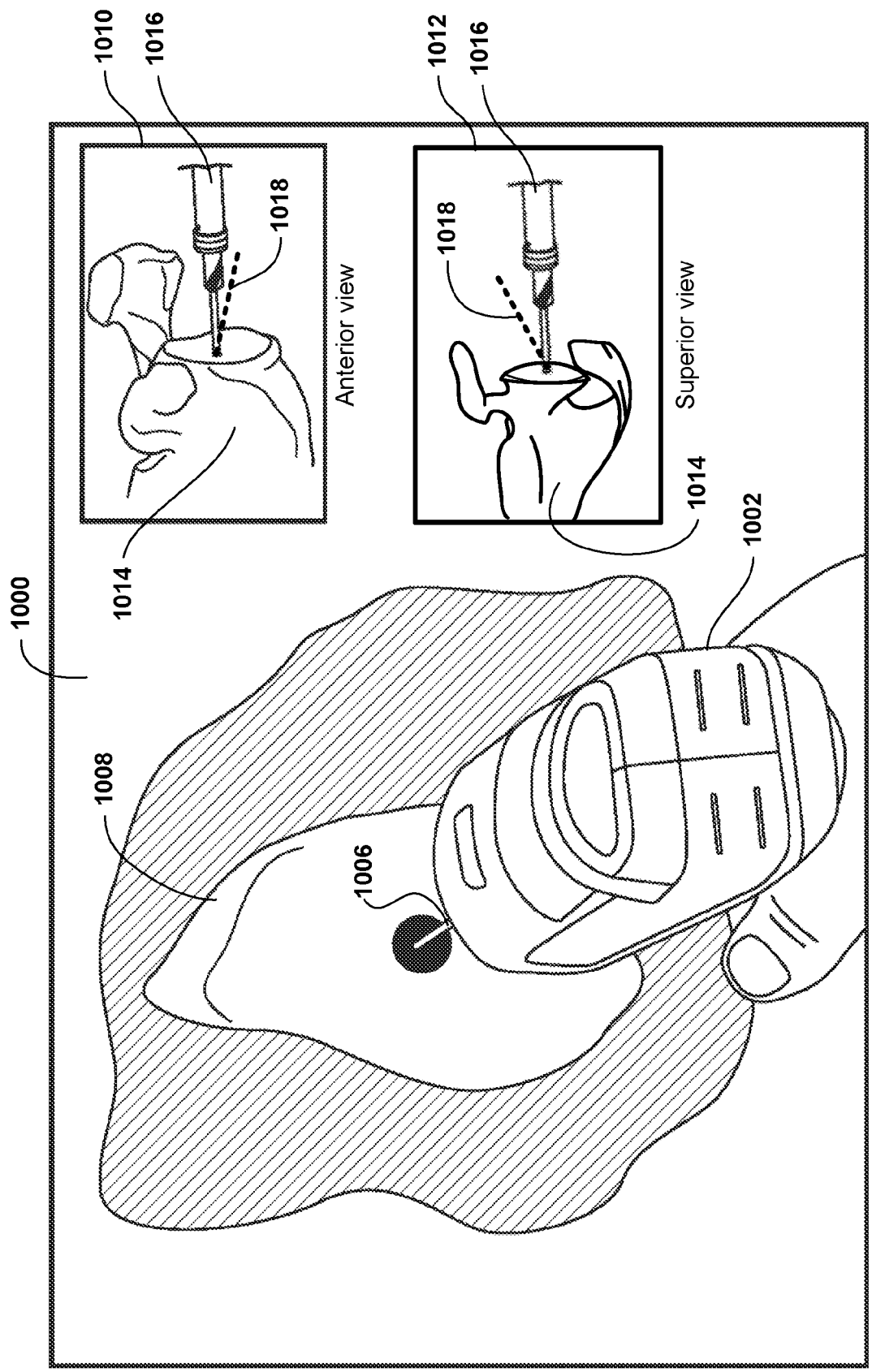
FIG. 10 is a conceptual diagram illustrating a first example MR scene in accordance with an example of this disclosure.
Figure 10A:
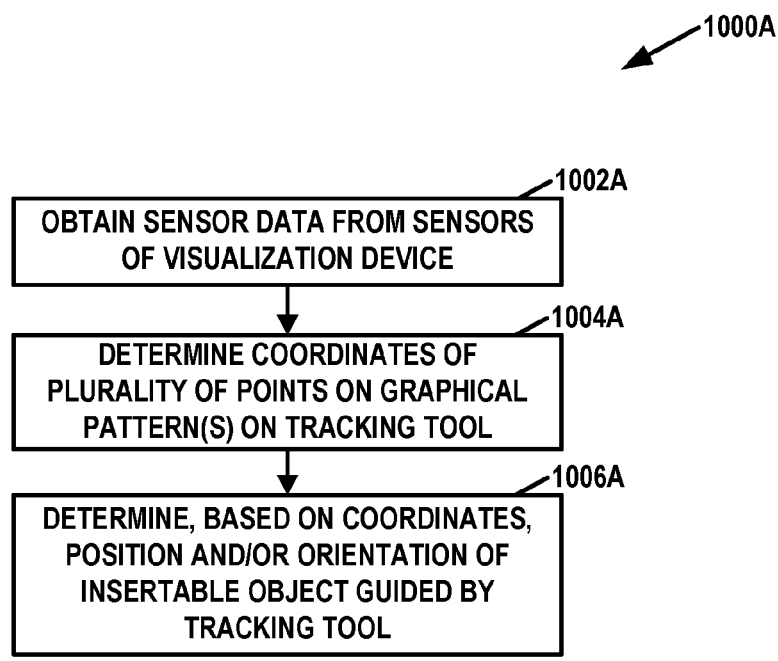
FIG. 10A is a flowchart illustrating an example operation 1100 of surgical assistance system 100 tracking a tool via a physical tracking tool, in accordance with one or more techniques of this disclosure.

FIG. 10A is a flowchart illustrating an example operation 1000A of surgical assistance system 100 tracking a tool via a physical tracking tool, in accordance with one or more techniques of this disclosure. The operation 1000A of FIG. 10A is described as being performed by surgical assistance system 100. However, the operation 1000A of FIG. 10A is not so limited.

Surgical assistance system 100 may obtain sensor data generated by one or more sensors of visualization device 213 (1002A). For instance, one or more processors 514 may obtain image data from one or more optical camera(s) 530 (or other optical sensors) and/or one or more depth camera(s) 532 (or other depth sensors) of visualization device 213. The image data may depict a scene including a physical tracking tool comprising one or more physical tracking features that each comprise a plurality of planar faces, each planar face of the plurality of planar faces including different a graphical pattern of a plurality of pre-determined graphical patterns (e.g., physical tracking tool 900 of FIG. 9A).

Surgical assistance system 100 may determine, based on the sensor data, coordinates of a plurality of points on graphical patterns on the tracking tool (1004A). For instance, one or more processors 514 may process the image data to identify coordinates of one or more corners of a rectangular perimeter of a particular graphical pattern (e.g., identify two-dimensional coordinates of corners 930 of the graphical pattern on side face 918A, and then convert said two-dimensional coordinates into three-dimensional coordinates (e.g., using Perspective-n-Point)). One or more processors 514 may identify, based on the sensor data, a graphical pattern of the plurality of pre-determined graphical patterns that corresponds to the particular graphical pattern. For instance, one or more processors 514 may determine that the graphical pattern depicted in the image data is the graphical pattern illustrated on side face 918A in FIG. 9A. One or more processors 514 may obtain a physical offset between a planar face corresponding to the identified graphical pattern. For instance, responsive to determining that the image data includes the graphical pattern illustrated on side face 918A in FIG. 9A, one or more processors 514 may obtain (e.g., from memory 516) values that represent a physical displacement between corners of the graphical pattern illustrated on side face 918A in FIG. 9A and channel 901. Processors 514 may obtain the offsets for each graphical pattern detected in the image data or a subset of the graphical patterns detected in the image data.

Surgical assistance system 100 may determine, based on the determined coordinates, a position and/or an orientation of an insertable object guided by the physical tracking tool (1006A). For instance, processors 514 may adjust the determined coordinates of a plurality of points on the graphical patterns based on the physical offset. As one example, where processors 514 determines the coordinates of corners of a rectangular perimeter as $(x_1,y_1,z_1; x_2,y_2,z_2; x_3,y_3,z_3;$ and $x_4,y_4,z_4)$ and determines the physical offset as $(x_{offset}, y_{offset}, z_{offset})$, processors 514 may average the determined coordinates to determine coordinates of a centroid of the graphical pattern (e.g., $x_{avg}, y_{avg}, z_{avg}$) and add the coordinates of the centroid with the physical offset to determine a coordinate of channel 901. Processors 514 may repeat this process for each, or a subset, of the graphical patterns detected in the image data.

FIG. 10 is a conceptual diagram illustrating a first example MR scene 1000 in accordance with an example of this disclosure. As discussed above, the surgeon may utilize one or more tools to insert an insertable item into a bone (e.g., scapula, humerus, etc.) of a patient. For example, the surgeon may use a drill, such as drill 1002, to insert an insertable item, such as a drill bit, pin, screw, or other type of insertable item into a bone of the patient. Although this disclosure describes FIG. 10 with respect to drill 1002, other types of surgical tools (e.g., an impactor) may be used to insert an insertable item into the bone of the patient. For instance, in another example, the surgeon may use an impactor to tap an insertable item, such as a surgical nail or awl, into a bone of the patient.

In some examples, the angle with which the surgeon inserts an insertable item (e.g., a drill bit, pin, screw, nail, etc.) into the bone may be important to the surgical procedure being performed by the surgeon. For instance, it may be important that a guide pin be inserted at a specific angle into a patient's scapula in order to ensure that a reaming bit inserted onto the guide pin removes the correct parts of the patient's scapula. In an example involving a trauma surgery, it may be important that a screw be inserted into a first bone fragment at a specific angle so that the screw also engages a second bone fragment.

In accordance with one or more techniques of this disclosure, surgical assistance system 100 to generate a MR scene 1000 that includes information to help the surgeon insert an insertable item 1006 in a real-world bone 1008 at the correct angle. An MR scene is a scene, as perceived by a user (e.g., a surgeon, nurse, technician, etc.), that includes both real-world and virtual elements. In the example of FIG. 10, real-world bone 1008 is a scapula. In other examples, real-world bone 1008 may be another type of bone or set of bones.

As shown in the example of FIG. 10, MR scene 1000 includes a first virtual window 1010 and a second virtual window 1012. Virtual window 1010 and virtual window 1012 display a virtual bone model 1014 from different perspectives. Virtual bone model 1014 may be a virtual model of real-world bone 1008. For instance, in some examples, virtual bone model 1014 may be a 3D model of the actual bone of the patient. In some examples, virtual bone model 1014 is a generic model of bone 1008 that is not specific to the individual patient. For instance, virtual bone model 1014 may be a mean bone model. Thus, in the example of FIG. 10, virtual bone model 1014 is a virtual model of a scapula. In some examples, virtual bone model 1014 may be based on tomographic images of the real-world bone 1008. In other examples, virtual bone model 1014 may be a mean of scapulae of multiple patients.

As mentioned above, virtual window 1010 and virtual window 1012 display virtual bone model 1014 from different perspectives. In the example of FIG. 10, virtual window 1010 displays an anterior view of virtual bone model 1014 and virtual window 1012 displays a superior view of virtual bone model 1014. The anterior view of virtual bone model 1014 is a view from the anterior side of the patient toward the posterior side of the patient along a transverse or sagittal plane. The superior view of virtual bone model 1014 is a view from the superior side of the patient toward the inferior side of the patient. In other examples, virtual window 1010 and/or virtual window 1012 may display virtual bone model 1014 from perspectives other than the anterior view and/or the superior view. In some examples, the perspectives of virtual window 1010 and virtual window 1012 are separated by 90° in a sagittal or other plane of the patient's body. In other examples, the perspectives of virtual window 1010 and virtual window 1012 are separate by angles other than 90°.

In different examples, virtual window 1010 and virtual window 1012 may appear at different positions within MR scene 1000. For instance, virtual window 1010 and virtual window 1012 may have the positions shown in the example of FIG. 10. In other examples, virtual window 1010 and virtual window 1012 may be at positions on either side of drill 1002. In some examples, virtual window 1010 and virtual window 1012 may be located above and below, or left and right, of each another. In some examples, visualization device 116 may reposition virtual window 1010 and/or virtual window 1012 within MR scene 1000 in response to one or more indications of user input. In some examples, the contents described in this disclosure as being presented in virtual window 1010 and/or virtual window 1012 may be presented in MR scene 1000 without surrounding windows.

In addition to displaying virtual bone model 1014, virtual window 1010 and virtual window 1012 display a virtual insertable item 1016 from the perspectives corresponding to virtual window 1010 and virtual window 1012, respectively. Thus, in the example of FIG. 10, virtual window 1010 displays virtual insertable item 1016 from an anterior perspective and virtual window 1012 displays virtual insertable item 1016 from a superior perspective. Virtual insertable item 1016 is a virtual object corresponding to insertable item 1006. That is, virtual insertable item 1016 is not, in some examples, a live view of the real-world insertable item 1006, but rather a virtual object that corresponds to insertable item 1006.

Visualization device 116 of surgical assistance system 100 may display virtual insertable item 1016 within virtual window 1010 and virtual window 1012 so that virtual insertable item 1016 has the same spatial relationship with virtual bone model 1014 as insertable item 1006 has with real-world bone 1008. Thus, any tilt or slant of insertable item 1006 relative to real-world bone 1008 may be reflected in virtual window 1010 and virtual window 1012. In some examples, virtual insertable item 1016 may be represented using a virtual object that resembles real-world insertable item 1006. In other examples, visualization device 116 may represent virtual insertable item 1016 in virtual window 1010 and virtual window 1012 as a line or cylinder.

Furthermore, in the example of FIG. 10, virtual window 1010 and virtual window 1012 include a virtual planned insertion axis object 1018. Virtual planned insertion axis object 1018 is a virtual object that indicates a direction along which the surgeon is to insert insertable item 1006 into real-world bone 1008. In examples where virtual bone model 1014 is not patient specific (e.g., where virtual bone model 1014 is a mean scapula model or mean model of another type of bone), virtual planned insertion axis object 1018 is be a "middle" axis in the sense that virtual planned insertion axis object 1018 is aligned with an average of insertion orientations used with respect to inserting the insertable item into bones of patients. In other words, the planned insertion axis may not necessarily be determined specifically for the patient undergoing the surgical procedure, but instead may be an average or typical axis used for inserting the insertable item into an average bone. In the example of FIG. 10, virtual planned insertion axis object 1018 is displayed in virtual window 1010 and virtual window 1012 from the perspectives corresponding to virtual window 1010 and virtual window 1012.

As shown in the example of FIG. 10, virtual insertable item 1016 is above virtual planned insertion axis object 1018 in the anterior perspective shown in virtual window 1010. Thus, to align real-world insertable item 1006 with virtual planned insertion axis object 1018, the surgeon should move drill 1002 in an inferior direction (i.e., toward the patient's feet). Furthermore, in the example of FIG. 10, virtual insertable item 1016 is above virtual insertable item 1016 in the superior view shown in virtual window 1012. Thus, to align real-world insertable item 1006 to virtual planned insertion axis object 1018, the surgeon should move drill 1002 in a posterior direction (i.e., toward the patient's back). In this way, virtual window 1010 and virtual window 1012 may help the surgeon insert real-world insertable item 1006 into real-world bone 1008 at the proper angle.

Figure 11:
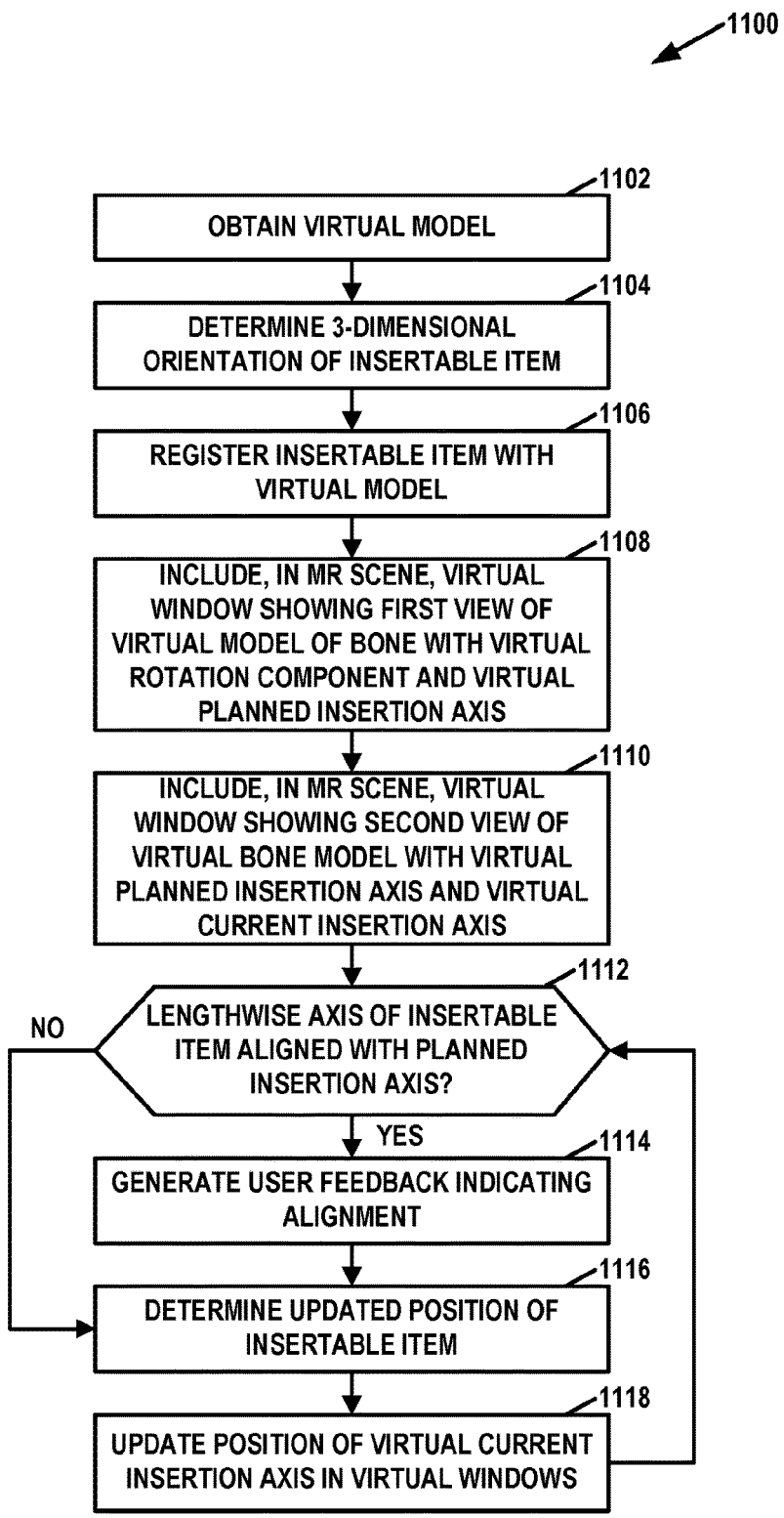
FIG. 11 is a flowchart illustrating an example operation of the surgical system corresponding to the MR scene of FIG. 10.

FIG. 11 is a flowchart illustrating an example operation 1100 of surgical assistance system 100 corresponding to the MR scene 1000 of FIG. 10. FIG. 11 is described with reference to FIG. 10. However, the operation 1100 of FIG. 11 is not so limited. As shown the example of FIG. 11, surgical assistance system 100 obtains a virtual model that includes virtual bone model 1014, virtual insertable item 1016, and virtual planned insertion axis object 1218 (1102). Virtual bone model 1014 may be a 3D virtual model of real-world bone 1008. In the virtual model, virtual bone model 1014, virtual insertable item 1016, and virtual target axis object 1018 may be located at positions in a virtual coordinate system. Virtual target axis object 1018 may be located in the virtual coordinate system such that virtual target axis object 1018 is oriented relative to virtual bone model 1014 such that a lengthwise axis of virtual target axis object 1018 intersects virtual bone model 1014 at a planned insertion point of insertable item 1406 along a planned insertion axis for insertable item 1006.

Surgical assistance system 100 may obtain the virtual model from previously stored data representing a virtual plan for the surgical procedure. In some examples, surgical assistance system 100 may obtain the virtual model by generating one or more aspects of the virtual model during the surgical procedure in response to indications of user input from the surgeon and/or other users. For instance, the surgeon may provide user input to adjust the planned insertion axis during the surgical procedure.

Additionally, surgical assistance system 100 may determine a 3D orientation of insertable item 1006 (1104). For instance, surgical assistance system 100 may determine coordinates of two or more landmarks on insertable item 1006 in a real-world coordinate system. The two or more landmarks may be different points on the lengthwise axis of insertable item 1006. In the context of a drill bit, screw, or pin, the lengthwise axis of insertable item 1006 may be an axis about which insertable item 1006 rotates. In some examples, surgical assistance system 100 may determine the 3D orientation of insertable item 1006 based on a 3D orientation of a physical tracking feature (e.g., physical tracking feature 908 (FIG. 9A)) of a physical tracking tool that includes a body (e.g., body 802 (FIG. 9A)) defining a channel (e.g., channel 901 (FIG. 9A)) through which insertable item 1006 passes during insertion of insertable item 1006 into bone 1008.

Furthermore, in the example of FIG. 11, surgical assistance system 100 may register insertable item 1006 with the virtual model (1106). For instance, surgical assistance system 100 may determine a function that translates coordinates in the real-world coordinate system to coordinates in the virtual coordinate system. An example registration process is described in U.S. Provisional Patent Application 62/804, 402, filed Feb. 12, 2019, the entire content of which is incorporated by reference.

Surgical assistance system 100 may include, in MR scene 1000, a virtual window 1010 showing a first view of virtual bone model 1014 along with virtual insertable item 1016 and virtual planned insertion axis object 1018 (1108). Additionally, surgical assistance system 100 may include, in MR scene 1000, a virtual window 1012 showing a second view of virtual bone model 1014 along with virtual insertable item 1016 and virtual planned insertion axis object 1018 (1110). The first view and the second view may be separated by 90°. For instance, in the example of FIG. 10, the first view is an anterior view of virtual bone model 1014 and the second view is a superior view of virtual bone model 1014.

In the example of FIG. 11, surgical assistance system 100 may determine whether the lengthwise axis of insertable item 1006 is aligned with a planned insertion axis for insertable item 1006 (1112). In some examples, surgical assistance system 100 may determine that the lengthwise axis of insertable item 1006 is aligned with the planned insertion axis for insertable item 1006 if a difference between an insertion point of insertable item 1006 and a planned insertion point is less than a first threshold and a difference between an angle of insertable item 1006 relative to a surface of bone 1008 and an angle of the planned insertion axis relative to a virtual bone model is less than a second threshold. In this example, the first and second thresholds may be defined in a way that distances and angles less than the first and second thresholds are acceptable for successful performance of the surgical procedure. For instance, in examples involving shoulder procedures, only angles of 2° or less may be acceptable. In the example of FIG. 10, alignment of the lengthwise axis of insertable item 1006 with the planned insertion axis may occur when virtual insertable item 1016 overlaps virtual planned insertion axis object 1018 in both virtual window 1010 and virtual window 1012.

In response to determining that the lengthwise axis of insertable item 1006 is aligned with the planned insertion axis ("YES" branch of 1112), surgical assistance system 100 may generate user feedback indicating alignment of the lengthwise axis of insertable item 1006 with the planned insertion axis (1114). For example, surgical assistance system 100 may include, in the MR scene, a virtual object that appears like a glow or halo around virtual insertable item 1016 when the lengthwise axis of insertable item 1006 is aligned with the planned insertion axis. In some examples, surgical assistance system 100 may generate an audible indication that the lengthwise axis of insertable item 1006 is aligned with the planned insertion axis. Although not shown in the example of FIG. 11, surgical assistance system 100 may generate user feedback when the lengthwise axis of insertable item 1006 is not aligned with the planned insertion axis. For example, surgical assistance system 100 may generate audible indications that the lengthwise axis of insertable item 1006 is not aligned with the planned insertion axis. In some examples, surgical assistance system 100 may change a color of virtual insertable item 1016 and/or virtual planned insertion axis object 1018 based on how far the lengthwise axis of insertable item 1006 is from being aligned with the planned insertion axis in the first or second planes, respectively.

Subsequently, surgical assistance system 100 may determine an updated position of insertable item 1106 (1116). For example, as described elsewhere in this disclosure, surgical assistance system 100 may track the position of a marker on a physical tracking tool. Surgical assistance system 100 may update the position of the virtual current drilling axis in virtual windows 1010, 1012 based on the updated position of the insertable item 1106 (1118). Surgical assistance system 100 may then again determine whether the lengthwise axis of insertable item 1106 is aligned with the planned insertion axis (1112). Surgical assistance system 100 may continue performing actions 1112 and 1118 multiple times (e.g., until a step of the surgical procedure that involves inserting insertable item 1006 into bone 1008 is complete).

Figure 12:
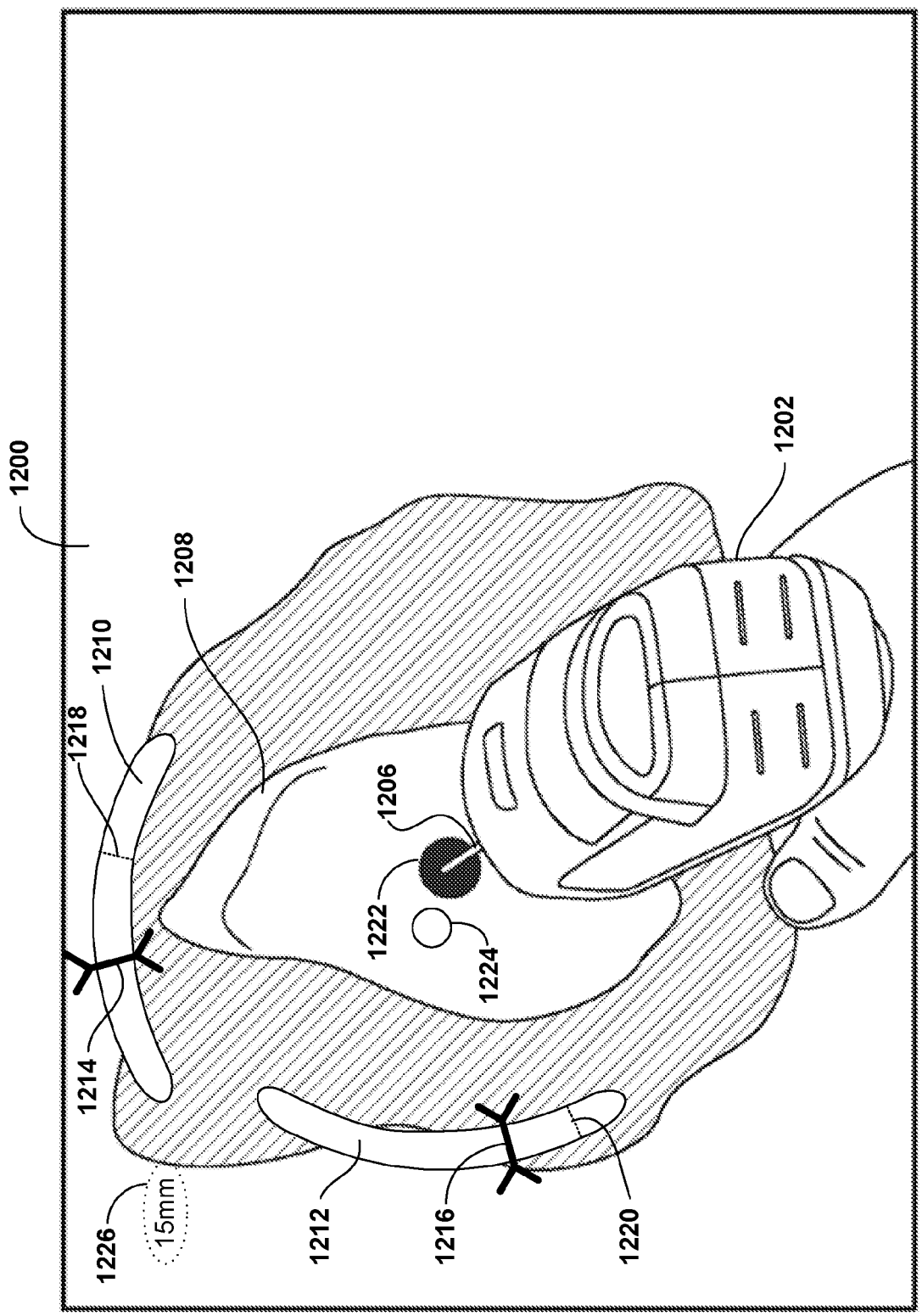
FIG. 12 is a conceptual diagram illustrating a second example MR scene in accordance with an example of this disclosure.

FIG. 12 is a conceptual diagram illustrating a second example MR scene 1200 in accordance with an example of this disclosure. In the example of FIG. 12, a surgeon may use a drill 1202 in any of the ways described above with respect to FIG. 10. Drill 1202 may be an example of a driver, such as driver 800 (FIG. 8). Thus, in the example of FIG. 12, surgical assistance system 100 may generate a MR scene 1200 that includes information to help the surgeon insert an insertable item 1206 in a real-world bone 1208 at the correct angle. In the example of FIG. 12, real-world bone 1208 is a scapula. In other examples, real-world bone 1208 may be another type of bone or set of bones. Furthermore, in the example of FIG. 12, the surgeon uses a drill 1202 to insert insertable item 1206 into real-world bone 1208. However, in other examples, the surgeon may use other types of insertable tools (e.g., an impactor) to insert insertable item 1206 into real-world bone 1208.

As shown in the example of FIG. 12, MR scene 1200 includes a first virtual guide 1210 and a second virtual guide 1212. Virtual guide 1210 and virtual guide 1212 are virtual objects designed to assist the surgeon with the task of aligning rotational component 1206 with a planned insertion axis. In some examples, MR scene 1200 may include virtual guides 1210, 1212 in addition to virtual windows 1010, 1012 of FIG. 10. In some examples, MR scene 1200 may include virtual guides 1210, 1212 as an alternative to one or more of virtual windows 1010, 1012 of FIG. 10.

Virtual guide 1210 corresponds to anterior/posterior angles (e.g., the retroversion). Virtual guide 1212 corresponds to superior/inferior angles (e.g., the inclination). Virtual guide 1210 includes a target angle marker 1214 and virtual guide 1212 includes a target angle marker 1216. Target angle marker 1214 is located on virtual guide 1210 at a position corresponding to an anterior/posterior angle of the planned insertion axis. Similarly, target angle marker 1216 is located on virtual guide 1212 at a position corresponding to a superior/inferior angle of the planned insertion axis. Surgical assistance system 100 may determine the positions of target angle marker 1214 and target angle marker 1216 based on information in a surgical plan developed during a preoperative phase of the surgical procedure. In some examples, surgical assistance system 100 may always position target angle marker 1214 and target angle marker 1216 in the center of virtual guide 1210 and virtual guide 1212, respectively.

Furthermore, in the example of FIG. 12, virtual guide 1210 includes a current angle marker 1218 and virtual guide 1212 includes a current angle marker 1220. Current angle marker 1218 is located on virtual guide 1210 at a position corresponding to an anterior/posterior angle of the real-world current insertion axis of insertable item 1206. Similarly, current angle marker 1220 is located on virtual guide 1212 at a position corresponding to a superior/inferior angle of the real-world current insertion axis of insertable item 1206.

Surgical assistance system 100 may track the position of insertable item 1206 and/or drill 1202 as insertable item 1206 and drill 1202 move. For instance, surgical assistance system 100 may track the position of a marker attached to a physical tracking tool fitted on insertable item 1206, as described elsewhere in this disclosure.

Furthermore, surgical assistance system 100 may update the positions of current angle marker 1218 and current angle marker 1220 in response to changes in the position of insertable item 1206. For example, if the surgeon moves drill 1202 in an inferior direction, surgical assistance system 100 may update current angle marker 1220 to a position corresponding to a more inferior angle.

By moving drill 1202 in such a way that current angle marker 1218 is aligned with target angle marker 1214 in virtual guide 1210 and current angle marker 1220 is aligned with target angle marker 1216 in virtual guide 1212, the surgeon may align insertable item 1206 with the planned insertion axis. Thus, in this way, the surgeon may use virtual guide 1210 and virtual guide 1212 to help ensure that the surgeon is inserting insertable item 1206 into bone 1208 at the planned insertion angle.

In some examples, surgical assistance system 100 may also assist the surgeon with positioning insertable item 1206 at a planned insertion point. For example, surgical assistance system 100 may determine a current insertion point as a point at which a lengthwise axis of insertable item 1206 intersects a surface of bone 1208. Surgical assistance system 100 may include, in MR scene 1200, a virtual current insertion point object 1222 that indicates the current insertion point. Surgical assistance system 100 may update a position of virtual current insertion point object 1222 as the surgeon moves insertable item 1206. Additionally, in some examples, surgical assistance system 100 may include, in MR scene 1200, a virtual target insertion point object 1224 that indicates a target insertion point for insertable item 1206. Surgical assistance system 100 may determine the planned insertion point based on data stored in a surgical plan for the surgical procedure.

Additionally, in this example, surgical assistance system 100 may determine a distance between the planned insertion point and the current insertion point. In some such examples, surgical assistance system 100 may present text 1224 or another type of indication of the distance between the planned insertion point and the current insertion point. In the example of FIG. 12, text 1226 indicates that the distance between the planned insertion point and the current insertion point is 15 mm.

Figure 13:
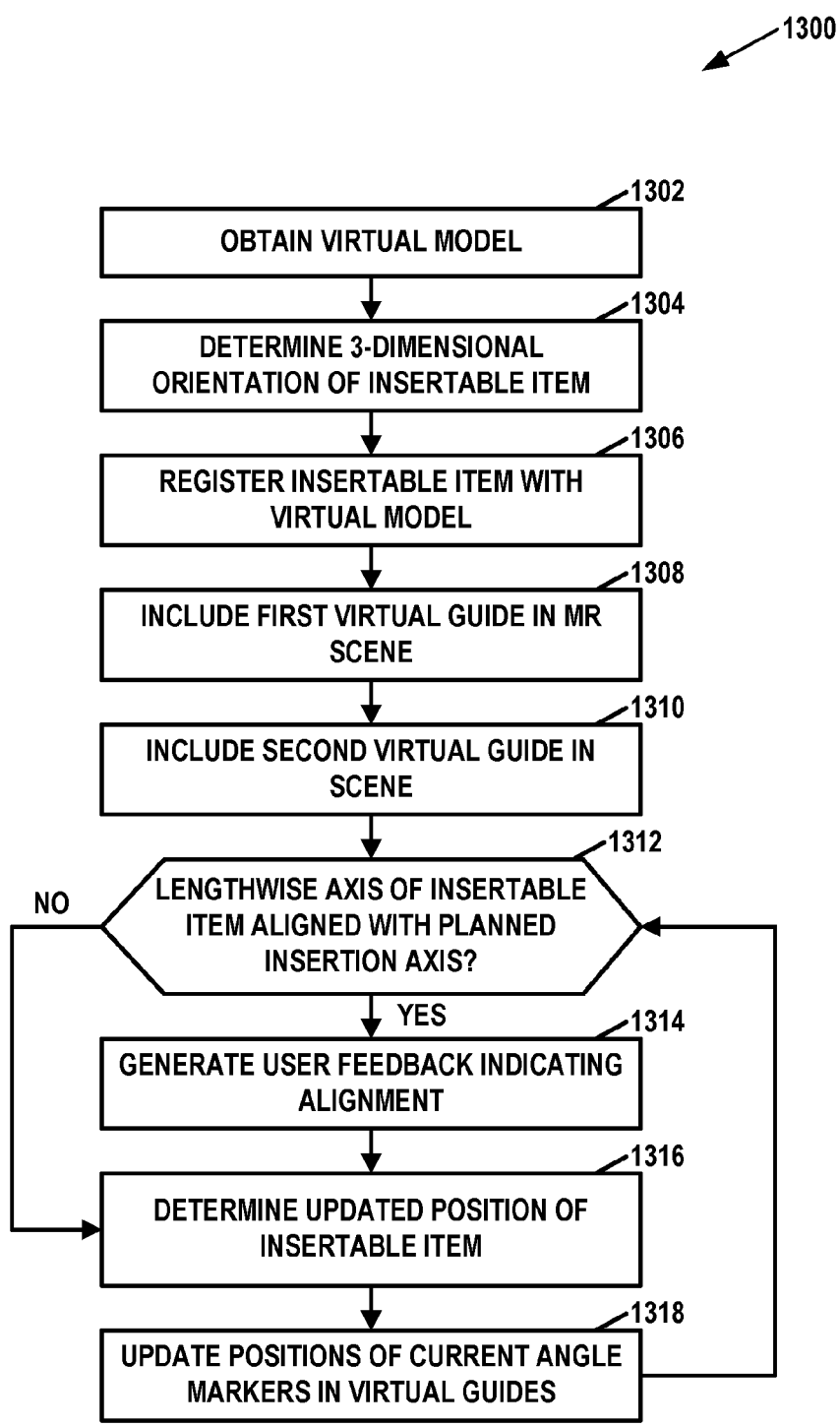
FIG. 13 is a flowchart illustrating an example operation of the surgical system corresponding to the MR scene of FIG. 12.

FIG. 13 is a flowchart illustrating an example operation 1300 of the surgical system corresponding to the MR scene of FIG. 12. FIG. 13 is described with reference to FIG. 12. However, the operation 1300 of FIG. 13 is not so limited.

As shown the example of FIG. 13, surgical assistance system 100 obtains a virtual model that represents, in a virtual 3D space, a spatial relationship between a virtual bone model and a virtual target axis (1302). The virtual bone model may be a 3D virtual model of real-world bone 1208. In the virtual model, the virtual bone model and a virtual target axis object may be located at positions in a virtual coordinate system. The virtual target axis object may be located in the virtual coordinate system such that the virtual target axis object is oriented relative to the virtual bone model such that a lengthwise axis of the virtual target axis object intersects the virtual bone model at a planned insertion point of insertable item 1206 along a planned insertion axis for insertable item 1206.

Surgical assistance system 100 may obtain the virtual model from previously stored data representing a virtual plan for the surgical procedure. In some examples, surgical assistance system 100 may obtain the virtual model by generating one or more aspects of the virtual model during the surgical procedure in response to indications of user input from the surgeon and/or other users. For instance, the surgeon may provide user input to adjust the planned insertion axis during the surgical procedure.

Additionally, surgical assistance system 100 may determine a 3D orientation of insertable item 1206 (1304). As discussed elsewhere in this disclosure, insertable item 1206 may be a surgical item to be inserted into a bone (e.g., bone 1208) of the patient during the surgical procedure. For instance, surgical assistance system 100 may determine coordinates of two or more landmarks on insertable item 1206 in a real-world coordinate system. The two or more landmarks may be different points on the lengthwise axis of insertable item 1206. In the context of a drill bit, screw, or pin, the lengthwise axis of insertable item 1206 may be an axis about which insertable item 1206 rotates. In some examples, surgical assistance system 100 may determine the 3D orientation of insertable item 1206 based on a 3D orientation of a physical tracking feature of a physical tracking tool that includes a body defining a channel through which insertable item 1206 passes during insertion of insertable item 1206 into bone 1208. The physical tracking feature being connected to a body defining a channel through which the insertable item passes during insertion of the insertable item into the bone. In other examples, the 3D object tracked by surgical assistance system 100 is a surgical tool (e.g., a drill) or insertable item 1206 itself.

Furthermore, in the example of FIG. 13, surgical assistance system 100 may register insertable item 1306 with the virtual model (1306). For instance, surgical assistance system 100 may determine a function that translates coordinates in the real-world coordinate system to coordinates in the virtual coordinate system. An example registration process is described in greater detail elsewhere in this disclosure.

Surgical assistance system 100 may include a first virtual guide in MR scene 1200, (1308). For example, surgical assistance system 100 may include virtual guide 1210 in MR scene 1200. As described elsewhere, virtual guide 1210 corresponds to an anterior/posterior angle. The first virtual guide includes a first current angle marker that indicates on the first virtual guide an orientation of insertable item 1206 in a first plane, such as a transverse plane or other plane of the body of the patient. In some examples, the first virtual guide may include a first target angle marker that indicates on the first virtual guide an orientation of a planned insertion axis in the first plane. For instance, in the example of FIG. 12, virtual guide 1210 may include target angle marker 1214 and current angle marker 1218 and the first plane is a transverse plane of the body of the patient.

Additionally, surgical assistance system 100 may include a second virtual guide in MR scene 1200 (1310). For example, surgical assistance system 100 may include virtual guide 1212 in MR scene 1200. The second virtual guide includes a second current angle marker that indicates on the second virtual guide an orientation of insertable item 1206 in a second plane, such as a coronal plane or other plane of the body of the patient. For instance, virtual guide 1212 corresponds to a superior/inferior angle. In some examples, the second virtual guide may include a second target angle marker that indicates on the second virtual guide an orientation of a planned insertion axis in the second plane. For instance, in the example of FIG. 12, virtual guide 1212 may include target angle marker 1216 and current angle marker 1220 and the second plane is a coronal plane of the body of the patient.

In the example of FIG. 13, surgical assistance system 100 may determine whether the lengthwise axis of insertable item 1206 is aligned with a planned insertion axis for insertable item 1206 (1312). In some examples, surgical assistance system 100 may determine that the lengthwise axis of insertable item 1206 is aligned with the planned insertion axis for insertable item 1206 if a difference between an insertion point of insertable item 1206 and a planned insertion point is less than a first threshold and a difference between an angle of insertable item 1206 relative to a surface of bone 1208 and an angle of the planned insertion axis relative to a virtual bone model is less than a second threshold. In this example, the first and second thresholds may be defined in a way that distances and angles less than the first and second thresholds are acceptable for successful performance of the surgical procedure. In the example of FIG. 12, alignment of the lengthwise axis of insertable item 1206 with the planned insertion axis may occur when current angle marker 1218 overlaps target angle marker 1214 and current angle marker 1220 overlaps target angle marker 1216.

In response to determining that the lengthwise axis of insertable item 1206 is aligned with the planned insertion axis ("YES" branch of 1312), surgical assistance system 100 may generate user feedback indicating alignment of the lengthwise axis of insertable item 1206 with the planned insertion axis (1314). For example, surgical assistance system 100 may include, in the MR scene, a virtual object that appears like a glow or halo around virtual guide 1210 and virtual guide 1212 when the lengthwise axis of insertable item 1206 is aligned with the planned insertion axis. In some examples, surgical assistance system 100 may generate an audible indication that the lengthwise axis of insertable item 1206 is aligned with the planned insertion axis. Although not shown in the example of FIG. 13, surgical assistance system 100 may generate user feedback when the lengthwise axis of insertable item 1206 is not aligned with the planned insertion axis. For example, surgical assistance system 100 may generate audible indications that the lengthwise axis of insertable item 1206 is not aligned with the planned insertion axis. In some examples, surgical assistance system 100 may change a color of virtual guide 1210 or virtual guide 1212 based on how far the lengthwise axis of insertable item 1206 is from being aligned with the planned insertion axis in the first or second planes, respectively.

Regardless of whether the lengthwise axis of insertable item 1206 is aligned with the planned insertion axis, surgical assistance system 100 may determine an updated position of insertable item 1206 (1316). For example, as described elsewhere in this disclosure, surgical assistance system 100 may track the position of a marker on a physical tracking tool. In this example, surgical assistance system 100 may update the positions of the current angle marker 1218 and current angle marker 1220 based on the updated position of the real-world current insertion axis (1318). Surgical assistance system 100 may then determine again whether the lengthwise axis of insertable item 1206 is aligned with the planned insertion axis (1312). Surgical assistance system 100 may continue performing actions 1312-1318 multiple times (e.g., until a step of the surgical procedure that involves inserting insertable item 1206 into bone 1208 is complete).

In some examples, as part of determining the updated position of insertable item 1206, surgical assistance system 100 may register a position of a real-world object with a position in a virtual coordinate system. The real-world object has a stable spatial distance from and orientation relative to the current axis of insertable item 1206. For instance, the real-world object may be physical tracking feature 908. In other examples, the real-world object is insertable item 1206 itself. As part of determining the updated position of insertable item 1206, surgical assistance system 100 may track the position of the real-world object. Furthermore, surgical assistance system 100 may determine, based on the position of the real-world object, a first set of coordinates for the insertable item in the virtual coordinate system and a second set of coordinates for the insertable item in the virtual coordinate system. In other examples, surgical assistance system 100 may determine more than two sets of coordinates. Additionally, surgical assistance system 100 may determine a first angle. The first angle is an angle between a first line and a first baseline. The first line is a projection of a line defined by the first and second sets of coordinates onto the first plane. Furthermore, surgical assistance system 100 may determine a second angle. The second angle is an angle between a second line and a second baseline. The second line is a projection of the line defined by the first and second sets of coordinates onto the second plane. In some examples, instead of using coordinates for the insertable item 1206, surgical assistance system 100 may determine coordinates of the real-world object directly to determine the first angle and the second angle. As part of updating the positions of the current angle markers (e.g., current angle marker 1218 and current angle marker 1220), surgical assistance system 100 may update the first current angle marker to indicate a position on the first virtual guide corresponding to the first angle and update the second current angle marker to be at a position on the second virtual guide corresponding to the second angle.

Figure 18:
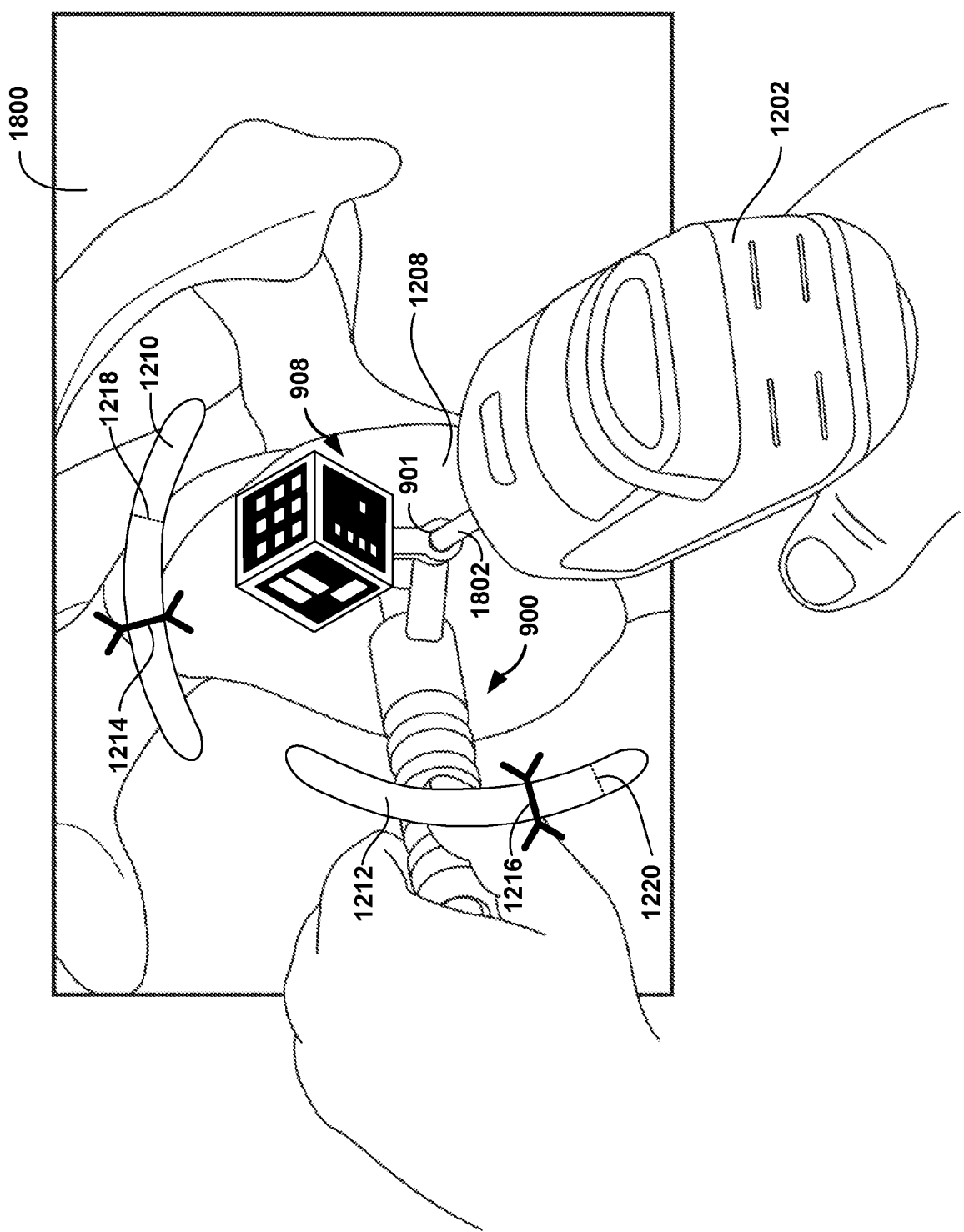
FIG. 18 is a conceptual diagram illustrating a fifth example MR scene, in accordance with an example of this disclosure.

FIG. 18 is a conceptual diagram illustrating an MR scene 1800 in accordance with an example of this disclosure. As shown in MR scene 1800 the surgeon may insert insertable item 1802 into channel 901 of physical tracking tool 900. Surgical assistance system 100 may track a position and/or orientation of insertable item 1802 using any of the techniques described herein. For example, surgical assistance system 100 may track the position and/or orientation of insertable item 1802 using the techniques discussed above with reference to FIGS. 9A-9F and 10A. Surgical assistance system 100 may utilize the determined position and/or orientation of insertable item 1802 to display virtual guidance. For instance, as shown in FIG. 18, surgical assistance system 100 may utilize the determined position and/or orientation of insertable item 1802 (e.g., as determined using physical tracking tool 900 having physical tracking feature 908) to display the virtual guidance described above with reference to FIGS. 12 and 13.

As discussed above, surgical assistance system 100 may register a virtual model of a portion of a bone of a patient to a corresponding portion of the bone viewable via visualization device 213. As also discussed above, surgical assistance system 100 may obtain the virtual model from a virtual surgical plan for an orthopedic procedure to attach a prosthetic to the bone. In the example of FIG. 18, surgical assistance system 100 may register a virtual model of real-world bone 1208 to a corresponding portion of real-world bone 1208 viewable via visualization device 213 (i.e., a portion of the scapula viewable via visualization device 213).

Figure 14:
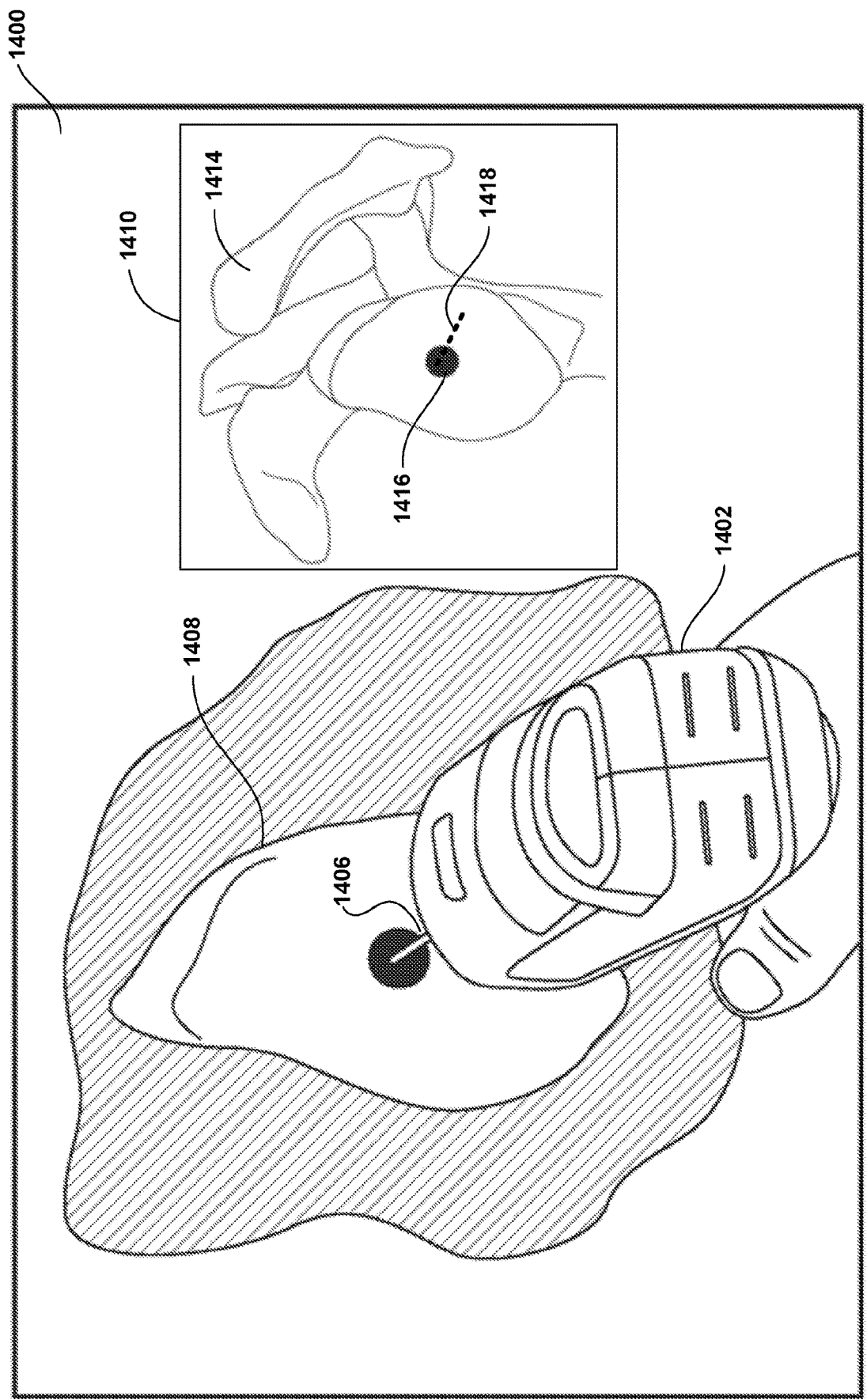
FIG. 14 is a conceptual diagram illustrating a third example MR scene in accordance with an example of this disclosure.

FIG. 14 is a conceptual diagram illustrating a third example MR scene 1400 in accordance with an example of this disclosure. As discussed above, the surgeon may utilize one or more tools to insert an insertable item into a bone (e.g., scapula, humerus, etc.) of a patient. In the example of FIG. 14, the surgeon may use a drill, such as a drill 1402, to insert an insertable item, such as a drill bit, pin, screw, or other type of insertable item into a bone of the patient. Although this disclosure describes FIG. 14 with respect to drill 1402, other types of surgical tools (e.g., an impactor) may be used to insert an insertable item into the bone of the patient. For instance, in another example, the surgeon may use an impactor to tap an insertable item, such as a surgical nail or awl, into a bone of the patient.

One of the issues confronting surgeons when using surgical tools to insert insertable items into bones of patients is that the surgical tools may fully or partially block the surgeons' look down the axes of the insertable items. This inability to look down the axes of an insertable item may hinder the ability of a surgeon to insert the insertable item into the bone of the patient at the correct angle.

Hence, in accordance with one or more techniques of this disclosure, surgical assistance system 100 to generate MR scene 1400 that includes information to help the surgeon insert an insertable item 1406 in a real-world bone 1408 at the correct angle. As described herein, surgical assistance system 100 may include a virtual window that shows a virtual view along the axis of an insertable item. In the example of FIG. 14, real-world bone 1408 is a scapula. In other examples, real-world bone 1408 may be another type of bone or set of bones. Although described as being within a virtual window, in some examples, the virtual view along the axis of the insertable item is not contained within a dedicated window, but rather may appear to float freely in space within MR scene 1400.

As shown in the example of FIG. 14, MR scene 1400 includes a virtual window 1410. Virtual window 1410 may display a virtual bone model 1414 from a perspective aligned with an axis of insertable item 1406. Virtual bone model 1414 is a virtual model of real-world bone 1408. In some examples, virtual bone model 1620 may be patient-specific. In other examples, virtual bone model 1620 may be generic across multiple patients. In the example of FIG. 14, virtual bone model 1414 is a virtual model of a scapula. Virtual bone model 1414 may be based on tomographic images of the real-world bone 1408. In this way, MR scene 1400 includes a dual view of the bone: one view of real-world bone 1408 and one view of a virtual model of bone 1408.

As mentioned above, virtual window 1410 displays virtual bone model 1414 from a perspective aligned with the axis of insertable item 1406. Thus, in the example of FIG. 14, a circle-shaped virtual element 1416 may represent a point where an axis of insertable item 1406 intersects a surface of virtual bone model 1414. As the surgeon changes the angle of drill 1402, surgical assistance system 100 may change the orientation of virtual bone model 1414 in virtual window 1410 so that virtual window 1414 continues to show virtual bone model 1414 from the perspective aligned with the axis of insertable item 1406.

Additionally, surgical assistance system 100 may include a virtual target axis object 1418 in virtual window 1414. Virtual target axis object 1418 corresponds to a planned insertion axis along which the surgeon is to insert insertable item 1406 into bone 1408. Thus, virtual target axis object 1418 may appear to extend outwardly from virtual bone model 1414 at an angle relative to the surface of virtual bone model 1414 at which insertable item 1406 is to be inserted into bone 1408. Because surgical assistance system 100 updates the perspective of virtual bone model 1414 as the surgeon changes the angle of drill 1402, virtual target axis object 1418 is visible in virtual window 1410 when insertable item 1406 is not align with virtual target axis object 1418. Conversely, as the surgeon changes the angle of drill 1402 to get insertable item 1406 closer into alignment with the planned insertion axis, virtual target axis object 1418 may appear to get shorter and shorter because the surgeon's perspective on virtual target axis object 1418 is getting closer and closer to looking straight down the long axis of virtual target axis object 1418. Thus, when insertable item 1406 is aligned with the planned insertion axis, the surgeon may be looking straight down the axis of virtual target axis object 1418. Accordingly, in the example of FIG. 14, virtual target axis object 1418 may seem to disappear inside of virtual element 1416 when insertable item 1406 is aligned with the planned insertion axis. Therefore, by moving drill 1402 around until virtual target axis object 1418 disappears inside virtual element 1416, the surgeon may correctly orient insertable item 1406 along the planned insertion axis. In this way, the surgeon may use virtual window 1410 to align insertable item 1406 with the planned insertion axis.

In some examples, surgical assistance system 100 may present virtual window 1410 in addition to one or more of virtual windows 1010, 1012 (FIG. 10) and/or virtual guides 1212, 1214 (FIG. 12). In other examples, surgical assistance system 100 may present virtual window 1410 as an alternative to one or more of virtual windows 1010, 1012 (FIG. 10) and/or guides 1212, 1214. In some examples, which ones of or combinations of virtual window 1410, virtual windows 1010, 1012, and/or virtual guides 1212, 1214 are presented is user configurable.

Figure 15:
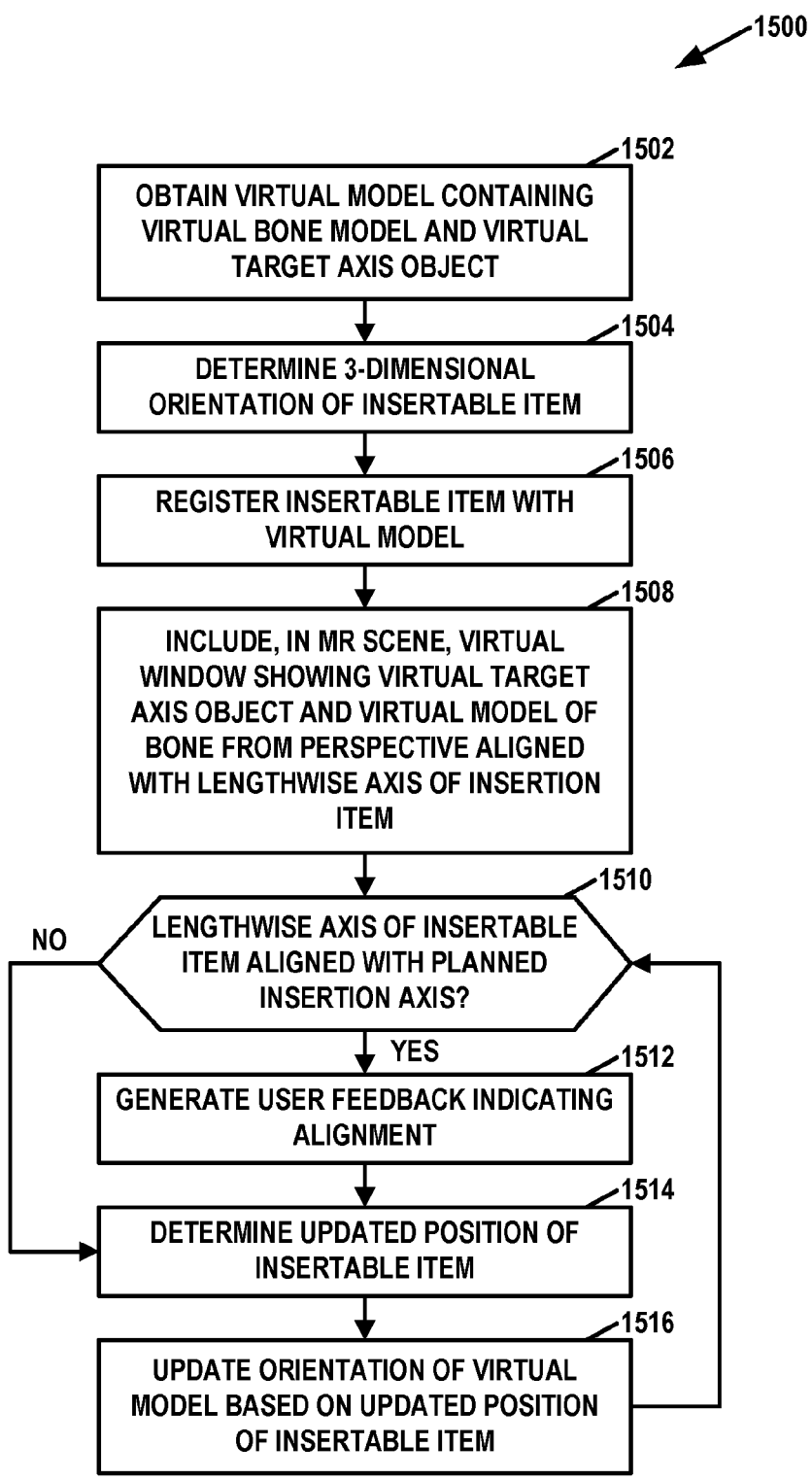
FIG. 15 is a flowchart illustrating an example operation of the surgical system corresponding to the MR scene of FIG. 14.

FIG. 15 is a flowchart illustrating an example operation 1500 of surgical system 100 corresponding to the MR scene of FIG. 14. FIG. 15 is described with reference to FIG. 14. However, the operation 1500 of FIG. 15 is not so limited. Like the other flowcharts of this disclosure, FIG. 15 is provided as an example. Other examples may include more, fewer, or different actions.

As shown the example of FIG. 15, surgical assistance system 100 obtains a virtual model that includes virtual bone model 1414 and virtual target axis object 1418 (FIG. 14) (1502). Virtual bone model 1414 may be a 3D virtual model of real-world bone 1408. In the virtual model, virtual bone model 1414 and virtual target axis object 1418 may be located at positions in a virtual coordinate system. Virtual target axis object 1418 may be located in the virtual coordinate system such that virtual target axis object 1418 is oriented relative to virtual bone model 1414 such that a lengthwise axis of virtual target axis object 1418 intersects virtual bone model 1414 at a planned insertion point of insertable item 1406 along a planned insertion axis for insertable item 1406.

Surgical assistance system 100 may obtain the virtual model from previously stored data representing a virtual plan for the surgical procedure. In some examples, surgical assistance system 100 may obtain the virtual model by generating one or more aspects of the virtual model during the surgical procedure in response to indications of user input from the surgeon and/or other users. For instance, the surgeon may provide user input to adjust the planned insertion axis during the surgical procedure.

Additionally, surgical assistance system 100 may determine a 3D orientation of insertable item 1406 (1504). For instance, surgical assistance system 100 may determine coordinates of two or more landmarks on insertable item 1406 in a real-world coordinate system. The two or more landmarks may be different points on the lengthwise axis of insertable item 1406. In the context of a drill bit, screw, or pin, the lengthwise axis of insertable item 1406 may be an axis about which insertable item 1406 rotates. In some examples, surgical assistance system 100 may determine the 3D orientation of insertable item 1406 based on a 3D orientation of a physical tracking feature of a physical tracking tool that includes a body defining a channel through which insertable item 1406 passes during insertion of insertable item 1406 into bone 1408.

Furthermore, in the example of FIG. 15, surgical assistance system 100 may register insertable item 1406 with the virtual model (1506). For instance, surgical assistance system 100 may determine a function that translates coordinates in the real-world coordinate system to coordinates in the virtual coordinate system. An example registration process is described in greater detail elsewhere in this disclosure.

Surgical assistance system 100 may include, in MR scene 1500, virtual bone model 1414 and virtual target axis object 1418 from a perspective aligned with the lengthwise axis of insertable item 1406 (1508). For instance, surgical assistance system 100 may change of viewing position of the virtual model containing virtual bone model 1414 and virtual target axis object 1418 so that a viewing position of the virtual model remains aligned with the lengthwise axis of insertable item 1406.

In some examples, surgical assistance system 100 may also include, in MR scene 1500, a virtual element 1416 representing insertable item 1406 from the perspective aligned with the lengthwise axis of insertable item 1406. Virtual element 1416 may help the surgeon place a tip of insertable item 1406 at a planned insertion point for insertable item 1406. Furthermore, in some such examples, surgical assistance system 100 may also include, in MR scene 1500, a virtual target insertion point object. The virtual target insertion point object may be a virtual object having a shape, such as a circle or polygon. The planned insertion point for insertable item 1406 may be a point on bone 1408 where a surgical plan for the surgical procedure specifies that insertable item 1406 is to be inserted into bone 1408. Virtual target insertion point 1417 may be located at a position on a surface of virtual bone model 1414 corresponding to the planned insertion point for insertable item 1406. The surgeon may use the virtual target insertion point object as a target for positioning a tip of insertable item 1406. In some examples, surgical assistance system 100 includes virtual target axis object 1418 in virtual window 1410 in response to determining that the tip of insertable item 1406 is positioned at the planned insertion point for insertable item 1406.

In the example of FIG. 15, surgical assistance system 100 may determine whether the lengthwise axis of insertable item 1406 is aligned with virtual target axis object 1418 (1510). In some examples, surgical assistance system 100 may determine that the lengthwise axis of insertable item 1406 is aligned with virtual target axis object 1418 if a difference between an insertion point of insertable item 1406 and an intersection point of virtual bone model 1414 and virtual target axis object 1418 is less than a first threshold and a difference between an angle of insertable item 1406 relative to a surface of bone 1408 and an angle of virtual target axis object 1418 relative to virtual bone model 1414 is less than a second threshold. In this example, the first and second thresholds may be defined in a way that distances and angles less than the first and second thresholds are acceptable for successful performance of the surgical procedure.

In response to determining that the lengthwise axis of insertable item 1406 is aligned with the planned insertion axis, and hence virtual target axis object 1418 ("YES" branch of 1510), surgical assistance system 100 may generate user feedback indicating alignment of the lengthwise axis of insertable item 1406 with the planned insertion axis (1512). For example, surgical assistance system 100 may include, in the MR scene, a virtual object that appears like a glow or halo around virtual target axis object 1418 when the lengthwise axis of insertable item 1406 is aligned with the planned insertion axis, and hence virtual target axis object 1418. In some examples, surgical assistance system 100 may generate an audible indication that the lengthwise axis of insertable item 1406 is aligned with virtual target axis object 1418. Although not shown in the example of FIG. 15, surgical assistance system 100 may generate user feedback when the lengthwise axis of insertable item 1406 is not aligned with the planned insertion axis. For example, surgical assistance system 100 may generate audible indications that the lengthwise axis of insertable item 1406 is not aligned with the planned insertion axis. In some examples, surgical assistance system 100 may change a color of virtual target axis object 1418 based on how far virtual target axis object 1418 is from being aligned with the planned insertion axis, and hence the lengthwise axis of insertable item 1406.

Regardless of whether the lengthwise axis of insertable item 1406 is aligned with the planned insertion axis, surgical assistance system 100 may determine an updated real-world position of insertable item 1406 (1514). For example, as described elsewhere in this disclosure, surgical assistance system 100 may track the position of a physical tracking feature of a physical tracking tool. In this example, surgical assistance system 100 may determine the updated position of insertable item 1406 based on an updated position of the physical tracking feature.

Surgical assistance system 100 may update the orientation of the virtual model containing virtual target axis object 1418 and virtual bone model 1414 based on the updated position of insertable item 1406 so that virtual target axis object 1418 and virtual bone model 1414 are shown in MR scene 1400 from the perspective aligned with the lengthwise axis of insertable item 1406 (1516). For instance, surgical assistance system 100 may change a viewing position of the virtual model so that the viewing position continues to remain aligned with the lengthwise axis of insertable item 1406. Surgical assistance system 100 may then determine again whether the lengthwise axis of insertable item 1406 is aligned with the planned insertion axis. Surgical assistance system 100 may continue performing actions 1510-1516 multiple times (e.g., until a step of the surgical procedure that involves inserting insertable item 1406 into bone 1408 is complete).

Although FIG. 15 has been described with respect to an example where the virtual model includes virtual target axis object 1418, virtual target axis object 1418 may be omitted in some examples. Thus, in such examples, surgical assistance system 100 may include, in a MR scene that includes the bone of the patient, a virtual model of the bone from a perspective aligned with an axis of the insertable item. In such examples, surgical assistance system 100 may update, based on the updated position of insertable item 1406, an orientation of virtual target axis object 1418 so that virtual window 1410 continues to show the virtual target axis object 1418 from the perspective aligned with the lengthwise axis of insertable item 1406.

Figure 16:
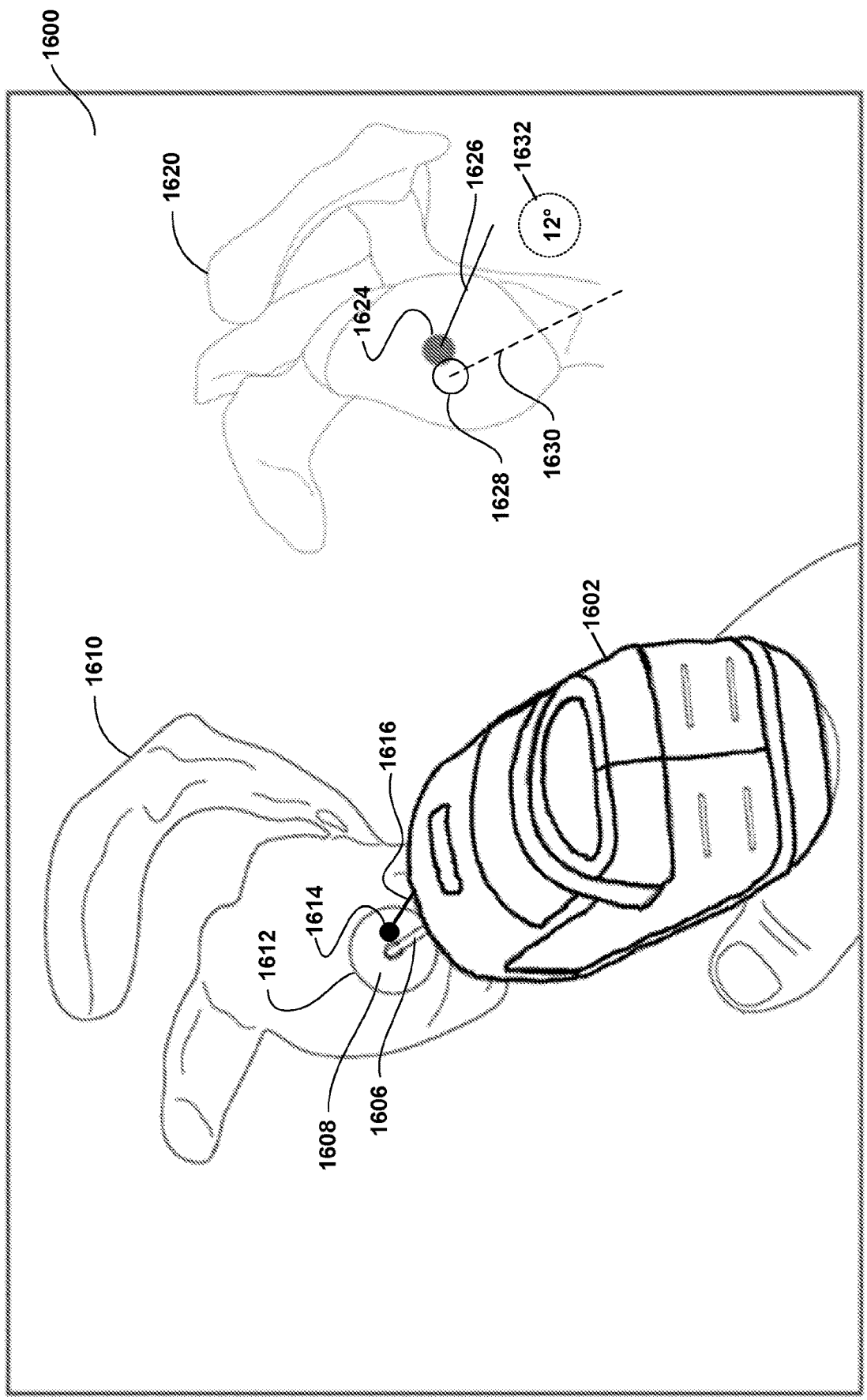
FIG. 16 is a conceptual diagram illustrating a fourth example MR scene in accordance with an example of this disclosure.

FIG. 16 is a conceptual diagram illustrating a fourth example MR scene in accordance with an example of this disclosure. As discussed above, the surgeon may utilize one or more tools to insert an insertable item into a bone (e.g., scapula, humerus, etc.) of a patient. In the example of FIG. 16, the surgeon may use a drill, such as a drill 1602, to insert an insertable item, such as a drill bit, pin, screw, or other type of insertable item into a bone of the patient. Although this disclosure describes FIG. 16 with respect to drill 1602, other types of surgical tools (e.g., an impactor) may be used to insert an insertable item into the bone of the patient. For instance, in another example, the surgeon may use an impactor to tap an insertable item, such as a surgical nail or awl, into a bone of the patient.

As discussed above with respect to FIG. 14, one of the issues confronting surgeons when using surgical tools to insert insertable items into bones of patients is that the surgical tools may fully or partially block the surgeons' look down the axes of the insertable items. This inability to look down the axes of an insertable item may hinder the ability of a surgeon to insert the insertable item into the bone of the patient at the correct angle. Like the examples described with respect to FIG. 14 and FIG. 15, the examples described with respect to FIG. 16 and FIG. 17 may also address such issues. That is, in the example of FIG. 16 and FIG. 17, surgical assistance system 100 to generate MR scene 1600 that includes information to help the surgeon insert an insertable item 1606 in a real-world bone 1608 at the correct angle.

As shown in the example of FIG. 16, a surgeon is using drill 1602 to insert an insertable item 1604 into real-world bone 1608. Furthermore, in the example of FIG. 16, surgical assistance system 100 superimposes a first virtual bone model 1610 over real-world bone 1608 in MR scene 1600. Virtual bone model 1610 is a 3D virtual model of real-world bone 1608 or a portion of real-world bone 1608. For instance, in examples such as the example of FIG. 16 where real-world bone 1608 is a patient's scapula, virtual bone model 1610 is a virtual model of the patient's scapula. Virtual bone model 1610 may be based on medical imaging of the real-world bone 1608.

Surgical assistance system 100 registers virtual bone model 1610 with real-world bone 1608 and maintains an alignment in MR scene 1600 between virtual bone model 1610 and real-world bone 1608. Thus, as the surgeon's viewing position of real-world bone 1608 changes, surgical assistance system 100 may scale and/or reorient virtual bone model 1610 within MR scene 1600 so that virtual bone model 1610 appears to remain aligned with real-world bone 1608. In this way, virtual bone model 1610 may help the surgeon understand the orientation of real-world bone 1608 within the body of the patient despite portions of real-world bone 1608 being obscured by other tissues (e.g., muscle, skin, etc.) of the patient.

Furthermore, in the example of FIG. 16, surgical assistance system 100 may define a window 1612 in virtual bone model 1610. Window 1612 may be an opening through virtual bone model 1610 through which the surgeon is able to see a planned insertion point of insertable item 1606 in real-world bone 1608. Thus, in the example of FIG. 16, while surgical assistance system 100 may superimpose virtual bone model 1610 over parts of real-world bone 1608, window 1612 allows the surgeon to see the portion of real-world bone 1608 on which the surgeon is working.

Surgical assistance system 100 may also include a virtual target insertion point object 1614 in MR scene 1600. Surgical assistance system 100 positions virtual target insertion point object 1614 in MR scene 1600 at a position corresponding to a location on real-world bone 1608 where the surgeon is to insert insertable item 1606 into real-world bone 1608 according to a surgical plan for the surgical procedure. In some examples, virtual target insertion point object 1614 is not a separate virtual object but forms part of the same virtual object as virtual bone model 1610.

In addition, surgical assistance system 100 may include a virtual target axis object 1616 in MR scene 1600. Virtual target axis object 1616 corresponds to a planned insertion axis along which the surgeon is to insert insertable item 1606 into bone 1608. Thus, virtual target axis object 1616 may appear to extend outwardly from bone 1608 and virtual bone model 1610 at an angle relative to the surface of bone 1608 and virtual bone model 1610 at which insertable item 1606 is to be inserted into bone 1608. In some examples, virtual target insertion point object 1614, virtual target axis object 1616, and virtual bone model 1610 may be separate virtual objects or two or more of virtual target insertion point object 1614, virtual target axis object 1616 may be the same virtual object.

As shown in the example of FIG. 16, it may be difficult at times for the surgeon to see one or more of virtual insertion point object 1614 or virtual target axis object 1616, or portions thereof, because virtual insertion point object 1614 and/or virtual target axis object 1616, or portions thereof, are obscured by drill 1602 (or another surgical tool), the surgeon's own hand, or other objects. For instance, in the example of FIG. 16, only a small portion of virtual target axis object 1616 is visible because a remainder of virtual target axis object 1616 is obscured by drill 1602. Not being able to see virtual insertion point object 1614 and/or virtual target axis object 1616, or portions thereof, may hinder the ability of the surgeon to insert insertable item 1606 into bone 1608 at a planned insertion point and/or insert insertable item 1606 into bone 1608 at a planned insertion angle. This may lead to frustration on the part of the surgeon and/or slow surgical times.

In accordance with one or more techniques of this disclosure, surgical assistance system 100 may include a second virtual bone model 1620. Virtual bone model 1620 may include a 3D virtual model of real-world bone 1608 or a portion of real-world bone 1608 into which the surgeon plans to insert insertable item 1606. In some examples, virtual bone model 1620 may be patient-specific. In other examples, virtual bone model 1620 may be generic across multiple patients. Surgical assistance system 100 may position virtual bone model 1620 in MR scene 1600 at a position far enough away from bone 1608 and drill 1602 (or other surgical tool) that the surgeon may be able to see both virtual bone model 1610 and virtual bone model 1620 simultaneously and without virtual bone model 1610 being obscured by drill 1602 (or other surgical tool) or another object, such as the surgeon's hand.

Surgical assistance system 100 may align virtual bone model 1610 in 3D space in the same orientation as the bone 1608. Surgical assistance system 100 may use a registration process, such as any of the registration processes described elsewhere in this disclosure, to determine how to align virtual bone model 1620 in 3D space with bone 1608. Thus, as the surgeon moves around to view bone 1608 from different angles, surgical assistance system 100 reorients virtual bone model 1620 in 3D space so that the surgeon is able to see virtual bone model 1620 from the same angle as bone 1608.

Additionally, in the example of FIG. 16, surgical assistance system 100 may include a virtual target insertion point object 1624 in MR scene 1600. Surgical assistance system 100 positions virtual target insertion point object 1624 on virtual bone model 1620 that corresponds to the location on real-world bone 1608 where the surgeon is to insert insertable item 1606 into real-world bone 1608 according to a surgical plan for the surgical procedure. In some examples, virtual target insertion point object 1614 is not a separate virtual object but forms part of the same virtual object as virtual bone model 1610.

Surgical assistance system 100 may also include a virtual planned insertion axis 1622 in MR scene 1600. Virtual target axis object 1626 corresponds to a planned insertion axis along which the surgeon is to insert insertable item 1606 into bone 1608. Thus, virtual target axis object 1618 may appear to extend outwardly from virtual bone model 1614 at an angle relative to the surface of virtual bone model 1614 at which insertable item 1606 is to be inserted into bone 1608.

Furthermore, in the example of FIG. 16, surgical assistance system 100 may include a virtual current insertion point object 1268 in MR scene 1600. Virtual current insertion point object 1268 is a virtual object that corresponds to a location on virtual bone model 1620 where insertable item 1606 is current in contact with bone 1608 or where insertable item 1606 would enter bone 1608 if insertable item 1606 were translated along a lengthwise axis of insertable item 1606. Surgical assistance system 100 may update the position of virtual current insertion point object 1268 to maintain this correspondence as the surgeon moves insertable item 1608. In this way, virtual current insertion point object 1268 may help the surgeon understand a position of insertable item 1606 relative to bone 1608. By comparing the locations of virtual target insertion point object 1614 and virtual current insertion point object 1268, the surgeon may be able to determine whether a tip of insertable item 1606 is at a planned insertion location on bone 1608.

In the example of FIG. 16, surgical assistance system 100 also includes a virtual current axis object 1630. Virtual current axis object 1630 is a virtual object having a lengthwise axis having a spatial orientation relative to virtual bone model 1620 that corresponds to a spatial orientation of the lengthwise axis of insertable item 1606 relative to bone 1608. Surgical assistance system 100 may update the position of virtual current axis object 1230 to maintain this correspondence as the surgeon moves insertable item 1608. Thus, if the surgeon tilts insertable item 1608 in a superior direction relative to bone 1606 by 5°, surgical assistance system 100 updates virtual bone model 1620 within MR scene 1600 such that virtual current axis object 1630 appears to move in the superior direction relative to virtual bone model 1620 by 5°. By comparing the orientations of virtual target axis object 1626 and virtual current axis object 1630, the surgeon may be able to determine whether the lengthwise axis of insertable item 1606 is aligned with the planned insertion axis along which the surgeon is to insert insertable item 1608 into bone 1608.

In some instances, depending on the position of the surgeon, the lengthwise axis of insertable item 1608 may be aligned with a gaze line of the surgeon. When this occurs, the surgeon may be unable to see bone 1608 because bone 1608 would be blocked by drill 1602. When this occurs, virtual bone model 1620 is also shown from a perspective down the lengthwise axis of insertable item 1608. Thus, using virtual bone model 1620, the surgeon may be able to have a view that may be equivalent to a view of bone 1608 that would otherwise be blocked by drill 1602.

Furthermore, in the example of FIG. 16, MR scene 1600 includes an angle indicator 1632. Angle indicator 1632 indicates a 3D angle between the planned insertion axis and the lengthwise axis of insertable item 1606.

In some examples, virtual target insertion point object 1624, virtual target axis object 1626, and virtual bone model 1620 may be separate virtual objects or two or more of virtual target insertion point object 1624, virtual target axis object 1626, or virtual bone model 1620 may be the same virtual object. In some examples, virtual current insertion point object 1628 and virtual current axis object 1630 may be separate virtual objects or virtual current insertion point object 1628 and virtual current axis object 1630 may be the same virtual object.

Figure 17:
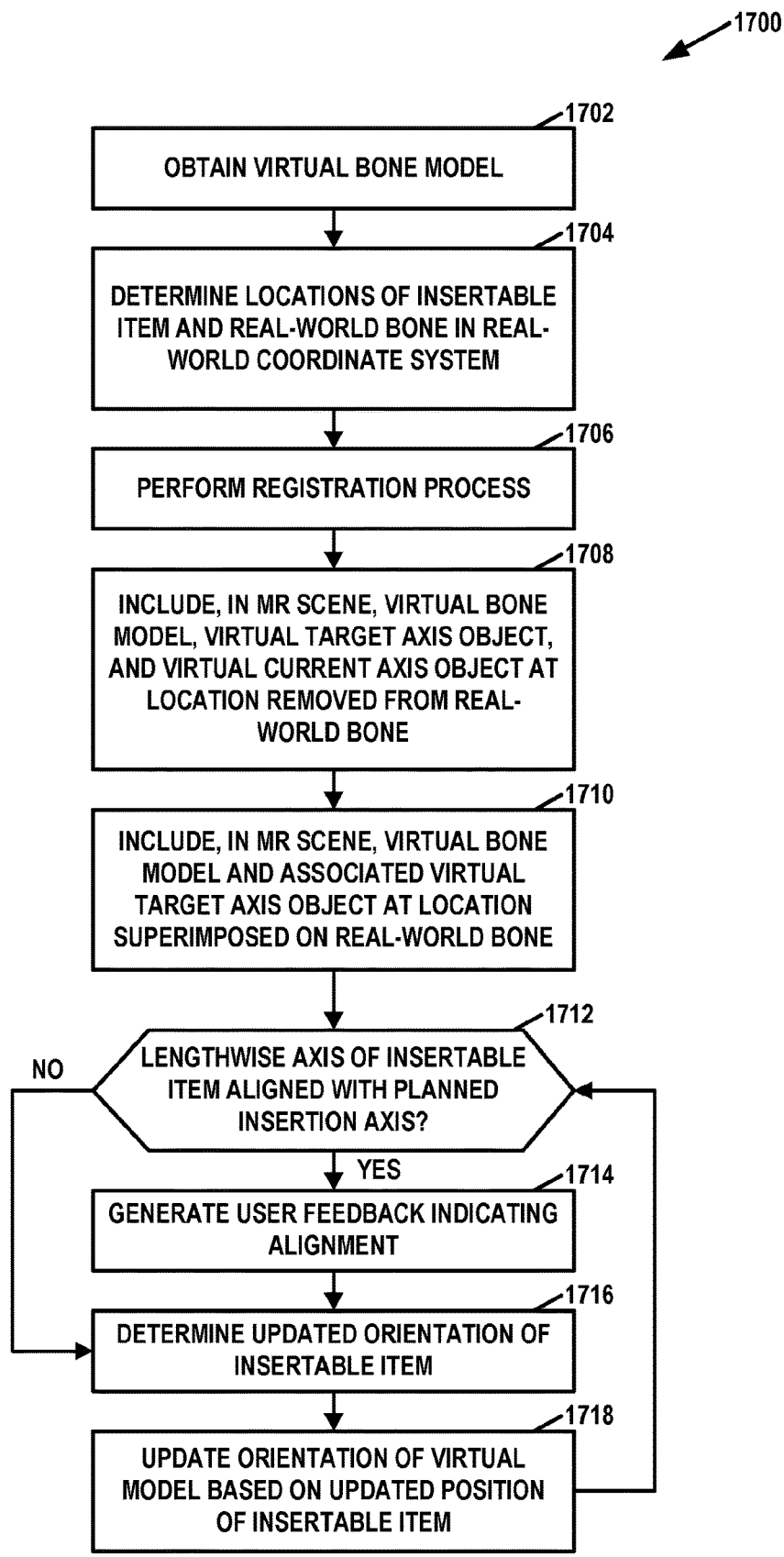
FIG. 17 is a flowchart illustrating an example operation of the surgical system corresponding to the MR scene of FIG. 16.

FIG. 17 is a flowchart illustrating an example operation 1700 of the surgical system corresponding to the MR scene of FIG. 16. However, the operation 1700 of FIG. 17 is not so limited. Like the other flowcharts of this disclosure, FIG. 17 is provided as an example. Other examples may include more, fewer, or different actions.

As shown the example of FIG. 17, surgical assistance system 100 obtains virtual bone model 1620 (FIG. 14) (1702). Virtual bone model 1620 may be a 3D virtual model of real-world bone 1608. Virtual bone model 1620 may be located at positions in a virtual coordinate system.

In some examples, surgical assistance system 100 also obtains virtual target axis object 1626. Virtual target axis object 1626 may be located in the virtual coordinate system such that virtual target axis object 1626 is oriented relative to virtual bone model 1620 such that a lengthwise axis of virtual target axis object 1626 intersects virtual bone model 1620 at a planned insertion point of insertable item 1606 along a planned insertion axis for insertable item 1606.

Surgical assistance system 100 may obtain virtual bone model 1620, virtual target insertion point object 1624, and virtual target axis object 1626 from previously stored data representing a surgical plan for the surgical procedure. In examples that include virtual bone model 1610, virtual target insertion point object 1614, and/or virtual target insertion axis object 1616, surgical assistance system 100 may also retrieve these virtual objects from previously stored data representing the surgical plan for the surgical procedure. In some examples, surgical assistance system 100 may obtain one or more of the virtual objects (e.g., virtual bone model 1610, virtual target insertion point object 1614, virtual target insertion axis object 1616, virtual bone model 1620, virtual target insertion point object 1624, and virtual target axis object 1626) by generating one or more aspects of the virtual objects during the surgical procedure in response to indications of user input from the surgeon and/or other users. For instance, the surgeon may provide user input to adjust the planned insertion axis during the surgical procedure.

Surgical assistance system 100 may store positions of virtual objects (e.g., virtual bone model 1610, virtual target insertion point object 1614, virtual target insertion axis object 1616, virtual bone model 1620, virtual target insertion point object 1624, virtual target axis object 1626, etc.) in a virtual coordinate system. The virtual coordinate system is a coordinate system for tracking positions of virtual objects.

Surgical assistance system 100 may determine locations of insertable item 1606 and real-world bone 1608 in a real-world coordinate system (1704). For instance, in some examples, surgical assistance system 100 may use a SLAM algorithm to determine the location of bone 1608 and insertable item 1606 in the real-world coordinate system. Furthermore, in some examples, to determine the location in the real-world coordinate system of insertable item 1606 and to continue tracking the location of insertable item 1606 in the real-world coordinate system, surgical assistance system 100 may determine coordinates of two or more landmarks on insertable item 1606 in a real-world coordinate system. The two or more landmarks may be different points on the lengthwise axis of insertable item 1606. In the context of a drill bit, screw, or pin, the lengthwise axis of insertable item 1606 may be an axis about which insertable item 1606 rotates. In some examples, surgical assistance system 100 may determine the 3D orientation of insertable item 1606 based on a 3D orientation of a physical tracking feature of a physical tracking tool that includes a body defining a channel through which insertable item 1606 passes during insertion of insertable item 1606 into bone 1608, as described in detail elsewhere in this disclosure.

Additionally, surgical assistance system 100 may perform a registration process to register the real-world coordinate system with the virtual coordinate system (1704). Registering the real-world coordinate system with the virtual coordinate system may include determining a transform function between the real-world coordinate system and the virtual coordinate system. In some examples, as part of the registration process, surgical assistance system 100 may include virtual bone model 1610 in MR scene 1600 and receive one or more indications of user input to move virtual bone model 1610 to a location overlapping real-world bone 1608. In such examples, surgical assistance system 100 may then identify corresponding landmarks on virtual bone model 1610 and real-world bone 1608. Surgical assistance system 100 may then determine a transform function for mapping between the virtual coordinates of the landmarks of virtual bone model 1610 and real-world coordinates of the landmarks of real-world bone 1608.

Furthermore, in the example of FIG. 17, surgical assistance system 100 may include, in MR scene 1600, virtual bone model 1620, virtual target axis object 1626, and virtual current axis object 1630 at a location removed from real-world bone 1608 (1708). In other words, virtual bone model 1620, virtual target axis object 1626, and virtual current axis object 1630 are not superimposed on real-world bone 1608. For instance, in the example of FIG. 17, surgical assistance system 100 may include virtual bone model 1620, virtual target axis object 1626, and virtual current axis object 1630 at a location to the right of real-world bone 1608. In some examples, surgical assistance system 100 may also include virtual target insertion point object 1624 and virtual current insertion point object 1628 in MR scene 1600.

Additionally, in the example of FIG. 17, surgical assistance system 100 may include virtual bone model 1610 in MR scene 1600 at a location superimposed on real-world bone 1606 (1710). In some examples, surgical assistance system 100 may also include one or more of virtual target insertion point object 1614 or virtual target axis object 1616 in MR scene 1600.

In the example of FIG. 17, surgical assistance system 100 may determine whether the lengthwise axis of insertable item 1606 is aligned with a planned insertion axis (1712). When the lengthwise axis of insertable item 1606 is aligned with the planned insertion axis, virtual current insertion axis object 1630 is aligned with virtual target insertion axis object 1626. Furthermore, when the lengthwise axis of insertable item 1606 is aligned with the planned insertion axis, the lengthwise axis of insertable item 1606 is aligned with virtual target insertion axis 1616.

In some examples, surgical assistance system 100 may determine that the lengthwise axis of insertable item 1606 is aligned with the planned insertion axis if a difference between a current insertion point of insertable item 1606 and a planned insertion point of insertable item 1606 is less than a first threshold and a difference between an angle of insertable item 1606 relative to a surface of bone 1608 and an angle of the planned insertion axis relative to bone 1608 is less than a second threshold. In this example, the first and second thresholds may be defined in a way that distances and angles less than the first and second thresholds are acceptable for successful performance of the surgical procedure.

In response to determining that the lengthwise axis of insertable item 1606 is aligned with planned insertion axis ("YES" branch of 1712), surgical assistance system 100 may generate user feedback indicating alignment of the lengthwise axis of insertable item 1606 with planned insertion axis (1714). For example, surgical assistance system 100 may include, in MR scene 1600, a virtual object that appears like a glow or halo around virtual target axis object 1630 when the lengthwise axis of insertable item 1606 is aligned with the planned insertion axis. In some examples, surgical assistance system 100 may generate an audible indication that the lengthwise axis of insertable item 1606 is aligned with the planned insertion axis. Although not shown in the example of FIG. 17, surgical assistance system 100 may generate user feedback when the lengthwise axis of insertable item 1606 is not aligned with the planned insertion axis. For example, surgical assistance system 100 may generate audible indications that the lengthwise axis of insertable item 1606 is not aligned with the planned insertion axis. In some examples, surgical assistance system 100 may change a color of one or more of virtual target axis object 1616, virtual target axis object 1626, or virtual current axis object 1630 based on how far the lengthwise axis of insertable item 1606 is from being aligned with the planned insertion axis.

Regardless of whether the lengthwise axis of insertable item 1606 is aligned with the planned insertion axis, surgical assistance system 100 may determine an updated real-world position of insertable item 1606 (1716). For example, as described elsewhere in this disclosure, surgical assistance system 100 may track the position of a physical tracking feature of a physical tracking tool. In this example, surgical assistance system 100 may determine the updated position of insertable item 1606 based on an updated position of the physical tracking feature.

Surgical assistance system 100 may update the orientation of the virtual current axis object 1630 based on the updated orientation of insertable item 1606 so that the orientation of virtual current axis object 1630 relative to virtual bone model 1620 corresponds to the updated orientation of the lengthwise axis of insertable item 1606 relative to bone 1608 (1718). Surgical assistance system 100 may continue performing actions 1716 and 1718 multiple times (e.g., until a step of the surgical procedure that involves inserting insertable item 1606 into bone 1608 is complete).

In some examples, surgical assistance system 100 may use any of the techniques described with respect to any of FIGS. 10-17 individually or in combination to present information that helps the surgeon correctly align an insertable item with a planned insertion axis. For instance, surgical assistance system 100 may receive indications of user input that specific which of the types of MR guidance features shown in FIGS. 10, 12, 14, and 16 the surgeon would prefer to use. In some examples, surgical assistance system 100 may concurrently present two or more of the MR guidance features shown in FIGS. 10, 12, 14, and 16.

Furthermore, it will be understood with respect to FIGS. 10, 12, 14, and 16 that a physical tracking tool, such as physical tracking tool 900 (FIGS. 9A-9C), may be used for tracking the insertable item (e.g., insertable item 1006, 1206, 1406, 1606). However, the physical tracking tool is omitted from FIGS. 10, 12, 14, and 16 for clarity.

The following numbered clauses may illustrate one or more aspects of the disclosure:

Clause 1. A computer-implemented method for providing guidance during a surgical procedure, the method comprising: determining, by one or more processors of a surgical assistance system during the surgical procedure, a 3-dimensional orientation of an insertable item, wherein the insertable item is a surgical item to be inserted into a bone of the patient during the surgical procedure; including, by the one or more processors during the surgical procedure, a first virtual guide in an MR scene that includes the bone of the patient, the first virtual guide including a first current angle marker that indicates on the first virtual guide an orientation of the insertable item in a first plane; including, by the one or more processors during the surgical procedure, a second virtual guide in the MR scene, the second virtual guide including a second current angle marker that indicates on the second virtual guide an orientation of the insertable item in a second plane orthogonal to the first plane; determining, by the one or more processors, an updated position of the insertable item; and updating, by the one or more processors, positions of one or more of the first and second current angle markers based on the updated position of the insertable item.

Clause 2. The method of clause 1, wherein: including the first virtual guide in the MR scene comprises including, by the one or more processors, in the MR scene, a first target angle marker that indicates on the first virtual guide an orientation of a planned insertion axis in the first plane, and including the second virtual guide in the MR scene comprises including, by the one or more processors, in the MR scene, a second target angle marker that indicates on the second virtual guide an orientation of the planned insertion axis in the second plane.

Clause 3. The method of any of clauses 1-2, wherein: the first plane is a transverse plane of a body of the patient, and the second plane is a coronal plane of the body of the patient.

Clause 4. The method of any of clauses 1-3, wherein: the method further comprises registering a position of a real-world object with a position in a virtual coordinate system, the real-world object has a stable spatial distance from and orientation relative to the current axis of the insertable item, determining the updated position of the insertable item comprises: tracking, by the one or more processors, the position of the real-world object; determining, by the one or more processors, based on the position of the real-world object, a first set of coordinates for the insertable item in the virtual coordinate system and a second set of coordinates for the insertable item in the virtual coordinate system; determining, by the one or more processors, a first angle, the first angle being an angle between a first line and a first baseline, the first line being a projection of a line defined by the first and second sets of coordinates onto the first plane; determining, by the one or more processors, a second angle, the second angle being an angle between a second line and a second baseline, the second line being a projection of the line defined by the first and second sets of coordinates onto the second plane, and updating the positions of the current angle markers comprises: updating, by the one or more processors, the first current angle marker to indicate a position on the first virtual guide corresponding to the first angle; and updating, by the one or more processors, the second current angle marker to be at a position on the second virtual guide corresponding to the second angle.

Clause 5. The method of clause 4, wherein the real-world object is a 3-dimensional marker object having a plurality of facets with different markings, the 3-dimensional marker object being connected to a body defining a channel through which the insertable item passes during insertion of the insertable item into the bone.

Clause 6. The method of clause 4, wherein the real-world object is the insertable item.

Clause 7. A computing system comprising: a mixed reality (MR) visualization device; and one or more processors implemented in circuitry, the one or more processors configured to: determine, during the surgical procedure, a 3-dimensional orientation of an insertable item, wherein the insertable item is a surgical item to be inserted into a bone of the patient during the surgical procedure; cause the MR visualization device to include, during the surgical procedure, a first virtual guide in an MR scene that includes the bone of the patient, the first virtual guide including a first current angle marker that indicates on the first virtual guide an orientation of the insertable item in a first plane; cause the MR visualization device to include, during the surgical procedure, a second virtual guide in the MR scene, the second virtual guide including a second current angle marker that indicates on the second virtual guide an orientation of the insertable item in a second plane orthogonal to the first plane; determine an updated position of the insertable item; and cause the MR visualization device to update positions of one or more of the first and second current angle markers based on the updated position of the insertable item.

Clause 8. The computing system of clause 7, wherein the one or more processors cause the MR visualization device to: include, in the MR scene, a first target angle marker that indicates on the first virtual guide an orientation of a planned insertion axis in the first plane, and include, in the MR scene, a second target angle marker that indicates on the second virtual guide an orientation of the planned insertion axis in the second plane.

Clause 9. The computing system of any of clauses 7-8, wherein: the first plane is a transverse plane of a body of the patient, and the second plane is a coronal plane of the body of the patient.

Clause 10. The computing system of any of clauses 7-9, wherein: the method further comprises registering a position of a real-world object with a position in a virtual coordinate system, the real-world object has a stable spatial distance from and orientation relative to the current axis of the insertable item, determining the updated position of the insertable item comprises: tracking, by the one or more processors, the position of the real-world object; determining, by the one or more processors, based on the position of the real-world object, a first set of coordinates for the insertable item in the virtual coordinate system and a second set of coordinates for the insertable item in the virtual coordinate system; determining, by the one or more processors, a first angle, the first angle being an angle between a first line and a first baseline, the first line being a projection of a line defined by the first and second sets of coordinates onto the first plane; determining, by the one or more processors, a second angle, the second angle being an angle between a second line and a second baseline, the second line being a projection of the line defined by the first and second sets of coordinates onto the second plane, and updating the positions of the current angle markers comprises: updating, by the one or more processors, the first current angle marker to indicate a position on the first virtual guide corresponding to the first angle; and updating, by the one or more processors, the second current angle marker to be at a position on the second virtual guide corresponding to the second angle.

Clause 11. The computing system of clause 10, wherein the real-world object is a 3-dimensional marker object having a plurality of facets with different markings, the 3-dimensional marker object being connected to a body defining a channel through which the insertable item passes during insertion of the insertable item into the bone.

Clause 12. The computing system of clause 10, wherein the real-world object is the insertable item.

Clause 13. A computer-implemented method for providing guidance during a surgical procedure, the method comprising: determining, by a surgical assistance system comprising one or more processors and a mixed reality (MR) visualization device, during the surgical procedure, a 3-dimensional orientation of an insertable item, wherein the insertable item is a surgical item to be inserted into a bone of the patient during the surgical procedure; including, by the surgical assistance system during the surgical procedure, in a mixed reality (MR) scene that includes the bone of the patient, a virtual model of the bone from a perspective aligned with a lengthwise axis of the insertable item; determining, by the surgical assistance system during the surgical procedure, an updated position of the insertable item; and updating, by the surgical assistance system during the surgical procedure, an orientation of the virtual model of the bone so that the virtual model of the bone is shown in the MR scene from the perspective aligned with the lengthwise axis of the insertable item.

Clause 14. The method of clause 13, further comprising: including, by the surgical assistance system during the surgical procedure, a virtual target axis object in the virtual window, wherein the virtual target axis object corresponds to a planned insertion axis along which a surgeon is to insert the insertable item into the bone; and updating, by the surgical assistance system during the surgical procedure, based on the updated position of the insertable item, an orientation of the virtual target axis object so that the virtual window continues to show the virtual target axis object from the perspective aligned with the lengthwise axis of the insertable item.

Clause 15. The method of clause 14, further comprising: generating, by the surgical assistance system during the surgical procedure, user feedback based on the lengthwise axis of the insertable item being aligned with the planned insertion axis.

Clause 16. The method of any of clauses 14-15, wherein including the virtual target axis object in the virtual window comprises including, by the surgical assistance system during the surgical procedure, the virtual target axis object in the virtual window in response to determining that a tip of the insertable object is positioned at a planned insertion point for the insertable item.

Clause 17. The method of any of clauses 13-16, further comprising: including, by the surgical assistance system, during the surgical procedure, a virtual element in the virtual window, the virtual element representing the insertable item from the perspective aligned with the lengthwise axis of the insertable item.

Clause 18. The method of any of clauses 13-17, wherein the bone is a human scapula.

Clause 19. The method of any of clauses 13-18, wherein the insertable item is a pin, screw, drill bit, or nail.

Clause 20. A computing system comprising: a mixed reality (MR) visualization device; and one or more processors implemented in circuitry, the one or more processors configured to: determine, during the surgical procedure, a 3-dimensional orientation of an insertable item, wherein the insertable item is a surgical item to be inserted into a bone of the patient during the surgical procedure; cause the MR visualization device to include, during the surgical procedure, a virtual window in a mixed reality (MR) scene that includes the bone of the patient, the virtual window including a virtual model of the bone from a perspective aligned with a lengthwise axis of the insertable item; determine, during the surgical procedure, an updated position of the insertable item; and cause the MR visualization device to update, during the surgical procedure, an orientation of the virtual model of the bone so that the virtual window continues to show the virtual model of the bone from the perspective aligned with the lengthwise axis of the insertable item.

Clause 21. The computing system of clause 20, wherein the one or more processors are configured to: cause the MR visualization device to include, during the surgical procedure, a virtual target axis object in the virtual window, wherein the virtual target axis object corresponds to a planned insertion axis along which a surgeon is to insert the insertable item into the bone; and cause the MR visualization device to update, during the surgical procedure, based on the updated position of the insertable item, an orientation of the virtual target axis object so that the virtual window continues to show the virtual target axis object from the perspective aligned with the lengthwise axis of the insertable item.

Clause 22. The computing system of clause 21, wherein the one or more processors are configured to: generate, during the surgical procedure, user feedback based on the lengthwise axis of the insertable item being aligned with the planned insertion axis.

Clause 23. The computing system of any of clauses 21-22, wherein the one or more processors are configured to include, during the surgical procedure, the virtual target axis object in the virtual window in response to determining that a tip of the insertable object is positioned at a planned insertion point for the insertable item.

Clause 24. The computing system of any of clauses 20-23, wherein the one or more processors are configured to: include, during the surgical procedure, a virtual element in the virtual window, the virtual element representing the insertable item from the perspective aligned with the lengthwise axis of the insertable item.

Clause 25. The computing system of any of clauses 20-24, wherein the bone is a human scapula.

Clause 26. The computing system of any of clauses 20-25, wherein the insertable item is a pin, screw, drill bit, or nail.

Clause 27. A computer-implemented method for providing guidance during a surgical procedure, the method comprising: including, by a surgical assistance system comprising one or more processors and a mixed reality (MR) visualization device, during the surgical procedure, in a mixed reality (MR) scene, a virtual bone model, a virtual target axis object, and a virtual current axis object at locations removed from a real-world bone in the MR scene, wherein: the virtual bone model comprises a 3-dimensional (3D) virtual model of the real-world bone or a portion of the real-world bone, the virtual target axis object has an orientation relative to the virtual bone model that corresponds to an orientation of a planned insertion axis of an insertable object relative to the real-world bone, the virtual current axis object has an orientation relative to the virtual bone model that corresponds to a current orientation of a lengthwise axis of the insertable object relative to the real-world bone; determining, by the surgical assistance system during the surgical procedure, an updated orientation of lengthwise axis of the insertable item; and updating, by the surgical assistance system during the surgical procedure, the orientation of the virtual current axis object relative to the virtual bone model to correspond to the updated orientation of the lengthwise axis of the insertable item.

Clause 28. The method of clause 27, wherein the virtual bone model is a first virtual bone model, the 3D virtual bone of the real-world bone is a first 3D virtual bone of the real-world bone, and the virtual target axis object is a first virtual target axis, and the method further comprises including, by the one or more processors, in the MR scene, a second virtual bone model and an associated second virtual current axis at a location superimposed on the real-world bone, wherein: the second virtual bone model comprises a second 3D virtual model of the real-world bone or a portion of the real-world bone, and the second virtual target axis object has an orientation relative to the virtual bone model that corresponds to an orientation of a planned insertion axis of an insertable object relative to the real-world bone.

Clause 29. The method of any of clauses 27-28, further comprising: determining, by the one or more processors, whether a lengthwise axis of the insertable item is aligned with the planned insertion axis; and based on the lengthwise axis of the insertable item being aligned with the planned insertion axis, generating, by the surgical assistance system, user feedback indicating that the insertable item is aligned with the planned insertion axis.

Clause 30. The method of any of clauses 27-29, wherein the bone is a human scapula.

Clause 31. The method of any of clauses 27-30, wherein the insertable item is a pin, screw, drill bit, or nail.

Clause 32. A surgical assistance system comprising: one or more processors; and a mixed reality (MR) visualization device configured to include, during the surgical procedure, in a MR scene, a virtual bone model, a virtual target axis object, and a virtual current axis object at locations removed from a real-world bone in the MR scene, wherein: the virtual bone model comprises a 3-dimensional (3D) virtual model of the real-world bone or a portion of the real-world bone, the virtual target axis object has an orientation relative to the virtual bone model that corresponds to an orientation of a planned insertion axis of an insertable object relative to the real-world bone, the virtual current axis object has an orientation relative to the virtual bone model that corresponds to a current orientation of a lengthwise axis of the insertable object relative to the real-world bone, wherein the one or more processors are configured to determine, during the surgical procedure, an updated orientation of the lengthwise axis of the insertable item; and the MR visualization device is further configured to update, during the surgical procedure, the orientation of the virtual current axis object relative to the virtual bone model to correspond to the updated orientation of the lengthwise axis of the insertable item.

Clause 33. The surgical assistance system of clause 32, wherein the virtual bone model is a first virtual bone model, the 3D virtual bone of the real-world bone is a first 3D virtual bone of the real-world bone, and the virtual target axis object is a first virtual target axis, and the MR visualization device is further configured to include, in the MR scene, a second virtual bone model and an associated second virtual current axis at a location superimposed on the real-world bone, wherein: the second virtual bone model comprises a second 3D virtual model of the real-world bone or a portion of the real-world bone, and the second virtual target axis object has an orientation relative to the virtual bone model that corresponds to an orientation of a planned insertion axis of an insertable object relative to the real-world bone.

Clause 34. The surgical assistance system of any of clauses 32-33, wherein: the one or more processors are further configured to determine whether a lengthwise axis of the insertable item is aligned with the planned insertion axis; and the MR visualization device or another device of surgical assistance system is configured to generate, based on the lengthwise axis of the insertable item being aligned with the planned insertion axis, user feedback indicating that the insertable item is aligned with the planned insertion axis.

Clause 35. The surgical assistance system of any of clauses 32-34, wherein the bone is a human scapula.

Clause 36. The surgical assistance system of any of clauses 32-35, wherein the insertable item is a pin, screw, drill bit, or nail.

Clause 37. A computer-readable storage medium having instructions stored thereon that, when executed, configure a surgical assistance system to perform the methods of any of clauses 27-31.

Clause 38. A surgical assistance system comprising means for performing the methods of any of clauses 27-31.

While the techniques been disclosed with respect to a limited number of examples, those skilled in the art, having the benefit of this disclosure, will appreciate numerous modifications and variations there from. For instance, it is contemplated that any reasonable combination of the described examples may be performed. It is intended that the appended claims cover such modifications and variations as fall within the true spirit and scope of the invention.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Operations described in this disclosure may be performed by one or more processors, which may be implemented as fixed-function processing circuits, programmable circuits, or combinations thereof, such as one or more digital signal processors (DSPs), general purpose microprocessors, application specific integrated circuits (ASICs), field programmable gate arrays (FPGAs), or other equivalent integrated or discrete logic circuitry. Fixed-function circuits refer to circuits that provide particular functionality and are preset on the operations that can be performed. Programmable circuits refer to circuits that can programmed to perform various tasks and provide flexible functionality in the operations that can be performed. For instance, programmable circuits may execute instructions specified by software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. Accordingly, the terms "processor" and "processing circuitry," as used herein may refer to any of the foregoing structures or any other structure suitable for implementation of the techniques described herein.

Various examples have been described. These and other examples are within the scope of the following claims.

What is claimed is:

1. A method comprising:
    obtaining, by one or more processors, image data generated by one or more cameras of a mixed reality (MR) visualization device worn on a head of a surgeon, wherein the image data depicts a scene including a physical tracking tool, the physical tracking tool comprising a main body that is cylindrical and that defines a channel configured to receive an insertable object, the insertable object is rotatable within the channel, the physical tracking tool further comprises one or more physical tracking features that are fixedly attached to the main body, each of the one or more physical tracking features being a polyhedron that comprises a plurality of planar faces, each planar face of the plurality of planar faces including a different graphical pattern of a plurality of pre-determined graphical patterns;
    determining, by the one or more processors, based on the image data, coordinates of a plurality of points on two or more of the pre-determined graphical patterns;
    determining, by the one or more processors, based on the coordinates and one or more properties of the physical tracking tool, a position and an orientation of the insertable object;
    registering, by the one or more processors, a virtual model of a portion of a bone of a patient to a corresponding portion of the bone viewable via the visualization device, the virtual model obtained from a virtual surgical plan for an orthopedic procedure to attach a prosthetic to the bone;
    displaying, via the MR visualization device and based on the position and/or the orientation of the insertable object, a first virtual guide and a second virtual guide, wherein the first virtual guide corresponds to a retroversion of the insertable object and is visible superior to the physical tracking tool, the second virtual guide corresponds to an inclination of the insertable object and is visible anterior to the physical tracking tool, the first virtual guide includes a first target angle marker and a first current angle marker, the second virtual guide includes a second target angle marker and a second current angle marker, the first target angle marker is located on the first virtual guide at an anterior/posterior angle of a planned insertion axis, the second target angle marker is located on the second virtual guide at a position corresponding to a superior/inferior angle of the planned insertion axis, the first current angle marker is located in the first virtual guide at a position corresponding to an anterior/posterior angle of a real-world current insertion axis of the insertable object, the second current angle marker is located on the second virtual guide corresponding to a superior/inferior angle of the real-world current insertion axis of the insertable object; and
    updating, via the MR visualization device, positions of the first current angle marker and the second current angle marker in response to changes in the position and the orientation of the insertable object.

2. The method of claim 1, wherein each graphical pattern of the plurality of pre-determined graphical patterns includes a rectangular perimeter, and wherein determining the coordinates comprises:
    determining the coordinates of one or more corners of a rectangular perimeter of a particular graphical pattern.

3. A computing system comprising:
    a mixed reality (MR) visualization device configured to be worn on a head of a surgeon; and
    one or more processors implemented in circuitry, the one or more processors configured to:
        obtain image data generated by one or more cameras of the MR visualization device, wherein the image data depicts a scene including a physical tracking tool, the physical tracking tool comprising a main body that is cylindrical and that defines a channel configured to receive an insertable object, the insertable object is rotatable within the channel, the physical tracking tool further comprises one or more physical tracking features that are fixedly attached to the main body, each of the one or more physical tracking features being a polyhedron that comprises a plurality of planar faces, each planar face of the plurality of planar faces including a different graphical pattern of a plurality of pre-determined graphical patterns;
        determine, based on the image data, coordinates of a plurality of points on two or more of the pre-determined graphical patterns;
        determine, based on the coordinates and one or more properties of the physical tracking tool, a position and an orientation of the insertable object;
        register a virtual model of a portion of a bone of a patient to a corresponding portion of the bone viewable via the visualization device, the virtual model obtained from a virtual surgical plan for an orthopedic procedure to attach a prosthetic to the bone;
        display, via the MR visualization device and based on the position and/or the orientation of the insertable object, a first virtual guide and a second virtual guide, wherein the first virtual guide corresponds to a retroversion of the insertable object and is visible superior to the physical tracking tool, the second virtual guide corresponds to an inclination of the insertable object and is visible anterior to the physical tracking tool, the first virtual guide includes a first target angle marker and a first current angle marker, the second virtual guide includes a second target angle marker and a second current angle marker, the first target angle marker is located on the first virtual guide at an anterior/posterior angle of a planned insertion axis, the second target angle marker is located on the second virtual guide at a position corresponding to a superior/inferior angle of the planned insertion axis, the first current angle marker is located in the first virtual guide at a position corresponding to an anterior/posterior angle of a real-world current insertion axis of the insertable object, the second current angle marker is located on the second virtual guide corresponding to a superior/inferior angle of the real-world current insertion axis of the insertable object; and update, via the MR visualization device, positions of the first current angle marker and the second current angle marker in response to changes in the position and the orientation of the insertable object.

\* \* \* \* \*